(12) United States Patent
Seymour et al.

(10) Patent No.: US 12,080,928 B2
(45) Date of Patent: *Sep. 3, 2024

(54) ELECTROCHEMICAL SYSTEM WITH CONFINED ELECTROLYTE

(71) Applicant: EDAC Labs, Inc., Beltsville, MD (US)

(72) Inventors: Eric Seymour, Louisville, CO (US); Gregory Kumor, Louisville, CO (US); Erik T. Herrera, Louisville, CO (US); Byron J. Burkill, Louisville, CO (US); David Cox, Louisville, CO (US); Sandeep Nijhawan, Louisville, CO (US); Cameron Tavener-Smith, Louisville, CO (US); Wayne Richard Hemzacek, Louisville, CO (US); Nathaniel Martin Schuh, Louisville, CO (US)

(73) Assignee: EDAC Labs, Inc., Beltsville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,232

(22) Filed: May 5, 2023

(65) Prior Publication Data

US 2023/0395835 A1 Dec. 7, 2023

Related U.S. Application Data

(63) Continuation of application No. 17/228,271, filed on Apr. 12, 2021, now Pat. No. 11,682,783, which is a
(Continued)

(51) Int. Cl.
*C25B 9/00* (2021.01)
*C25B 1/04* (2021.01)
(Continued)

(52) U.S. Cl.
CPC ............. *H01M 8/1004* (2013.01); *C25B 1/04* (2013.01); *C25B 9/19* (2021.01); *C25B 9/73* (2021.01);
(Continued)

(58) Field of Classification Search
CPC .. C25B 15/08; C25B 1/04; C25B 9/00; C25B 9/19; C25B 15/02; C25B 9/70;
(Continued)

(56) References Cited

U.S. PATENT DOCUMENTS 1,464,840 A 8/1923 Allan
1,721,407 A 7/1929 Rodolphe
(Continued)

FOREIGN PATENT DOCUMENTS

CA 2062739 A1 12/1990
CA 1333579 C 12/1994
(Continued)

OTHER PUBLICATIONS

3M Celgard, available online at http://www.membrana.com/healthcare/products/blood-oxygenation-products/celgard), accessed Aug. 2017, 2 pp.
(Continued)

*Primary Examiner* — Zulmariam Mendez
(74) *Attorney, Agent, or Firm* — Meunier Carlin & Curfman LLC

(57) ABSTRACT

Described herein are systems and methods for the management and control of electrolyte within confined electrochemical cells or groups (e.g. stacks) of connected electrochemical cells, for example, in an electrolyzer. Various embodiments of systems and methods provide for the elimination of parasitic conductive paths between cells, and/or precise passive control of fluid pressures within cells. In some embodiments, a fixed volume of electrolyte is sub-
(Continued)

stantially retained within each cell while efficiently collecting and removing produced gases or other products from the cell.

33 Claims, 22 Drawing Sheets

Related U.S. Application Data continuation of application No. 17/060,320, filed on Oct. 1, 2020, now Pat. No. 11,005,117, which is a continuation of application No. PCT/US2020/016135, filed on Jan. 31, 2020.

(60) Provisional application No. 62/799,966, filed on Feb. 1, 2019, provisional application No. 62/854,757, filed on May 30, 2019.

(51) Int. Cl.
| | |
|---|---|
| C25B 9/17 | (2021.01) |
| C25B 9/19 | (2021.01) |
| C25B 9/73 | (2021.01) |
| C25B 9/77 | (2021.01) |
| C25B 15/02 | (2021.01) |
| C25B 15/08 | (2006.01) |
| H01M 8/0202 | (2016.01) |
| H01M 8/1004 | (2016.01) |
| H01M 8/20 | (2006.01) |
| H01M 8/10 | (2016.01) |
| H01M 8/241 | (2016.01) |

(52) U.S. Cl.
CPC ............. *C25B 9/77* (2021.01); *C25B 15/02* (2013.01); *C25B 15/08* (2013.01); *H01M 8/0202* (2013.01); *H01M 8/20* (2013.01); *H01M 2008/1095* (2013.01); *H01M 8/241* (2013.01)

(58) Field of Classification Search
CPC .... C25B 1/00; C25B 1/02; C25B 9/17; C25B 11/00; C25B 9/40; C25B 13/00; C25D 17/002; C25D 17/00; C25D 21/18; C25D 21/14; C25D 21/04
See application file for complete search history.

(56) References Cited

U.S. PATENT DOCUMENTS

| | | |
|---|---|---|
| 2,075,688 A | 3/1937 | Ewald |
| 2,695,874 A | 1/1954 | Zdansky |
| 2,683,116 A | 7/1954 | Zdansky |
| 2,925,371 A | 2/1960 | Van Winckel et al. |
| 3,284,243 A | 11/1966 | Von Sturm |
| 3,338,747 A | 8/1967 | Plust et al. |
| 3,342,639 A | 9/1967 | Rodolphe |
| 3,410,770 A | 11/1968 | Buechler |
| 3,475,302 A | 10/1969 | Langer et al. |
| 3,507,702 A | 4/1970 | Sanderson |
| 3,527,616 A | 9/1970 | Landi |
| 3,553,029 A | 1/1971 | Kordesch et al. |
| 3,594,236 A | 7/1971 | Boden et al. |
| 3,697,410 A | 10/1972 | Johnson et al. |
| 3,847,567 A | 11/1974 | Kalina |
| 3,854,994 A | 12/1974 | Binder et al. |
| 3,905,884 A | 9/1975 | Parenti, Jr. et al. |
| 3,923,629 A | 12/1975 | Shaffer |
| 3,953,241 A | 4/1976 | Langer et al. |
| 3,980,545 A | 9/1976 | De Lachaux et al. |
| 4,020,389 A | 4/1977 | Dickson et al. |
| 4,042,481 A | 8/1977 | Kelly |
| 4,048,383 A | 9/1977 | Clifford |
| 4,077,863 A | 3/1978 | Nasser |
| 4,086,155 A | 4/1978 | Jonville |
| 4,091,176 A | 5/1978 | Alfenaar |
| 4,091,177 A | 5/1978 | Heffler |
| 4,206,029 A | 6/1980 | Spirig |
| 4,299,682 A | 11/1981 | Oda et al. |
| 4,336,122 A | 6/1982 | Spirig |
| 4,371,433 A | 2/1983 | Balko et al. |
| 4,394,244 A | 7/1983 | Divisek et al. |
| 4,407,907 A | 10/1983 | Takamura et al. |
| 4,431,494 A | 2/1984 | Mcintyre |
| 4,432,859 A | 2/1984 | Andreassen et al. |
| 4,445,994 A | 5/1984 | Divisek et al. |
| 4,451,347 A | 5/1984 | Wullenweber |
| 4,487,818 A | 12/1984 | Ovshinsky et al. |
| 4,526,818 A | 7/1985 | Hoshikawa et al. |
| 4,533,455 A | 8/1985 | Balko et al. |
| 4,564,427 A | 1/1986 | Gruver et al. |
| 4,568,442 A | 2/1986 | Goldsmith |
| 4,581,116 A | 4/1986 | Plowman et al. |
| 4,585,532 A | 4/1986 | Martin et al. |
| 4,586,999 A | 5/1986 | Goldsmith et al. |
| 4,647,359 A | 3/1987 | Lindstrom |
| 4,650,554 A | 3/1987 | Gordon |
| 4,656,103 A | 4/1987 | Reichman et al. |
| 4,684,353 A | 8/1987 | Desouza |
| 4,718,997 A | 1/1988 | Grimes et al. |
| 4,720,331 A | 1/1988 | Billings |
| 4,722,773 A | 2/1988 | Plowman et al. |
| 4,790,915 A | 12/1988 | Winsel et al. |
| 4,846,952 A | 7/1989 | Gardner, Sr. et al. |
| 4,865,925 A | 9/1989 | Ludwig et al. |
| 4,895,634 A | 1/1990 | Giuffre et al. |
| 4,898,699 A | 2/1990 | Hofmann et al. |
| 4,936,972 A | 6/1990 | Lohberg |
| 5,104,497 A | 4/1992 | Tetzlaff et al. |
| 5,169,612 A | 12/1992 | Nielsen |
| 5,242,765 A | 9/1993 | Naimer et al. |
| 5,300,206 A | 4/1994 | Allen et al. |
| 5,336,570 A | 8/1994 | Dodge, Jr. |
| 5,376,253 A | 12/1994 | Rychen et al. |
| 5,395,501 A | 3/1995 | Rohrbacker et al. |
| 5,396,253 A | 3/1995 | Chia |
| 5,423,967 A | 6/1995 | Kunimatsu et al. |
| 5,538,608 A | 7/1996 | Furuya |
| 5,618,392 A | 4/1997 | Furuya |
| 5,650,058 A | 7/1997 | Wenske |
| 5,650,243 A | 7/1997 | Ferment |
| 5,690,797 A | 11/1997 | Harada et al. |
| 5,693,202 A | 12/1997 | Gestermann et al. |
| 5,843,297 A | 12/1998 | Schmid et al. |
| 5,998,057 A | 12/1999 | Koschany et al. |
| 6,008,449 A | 12/1999 | Cole |
| 6,033,549 A | 3/2000 | Peinecke et al. |
| 6,045,942 A | 4/2000 | Miekka et al. |
| 6,110,334 A | 8/2000 | Lohrberg |
| 6,127,061 A | 10/2000 | You-Keung et al. |
| 6,146,518 A | 11/2000 | Fairlie et al. |
| 6,165,332 A | 12/2000 | Gestermann et al. |
| 6,183,914 B1 | 2/2001 | Yao et al. |
| 6,187,155 B1 | 2/2001 | Stuart et al. |
| 6,203,676 B1 | 3/2001 | Phillips et al. |
| 6,317,248 B1 | 11/2001 | Agrawal et al. |
| 6,358,651 B1 | 3/2002 | Chen et al. |
| 6,368,473 B1 | 4/2002 | Furuya et al. |
| 6,444,347 B1 | 9/2002 | Ouvry et al. |
| 6,503,656 B1 | 1/2003 | Bannai et al. |
| 6,554,978 B1 | 4/2003 | Vandenborre et al. |
| 6,733,639 B2 | 5/2004 | Busse et al. |
| 6,833,207 B2 | 12/2004 | Joos et al. |
| 7,001,688 B2 | 2/2006 | Ito et al. |
| 7,049,803 B2 | 5/2006 | Dörner et al. |
| 7,220,513 B2 | 5/2007 | Rohwer et al. |
| 7,229,944 B2 | 6/2007 | Shao-horn et al. |
| 7,245,414 B2 | 7/2007 | Liang et al. |
| 7,306,437 B2 | 12/2007 | Hauge |
| 7,314,539 B2 | 1/2008 | Brand et al. |
| 7,326,329 B2 | 2/2008 | Gomez |
| 7,357,852 B2 | 4/2008 | Woudenberg et al. |

(56) References Cited

U.S. PATENT DOCUMENTS

| | | |
|---|---|---|
| 7,410,714 B1 | 8/2008 | Burke et al. |
| 7,459,065 B2 | 12/2008 | Kelly et al. |
| 7,498,099 B2 | 3/2009 | Otohata et al. |
| 7,651,602 B2 | 1/2010 | Helmke et al. |
| 7,824,527 B2 | 11/2010 | Vandenborre |
| 8,057,646 B2 | 11/2011 | Hinatsu et al. |
| 8,123,915 B2 | 2/2012 | Richards et al. |
| 8,182,959 B2 | 5/2012 | Du et al. |
| 8,241,818 B2 | 8/2012 | Ji |
| 8,277,996 B2 | 10/2012 | Okusawa et al. |
| 8,308,917 B2 | 11/2012 | Hinatsu et al. |
| 8,329,008 B2 | 12/2012 | Maekawa et al. |
| 8,349,151 B2 | 1/2013 | Schmitt et al. |
| 8,349,165 B2 | 1/2013 | Tanaka et al. |
| 8,617,361 B2 | 12/2013 | Hinatsu et al. |
| 8,641,874 B2 | 2/2014 | Kuiphoff |
| 8,864,962 B2 | 10/2014 | Stemp et al. |
| 8,940,151 B1 | 1/2015 | Hartvigsen et al. |
| 8,999,135 B2 | 4/2015 | Hinatsu et al. |
| 9,133,553 B2 | 9/2015 | Wilson et al. |
| 9,187,833 B2 | 11/2015 | Wilson et al. |
| 9,252,449 B2 | 2/2016 | Shinohara et al. |
| 9,404,190 B2 | 8/2016 | Wilson |
| 9,708,719 B2 | 7/2017 | Swiegers et al. |
| 9,871,255 B2 | 1/2018 | Swiegers et al. |
| 9,938,627 B2 | 4/2018 | Winther-Jensen et al. |
| 10,026,967 B2 | 7/2018 | Swiegers et al. |
| 10,087,536 B2 | 10/2018 | Winther-Jensen et al. |
| 10,224,552 B2 | 3/2019 | Bulan et al. |
| 10,297,834 B2 | 5/2019 | Swiegers et al. |
| 10,355,283 B2 | 7/2019 | Swiegers et al. |
| 10,428,431 B2 | 10/2019 | Swiegers et al. |
| 10,577,700 B2 | 3/2020 | Winther-Jensen et al. |
| 10,637,068 B2 | 4/2020 | Swiegers et al. |
| 10,760,167 B2 | 9/2020 | Murayama |
| 10,787,749 B2 | 9/2020 | Xiang et al. |
| 11,005,117 B2 | 5/2021 | Seymour et al. |
| 11,018,345 B2 | 5/2021 | Swiegers et al. |
| 11,682,783 B2 | 6/2023 | Seymour et al. |
| 2002/0010261 A1 | 1/2002 | Callahan et al. |
| 2002/0012848 A1 | 1/2002 | Callahan et al. |
| 2002/0034679 A1 | 3/2002 | Iarochenko et al. |
| 2002/0045089 A1 | 4/2002 | Kawahara et al. |
| 2002/0068215 A1 | 6/2002 | Hamada et al. |
| 2002/0100681 A1 | 8/2002 | Kirk et al. |
| 2002/0150812 A1 | 10/2002 | Kaz et al. |
| 2002/0153262 A1 | 10/2002 | Uno et al. |
| 2003/0035990 A1 | 2/2003 | Washima |
| 2003/0064268 A1 | 4/2003 | Fukuda et al. |
| 2003/0099872 A1 | 5/2003 | Chen et al. |
| 2003/0162072 A1 | 8/2003 | Oosterkamp |
| 2003/0230495 A1 | 12/2003 | Anderson et al. |
| 2003/0232225 A1 | 12/2003 | Maruyama et al. |
| 2004/0040838 A1 | 3/2004 | Helmke et al. |
| 2004/0101740 A1 | 5/2004 | Sanders |
| 2004/0229107 A1 | 11/2004 | Smedley |
| 2004/0253494 A1 | 12/2004 | Maruyama et al. |
| 2004/0262153 A1 | 12/2004 | Pinter et al. |
| 2005/0003255 A1 | 1/2005 | Shimizu et al. |
| 2005/0036941 A1 | 2/2005 | Bae et al. |
| 2005/0106450 A1 | 5/2005 | Castro et al. |
| 2005/0126924 A1 | 6/2005 | Gomez |
| 2005/0130023 A1 | 6/2005 | Lebowitz et al. |
| 2005/0208366 A1 | 9/2005 | Rohwer et al. |
| 2006/0211777 A1 | 9/2006 | Severinsky |
| 2006/0228606 A1 | 10/2006 | Fiebig et al. |
| 2006/0272698 A1 | 12/2006 | Durvasula |
| 2007/0015040 A1 | 1/2007 | Li et al. |
| 2007/0072026 A1 | 3/2007 | Andrin |
| 2007/0080069 A1 | 4/2007 | Melosi |
| 2007/0087245 A1 | 4/2007 | Fuller et al. |
| 2007/0099072 A1 | 5/2007 | Hennige et al. |
| 2007/0131556 A1 | 6/2007 | Lambie |
| 2007/0196702 A1 | 8/2007 | Sridhar et al. |
| 2007/0207370 A1 | 9/2007 | Kwak et al. |
| 2007/0231669 A1 | 10/2007 | Ghosh |
| 2007/0246351 A1 | 10/2007 | Smola et al. |
| 2007/0289707 A1 | 12/2007 | Rohland et al. |
| 2008/0014491 A1 | 1/2008 | Yajima et al. |
| 2008/0032181 A1 | 2/2008 | Yamamoto |
| 2008/0070076 A1 | 3/2008 | Makita et al. |
| 2008/0155813 A1 | 7/2008 | Dopp et al. |
| 2008/0160357 A1 | 7/2008 | Pashley et al. |
| 2008/0169188 A1 | 7/2008 | Gil et al. |
| 2008/0206615 A1 | 8/2008 | Nicotera et al. |
| 2008/0223439 A1 | 9/2008 | Deng et al. |
| 2008/0226966 A1 | 9/2008 | Dillard et al. |
| 2008/0248350 A1 | 10/2008 | Little et al. |
| 2008/0264780 A1 | 10/2008 | Kato et al. |
| 2008/0311463 A1 | 12/2008 | Park et al. |
| 2009/0000574 A1 | 1/2009 | Sugimasa et al. |
| 2009/0008261 A1 | 1/2009 | Kotzeva et al. |
| 2009/0035631 A1 | 2/2009 | Zagaja et al. |
| 2009/0052129 A1 | 2/2009 | Tsai |
| 2009/0061267 A1 | 3/2009 | Monzyk et al. |
| 2009/0078568 A1 | 3/2009 | Ramaswami et al. |
| 2009/0081501 A1 | 3/2009 | Vu et al. |
| 2009/0101521 A1 | 4/2009 | Bayer et al. |
| 2009/0151150 A1 | 6/2009 | Ayala et al. |
| 2009/0152118 A1 | 6/2009 | Sugimasa et al. |
| 2009/0153465 A1 | 6/2009 | Shinn et al. |
| 2009/0162713 A1 | 6/2009 | Peng et al. |
| 2009/0162714 A1 | 6/2009 | Nakanishi et al. |
| 2009/0165933 A1 | 7/2009 | Lösch et al. |
| 2009/0233153 A1 | 9/2009 | Carlisle et al. |
| 2009/0272648 A1 | 11/2009 | Pratt |
| 2009/0280374 A2 | 11/2009 | Andrin et al. |
| 2009/0294283 A1 | 12/2009 | Norman et al. |
| 2009/0305084 A1 | 12/2009 | Crookes et al. |
| 2009/0325014 A1 | 12/2009 | Newkirk |
| 2010/0009232 A1 | 1/2010 | Rajantie et al. |
| 2010/0032221 A1 | 2/2010 | Storey |
| 2010/0039594 A1 | 2/2010 | Golan et al. |
| 2010/0114395 A1 | 5/2010 | Hinatsu et al. |
| 2010/0130776 A1 | 5/2010 | Christensen et al. |
| 2010/0155233 A1 | 6/2010 | Hwang |
| 2010/0155258 A1 | 6/2010 | Kirk et al. |
| 2010/0187124 A1 | 7/2010 | Koveal |
| 2010/0196800 A1 | 8/2010 | Markoski et al. |
| 2010/0219077 A1 | 9/2010 | Sohn |
| 2010/0288647 A1 | 11/2010 | Highgate |
| 2010/0314038 A1 | 12/2010 | Tanuma |
| 2010/0314261 A1 | 12/2010 | Perry |
| 2011/0024289 A1 | 2/2011 | Bulan et al. |
| 2011/0042228 A1 | 2/2011 | Hinatsu et al. |
| 2011/0171555 A1 | 7/2011 | Oloman |
| 2011/0229790 A1 | 9/2011 | Sato et al. |
| 2011/0233072 A1 | 9/2011 | Deptala et al. |
| 2011/0244358 A1 | 10/2011 | Yamauchi et al. |
| 2011/0253526 A1 | 10/2011 | McAlister |
| 2011/0284392 A1 | 11/2011 | Quadrelli et al. |
| 2011/0311903 A1 | 12/2011 | Bulan et al. |
| 2012/0003552 A1 | 1/2012 | Barnett et al. |
| 2012/0009331 A1 | 1/2012 | Kwon et al. |
| 2012/0021303 A1 | 1/2012 | Amendola et al. |
| 2012/0028154 A1 | 2/2012 | Owejan et al. |
| 2012/0040254 A1 | 2/2012 | Amendola et al. |
| 2012/0115049 A1 | 5/2012 | Rinzler et al. |
| 2012/0148899 A1 | 6/2012 | Gutsch et al. |
| 2012/0149789 A1 | 6/2012 | Greenbaum |
| 2012/0183879 A1 | 7/2012 | Okada et al. |
| 2012/0237848 A1 | 9/2012 | Mittelsteadt et al. |
| 2012/0308807 A1 | 12/2012 | Edwards |
| 2012/0308856 A1 | 12/2012 | Horne et al. |
| 2012/0321988 A1 | 12/2012 | Sharman |
| 2013/0017414 A1 | 1/2013 | He |
| 2013/0017470 A1 | 1/2013 | Hotta et al. |
| 2013/0078536 A1 | 3/2013 | Bulan et al. |
| 2013/0089767 A1 | 4/2013 | Blacker et al. |
| 2013/0092532 A1 | 4/2013 | Monzyk et al. |
| 2013/0101923 A1 | 4/2013 | Darling |
| 2013/0183591 A1 | 7/2013 | Dickson |
| 2013/0189592 A1 | 7/2013 | Roumi et al. |
| 2013/0206609 A1 | 8/2013 | Anagnostopoulos |

(56) References Cited

U.S. PATENT DOCUMENTS

| | | | |
|---|---|---|---|
| 2013/0209919 A1 | 8/2013 | Amendola et al. |
| 2013/0313126 A1 | 11/2013 | Raatschen et al. |
| 2014/0048423 A1 | 2/2014 | Swiegers et al. |
| 2014/0284220 A1 | 9/2014 | Sala et al. |
| 2014/0363757 A1 | 12/2014 | Jehle et al. |
| 2015/0001067 A1 | 1/2015 | Mantai et al. |
| 2015/0004510 A1 | 1/2015 | Bertier |
| 2015/0013225 A1 | 1/2015 | Al-muhaish et al. |
| 2015/0030957 A1 | 1/2015 | Van Boeyen et al. |
| 2015/0041410 A1 | 2/2015 | Niksa et al. |
| 2015/0047988 A1 | 2/2015 | Kettner et al. |
| 2015/0118592 A1 | 4/2015 | Allebrod et al. |
| 2015/0143873 A1 | 5/2015 | Steiner et al. |
| 2015/0151985 A1 | 6/2015 | Johnson et al. |
| 2015/0171455 A1 | 6/2015 | Mills |
| 2015/0222002 A1 | 8/2015 | Graves et al. |
| 2015/0292094 A1 | 10/2015 | Swiegers et al. |
| 2015/0349350 A1 | 12/2015 | Liu et al. |
| 2016/0040310 A1 | 2/2016 | Komai et al. |
| 2016/0121752 A1 | 5/2016 | Takeyama |
| 2016/0312370 A1 | 10/2016 | Swiegers et al. |
| 2016/0322649 A1 | 11/2016 | Swiegers et al. |
| 2016/0376173 A1 | 12/2016 | Swiegers et al. |
| 2017/0250417 A1 | 8/2017 | Smeltz et al. |
| 2017/0326497 A1 | 11/2017 | Verbakel et al. |
| 2017/0356094 A1 | 12/2017 | Winther-Jensen et al. |
| 2018/0138517 A1 | 5/2018 | Swiegers et al. |
| 2018/0363151 A1 | 12/2018 | Swiegers et al. |
| 2018/0363154 A1 | 12/2018 | Swiegers et al. |
| 2018/0371630 A1 | 12/2018 | Swiegers et al. |
| 2019/0006695 A1 | 1/2019 | Swiegers et al. |
| 2019/0027759 A1 | 1/2019 | Swiegers et al. |
| 2019/0157685 A1 | 5/2019 | Swiegers et al. |
| 2019/0256991 A1 | 8/2019 | Swiegers et al. |
| 2020/0083541 A1 | 3/2020 | Swiegers et al. |
| 2020/0161720 A1 | 5/2020 | Swiegers et al. |
| 2021/0020975 A1 | 1/2021 | Seymour et al. |
| 2021/0172074 A1 | 6/2021 | Hahn et al. |
| 2021/0336284 A1 | 10/2021 | Seymour et al. |
| 2022/0145479 A1 | 5/2022 | Seymour et al. |

FOREIGN PATENT DOCUMENTS

| | | | |
|---|---|---|---|
| CA | 2238738 C | 4/2010 |
| CN | 101333667 A | 12/2008 |
| CN | 101906642 A | 12/2010 |
| CN | 102810688 A | 12/2012 |
| DE | 3603254 A1 | 8/1987 |
| DE | 29823321 U1 | 8/1999 |
| DE | 102014207584 A1 | 10/2015 |
| EP | 0014596 B1 | 9/1983 |
| EP | 0150017 A1 | 7/1985 |
| EP | 0047792 B1 | 12/1988 |
| EP | 0144002 B1 | 1/1989 |
| EP | 0427340 A1 | 5/1991 |
| EP | 0580072 A1 | 1/1994 |
| EP | 0624283 B1 | 12/1995 |
| EP | 1449292 A2 | 8/2004 |
| EP | 1777323 A2 | 4/2007 |
| EP | 1843415 A1 | 10/2007 |
| EP | 1985727 A1 | 10/2008 |
| EP | 2149626 A1 | 2/2010 |
| EP | 1658652 B1 | 1/2011 |
| FR | 2877731 B1 | 1/2007 |
| GB | 679334 A | 9/1952 |
| GB | 957168 A | 5/1964 |
| GB | 1267619 A | 3/1972 |
| GB | 1367810 A | 9/1974 |
| GB | 1387794 A | 3/1975 |
| GB | 1542690 A | 3/1979 |
| GB | 2066293 A | 7/1981 |
| JP | S5375173 A | 7/1978 |
| JP | S5687684 A | 7/1981 |
| JP | S58516 B2 | 1/1983 |
| JP | H04507433 A | 12/1992 |
| JP | H05198319 A | 8/1993 |
| JP | H05266932 A | 10/1993 |
| JP | H0737559 A | 2/1995 |
| JP | H0754181 A | 2/1995 |
| JP | H07211323 A | 8/1995 |
| JP | H07258877 A | 10/1995 |
| JP | H081165 A | 1/1996 |
| JP | H08264186 A | 10/1996 |
| JP | H08325772 A | 12/1996 |
| JP | 3051893 B2 | 6/2000 |
| JP | 3072333 B2 | 7/2000 |
| JP | 3122734 B2 | 1/2001 |
| JP | 2001131787 A | 5/2001 |
| JP | 3324943 B2 | 9/2002 |
| JP | 2004225148 A | 8/2004 |
| JP | 2004250736 A | 9/2004 |
| JP | 2004292284 A | 10/2004 |
| JP | 2005330514 A | 12/2005 |
| JP | 2007526948 A | 9/2007 |
| JP | 2009144214 A | 7/2009 |
| JP | 2009263708 A | 11/2009 |
| JP | 2012036413 A | 2/2012 |
| JP | 2012041578 A | 3/2012 |
| JP | 5040097 B2 | 10/2012 |
| JP | 2013023717 A | 2/2013 |
| JP | 2015211036 A | 11/2015 |
| JP | 2016160512 A | 9/2016 |
| JP | 2016204698 A | 12/2016 |
| KR | 20010029825 A | 4/2001 |
| KR | 20040078553 A | 9/2004 |
| RU | 2170477 C1 | 7/2001 |
| RU | 93804 U1 | 5/2010 |
| RU | 2647841 C2 | 3/2018 |
| WO | WO 1981/000032 A1 | 1/1981 |
| WO | WO 1998/032900 A1 | 7/1998 |
| WO | 1998042617 A2 | 10/1998 |
| WO | WO 2000/034184 A1 | 6/2000 |
| WO | WO 2000/044057 A1 | 7/2000 |
| WO | WO 2001/066362 A1 | 9/2001 |
| WO | WO 2001/071842 A2 | 9/2001 |
| WO | WO 2001/085635 A1 | 11/2001 |
| WO | WO 2002/014224 A1 | 2/2002 |
| WO | WO 2002/025324 A1 | 3/2002 |
| WO | WO 2002/038833 A1 | 5/2002 |
| WO | WO 2003/035939 A2 | 5/2003 |
| WO | WO 2003/041204 A1 | 5/2003 |
| WO | WO 2003/042430 A2 | 5/2003 |
| WO | WO 2003/047011 A2 | 6/2003 |
| WO | WO 2004/003645 A1 | 1/2004 |
| WO | WO 2004/076721 A2 | 9/2004 |
| WO | WO 2007/002989 A1 | 1/2007 |
| WO | WO 2008/036962 A2 | 3/2008 |
| WO | WO 2009/015127 A1 | 1/2009 |
| WO | WO 2011/089904 A1 | 7/2011 |
| WO | WO 2011/094295 A1 | 8/2011 |
| WO | WO 2011/146558 A1 | 11/2011 |
| WO | WO 2012/012558 A2 | 1/2012 |
| WO | WO 2012/021550 A2 | 2/2012 |
| WO | WO 2012/023535 A1 | 2/2012 |
| WO | WO 2012/075546 A1 | 6/2012 |
| WO | WO 2012/122600 A1 | 9/2012 |
| WO | WO 2013/037902 A2 | 3/2013 |
| WO | WO 2013/066331 A2 | 5/2013 |
| WO | WO 2013/185163 A1 | 12/2013 |
| WO | WO 2013/185170 A1 | 12/2013 |
| WO | WO 2014/082170 A1 | 6/2014 |
| WO | WO 2014/088628 A1 | 6/2014 |
| WO | WO 2014/139822 A1 | 9/2014 |
| WO | WO 2015/085369 A1 | 6/2015 |
| WO | WO 2017/100846 A1 | 6/2017 |
| WO | 2018182005 A1 | 10/2018 |
| WO | WO 2018/213889 A1 | 11/2018 |
| WO | WO 2018/213891 A1 | 11/2018 |

OTHER PUBLICATIONS

Australian Examination Report No. 1 issued in AU2014295913 Sep. 6, 2018.

(56) References Cited

OTHER PUBLICATIONS

Bolwin et al. (1995) "Preparation of porous electrodes and laminated electrode-membrane structures for polymer electrolyte fuel cells (PEFC)," Solid State Ionics 77: 324-330.
Brimblecombe et al. (2010) " A tandem water-splitting devise based on a bio-inspired manganese catalyst," Chemistry and Sustainability 3:1146-1150.
Brimblecombe et al. (2010) "Solar driven water oxidation by a bioinspired manganese molecular catalyst," J Am Chem Soc. 132(9):2892-2894.
Brussieux et al. (2011) "Controlled Electrochemical Gas Bubble Release from Electrodes Entirely and Partially Covered with Hydrophobic Materials," Electrochemica Acta 56: 7194-7201.
Chaparro et al. (2006) "Study of electrochemical instabilities of PEMFC electrodes in aqueous solution by means of membrane inlet mass spectrometry," Journal of Electroanalytical Chemistry 591: 69-73.
Chinese First Office Action with English translation, dated Nov. 1, 2019, in Chinese Patent Application No. 201680081806.5, 26 pp.
Chinese First Office Action with English translation, dated Sep. 29, 2019, in Chinese Patent Application No. 201680081802.7, 23 pp.
Chinese Search Report and First 1st Office Action issued in CN201480054296-3 on Sep. 27, 2017.
Chinese Second Office Action issued in CN 201480054296-3 on Jun. 11, 2018.
Chinese Third Office Action issued in CN201480054296-3 on Feb. 19, 2019.
Cooper et al. (2006) "Electrical test methods for on-line fuel cell ohmic resistance measurement," Power Sources 160, 1088-1095.
De Gregorio et al. (2005) "A PTFE membrane for the in situ extraction of dissolved gases in natural waters: Theory and applications," Geochemistry Geophysics Geosystems 6(9): 1-13.
Dictionary.com "adjacent," available online at http://www.dictionary.com/browse/adjacent, accessed Aug. 2017, 1 pp.
Dictionary.com "contiguous," available online at http://www.dictionary.com/browse/contiguous?s=t, accessed Aug. 2017, 1 pp.
Dunn et al. (2010) "High-Capacity, High Pressure Electrolysis System with Renewable Power Sources," Hydrogen Energy Systems Avalence LLC., DOE Merit Review, Project #PD029, 16 pages.
Engelhardt (1904) "Monographs on Applied Electrochemistry, vol. 1. The Electrolysis of Water, Processes and Applications," The Chemical Publishing Company, Easton, PA. Available online at https://ia800704.us.archive.org/27/items/electrolysisofwa00engerich/electrolysisofwa00engerich.pdf, Accessed Dec. 18, 2020, 164 pages.
English translation of Official Action issued in Japanese Patent Application No. 2015-516377 on Jan. 17, 2017, 9 pp.
European Communication pursuant to Article 94-3 issued in EP13804108-2 on May 8, 2019, 5 pp.
European Communication pursuant to Article 94-3 issued in EP14832027-8 on Jan. 18, 2018, 6 pp.
European Communication pursuant to Article 94-3 issued in EP14832027-8 on Jun. 5, 2019, 4 pp.
European Extended Search Report issued in EP14832027-8 on Dec. 9, 2016.
Extended European Search Report, dated Sep. 23, 2022, corresponding to European Application No. 20747688.
Extended European Search Report, dated Jul. 22, 2019, corresponding to European Application No. 16874136.1 (filed Dec. 14, 2016), 6 pp.
Extended European Search Report, dated Sep. 9, 2019, corresponding to European Application No. 16874133.8 (filed Dec. 14, 2016), 10 pp.
Extended European Search Report, dated Sep. 9, 2019, corresponding to European Application No. 16874137.9 (filed Dec. 14, 2016), 8 pp.
Fuel Cells Etc. (2013) "What is the Purpose of a Gas Diffusion Layer (GDL)?" 2 pp.

Gillespie et al. (2015) "Performance evaluation of a membraneless divergent electrode-flow-through (DEFT) alkaline electrolyser based on optimisation of electrolytic flow and electrode gap," Journal of Power Sources 293: 228-235.
Government of India "First Examination Report," dated Jul. 10, 2020, corresponding with Indian Patent Application No. 201617003021, 7 pp.
Guo et al. (2009) "Chemical power sources battery principle and manufacturing technology," Central South University Press, 1st ed: 8 pp.
Hodges et al. (Mar. 15, 2022) "A high-performance capillary-fed electrolysis cell promises more cost-competitive renewable hydrogen" Nature Communications 13: 1304, 11 pp.
International Preliminary Report on Patentability for PCT/AU2014/050161, dated Oct. 26, 2015, 23 pp.
International Preliminary Report on Patentability issued in International Application No. PCT/AU2013/000617 on Apr. 24, 2014, 25 pp.
International Preliminary Report on Patentability issued in PCT/AU2014/050158 on Feb. 2, 2016, 4 pp.
International Preliminary Report on Patentability, dated Dec. 5, 2019, corresponding to International Patent Application No. PCT/AU2018/050506, 9 pp.
International Preliminary Report on Patentability, dated Dec. 5, 2019, corresponding to International Patent Application No. PCT/AU2018/050508, 10 pp.
International Search Report and Written Opinion for PCT/AU2014/050161, mailed Sep. 26, 2014, 10 pp.
International Search Report and Written Opinion of the ISA/AU for PCT/AU2012/000668 mailed on Jul. 17, 2012, 10 pages.
International Search Report and Written Opinion of the ISA/AU for PCT/AU2013/000616 mailed on Jul. 10, 2013, 10 pages.
International Search Report and Written Opinion, dated Jun. 12, 2020, corresponding to International Patent Application No. PCT/US2020/016135, 11 pp.
Ioroi et al. (2003) "Influence of PTFE coating on gas diffusion backing for unitized regenerative polymer electrolyte fuel cells," Journal of Power Sources 124: 385-389.
Jang et al. (2010) "Effect of water electrolysis catalysts on carbon corrosion in polymer electrolyte membrane fuel cells," J. Am. Chem. Soc. 132(42): 14700-14701.
Japanese Office Action for Application No. 2016-251299, issued Dec. 19, 2017, 13 pp.
Jensen et al. (2008) "Pre-investigation of Water Electrolysis, PSO-F&U 2006-1-6287, Draft Apr. 2, 2008," Technical University of Denmark and the Danish RISO, 195 pp.
Jiang et al. (2009) "A planar microfabricated electrolyzer for hydrogen and oxygen generation," Journal of Power Sources 188: 256-260.
Kadyk et al. (Dec. 2016) "How to Enhance Gas Removal from Porous Electrodes?," Scientific Reports 6: 1-14.
Kato et al. (2003) "Highly efficient water splitting into H2 and O2 over lanthanum-doped NaTaO3 photocatalysts with high crystallinity and surface nanostructure," J. Am. Chem. Soc. 125: 3082-3089.
Kelly et al. (2011) "Generation of high-pressure hydrogen for fuel cell electric vehicles using photovoltaic-powered water electrolysis," Int. J. Hydrogen Energy 36(24): 15803-15825, Abstract Only (3 pages).
Kudo et al. (2009) "Heterogeneous photocatalyst materials for water splitting," Chem. Soc. Rev. 38: 253-278.
Lee et al. (2013) "Dynamic Simulation of PEM Water Electrolysis and Comparison with Experiments," Int. J. Electrochem. Sci. 8: 235-248.
Marangio et al. (2011) "Concept of a high pressure PEM electrolyser prototype," International Journal of Hydrogen Energy 36: 7807-7815.
Marini et al. (2012) "Advanced alkaline water electrolysis," Electrochimica Acta 82: 384-391.
Maxwell (2012) "Passive Gas-Liquid Separation Using Hydrophobic Porous Polymer Membranes: A study on the Effect of Operating Pressure on Membrane Area Requirement," Univ. North Florida Graduate Thesis, 63 pp.

(56) References Cited

OTHER PUBLICATIONS

Mohapatra et al. (2007) "Design of a highly efficient photoelectric cell for hydrogen generation by water splitting: application of TiO2-xCx nanotubes as a photoanode and Pt/TiO2 nanotubes as a cathode," J. Phys. Chem. C2007: 8677-8685.
Nieminen et al. (2010) "Comparative performance analysis of PEM and solid oxide steam electrolysers," International Journal of Hydrogen Energy 35: 10842-10850.
Notice of Allowance and Fee(s) Due, dated May 24, 2019, corresponding to U.S. Appl. No. 15/468,770, 7 pp.
Notice of Allowance and Fee(s) Due, dated Oct. 3, 2019, corresponding to U.S. Appl. No. 16/146,353, 31 pp.
Office Action issued by the Mexican Patent Office regarding related Mexican Patent Application No. MX/E/2017/048895, issued Oct. 16, 2017, 3 pages.
Osterloh (2008) "Inorganic materials as catalysts for photochemical splitting of water," Chem. Mater. 20: 35-54.
Paidar et al. (2016) "Membrane electrolysis—History, current status and perspective," Electrochim. Acta 209: 737-756.
PCT International Search Report and Written Opinion dated Feb. 7, 2017 for PCT/AU2016/051230, 10 pp.
PCT International Search Report and Written Opinion dated Jan. 31, 2017 for PCT/AU2016/051235, 11 pp.
PCT International Search Report and Written Opinion dated Mar. 2, 2017 for PCT/AU2016/051231, 15 pp.
PCT International Search Report and Written Opinion dated Mar. 2, 2017 for PCT/AU2016/051234, 8 pp.
PCT International Search Report and Written Opinion issued in PCT/AU2014/050158 on Nov. 4, 2014, 7 pp.
PCT International Search Report and Written Opinion issued in PCT/AU2014/050162 on Nov. 6, 2014, 12 pp.
Pletcher et al. (2011) "Prospects for alkaline zero gap water electrolysers for hydrogen production," International Journal of Hydrogen Energy 36: 15089-15104.
Russian Search Report issued in RU 2016106698/07 on May 16, 2018.
Schefold et al. (2011) "Long Term Testing of Short Stacks with Solid Oxide Cells for Water Electrolysis," ECS Transactions 35(1): 2915-2927.
Search Report issued in European Application No. EP 16184214 dated Oct. 26, 2016 (6 pages).
Sheng et al. (2010) "Hydrogen Oxidation and Evolution Reaction Kinetics on Platinum: Acid vs Alkaline Electrolytes," Journal of The Electrochemical Society 157, B1529-B1536.
Shinagawa et al. (2015) "Insight on Tafel slopes from a microkinetic analysis of aqueous electrocatalysis for energy conversion," Sci Rep 5, 13801, 21 pp.
Supplementary Partial European Search Report, dated May 2, 2022, corresponding to European Application No. 20747688.
Swiegers et al. (Feb. 2021) "The Prospects of Developing a Highly Energy-Efficient Water Electrolyser by Eliminating or Mitigating Bubble Effects," Sustainable Energy Fuels, Accepted Manuscript, doi: 10.1039/D0SE01886D, 31 pages total.
"The Production of Hydrogen and Oxygen through the Electrolysis of Water," (1891) Scientific American Supplement, New York, XXXII(819). Available online at https://www.gutenberg.org/files/14990/14990-h/14990-h.htm, Accessed Dec. 18, 2020, 8 pages.
Tributsch (2008) "Photovoltaic hydrogen generation," International Journal of Hydrogen Energy 33: 5911-5930.
U.S. Patent Office, Office Action mailed Oct. 27, 2017 I U.S. Appl. No. 14/406,797, 9 pages.
US Office Action, dated Jul. 16, 2019, corresponding to U.S. Appl. No. 15/850,279, 4 pp.
USPTO, Final Office Action dated Oct. 25, 2019, corresponding to U.S. Appl. No. 15/638,780, 9 pp.
USPTO, Final Office Action mailed Aug. 17, 2017 in U.S. Appl. No. 14/407,014, 8 pages.
USPTO, Non-Final Office Action dated Apr. 29, 2020, corresponding to U.S. Appl. No. 16/062,063, 11 pp.
USPTO, Non-Final Office Action dated Jun. 26, 2020, corresponding to U.S. Appl. No. 16/061,975, 6 pp.
USPTO, Non-Final Office Action dated Mar. 9, 2020, corresponding to U.S. Appl. No. 16/062,019, 6 pp.
USPTO, Non-Final Office Action dated Oct. 18, 2019, corresponding to U.S. Appl. No. 16/061,910, 7 pp.
USPTO, Non-Final Office Action mailed Mar. 23, 2017 in U.S. Appl. No. 14/407,014, 9 pages.
USPTO, Notice of Allowance and Fee(s) Due dated Dec. 11, 2019, corresponding to U.S. Appl. No. 15/850,279, 25 pp.
USPTO, Notice of Allowance and Fee(s) Due dated Jan. 16, 2020, corresponding to U.S. Appl. No. 16/010,842, 13 pp.
USPTO, Notice of Allowance and Fee(s) Due dated Oct. 29, 2020, corresponding to U.S. Appl. No. 16/259,632, 9 pp.
Vermeiren et al. (2009) " Electrode diaphragm electrode assembly for alkaline water electrolysers," Int'l Journal of Hydrogen Energy 34: 9305-9315.
Wagner et al. (publicly available Dec. 2017) "An Electrochemical Cell with Gortex-based Electrodes Capable of Extracting Pure Hydrogen from Highly Dilute Hydrogen-Methan Mixtures," Energy Environ. Sci. 11: 172-184 (published 2018).
Winther-Jensen et al. (2008) "High rates of oxygen reduction over a vapor phase-polymerized PEDOT electrode," Science 321: 671-674.
Winther-Jensen et al. (2010) "Conducting Polymer Composite Materials for Hydrogen Generation," Advanced Materials 22: 1727-1730.
Winther-Jensen et al. (2012) "Towards hydrogen production using a breathable electrode structure to directly separate gases in the water splitting reaction," Elsevier Ltd., International Journal of Hydrogen Energy 37: 8185-8189.
Written Opinion of the International Preliminary Examination Authority for PCT/AU2014/050161, dated May 26, 2015, 9 pp.
Yin et al. (2007) "Enhanced solar water-splitting efficiency using core/sheath heterostructure CdS/TiO2 nanotube arrays," Nanotechnology 18(495608): 1-6.
Zeng et al. (2010) "Recent progress in alkaline water electrolysis for hydrogen production and applications," Progress in Energy and Combustion Science 36: 307-326.
U.S. Appl. No. 13/992,983, filed Oct. 28, 2013.
U.S. Appl. No. 14/406,797, filed Mar. 2, 2015.
U.S. Appl. No. 14/407,014, filed Dec. 10, 2014.
U.S. Appl. No. 14/564,910, filed Dec. 9, 2014.
U.S. Appl. No. 14/908,258, filed Jan. 28, 2016.
U.S. Appl. No. 14/908,334, filed Jan. 28, 2016.
U.S. Appl. No. 14/908,352, filed Jan. 28, 2016.
U.S. Appl. No. 14/908,444, filed Jan. 28, 2016.
U.S. Appl. No. 15/103,026, filed Jun. 9, 2016.
U.S. Appl. No. 15/103,042, filed Jun. 9, 2016.
U.S. Appl. No. 15/103,052, filed Jun. 9, 2016.
U.S. Appl. No. 15/468,770, filed Mar. 24, 2017.
U.S. Appl. No. 15/638,780, filed Jun. 30, 2017.
U.S. Appl. No. 15/850,279, filed Dec. 21, 2017.
U.S. Appl. No. 16/010,842, filed Jun. 18, 2018.
U.S. Appl. No. 16/061,975, filed Jun. 13, 2018.
U.S. Appl. No. 16/061,910, filed Jun. 13, 2018.
U.S. Appl. No. 16/062,019, filed Jun. 13, 2018.
U.S. Appl. No. 16/062,063, filed Jun. 13, 2018.
U.S. Appl. No. 16/146,353, filed Sep. 28, 2018.
U.S. Appl. No. 16/198,477, filed Nov. 21, 2018.
U.S. Appl. No. 16/259,632, filed Jan. 28, 2019.
U.S. Appl. No. 16/615,602, filed Nov. 21, 2019.
U.S. Appl. No. 16/615,616, filed Nov. 21, 2019.
U.S. Appl. No. 16/732,760, filed Jan. 2, 2020.
U.S. Appl. No. 16/829,197, filed Mar. 25, 2020.
U.S. Appl. No. 17/426,726, filed Jan. 31, 2020.
U.S. Appl. No. 17/060,320, filed Oct. 1, 2020.
U.S. Appl. No. 17/228,271, filed Apr. 12, 2021.
Notice of Allowance issued on Sep. 22, 2023, in Canadian Patent Application No. 3, 127,358.
Office Action issued on Jan. 4, 2024, in Chinese Patent Application No. 202080024266.3 and machine translation.

ELECTROCHEMICAL SYSTEM WITH CONFINED ELECTROLYTE

CROSS-REFERENCE TO RELATED APPLICATIONS

This Application is a continuation of U.S. patent application Ser. No. 17/228,271, filed Apr. 12, 2021, which application is a continuation of U.S. patent application Ser. No. 17/060,320, filed Oct. 1, 2020, now U.S. patent Ser. No. 11/005,117, which application is a continuation of International Application Serial No. PCT/US2020/016135 filed Jan. 31, 2020 (WO 2020/160424), which application claims the benefit of and priority to U.S. Provisional Patent Application No. 62/799,966, filed Feb. 1, 2019, titled "Electrochemical System with Confined Electrolyte," and U.S. Provisional Patent Application No. 62/854,757, filed May 30, 2019, titled "Water Electrolyzers with Thermal Management Systems," all of which are incorporated herein by reference in its entirety to the extent not inconsistent herewith.

FIELD OF THE INVENTION

This invention generally relates to electrochemical systems and in some embodiments more particularly to cells, stacks, and operations of electrochemical cells for producing gaseous products.

BACKGROUND

Hydrogen in molecular form ($H_2$) has been a valuable commodity for many decades. Uses typically include ammonia production, catalytic cracking of hydrocarbons and other industrial applications.

It has been recognized that hydrogen can also serve as an energy-storage medium and will play a role in the future energy economy. One expected method for use of hydrogen in this application is through injection into the natural gas grid where enormous capacity for the storage of energy in the form of hydrogen gas is already available. This application is called Power to Gas (P2G) or Green Hydrogen. As P2G and Green Hydrogen technologies proliferate, electric power consumed by electrolyzers will increase.

Existing electrolyzer systems have many shortcomings which result in reduced efficiency and increased system complexity leading to increased costs.

SUMMARY

Various embodiments will be described in detail with reference to the accompanying drawings. References made to particular examples and implementations are for illustrative purposes and are not intended to preclude the inclusion of other implementations. Various components, sub-systems, and modifications of the various embodiments may be re-combined with components, sub-systems, or modifications of other embodiments to form further embodiments.

Water electrolysis for the production of hydrogen and other gases is currently performed in systems of two types. Polymer electrolyte membrane (or proton exchange membrane, both abbreviated PEM) electrolyzers utilize a solid polymer electrolyte to conduct protons between positive and negative electrodes. Such systems generally involve pumping pure deionized water into a stack of cells, each containing a solid polymer electrolyte. Solid polymer electrolytes are generally very thin, historically allowing for higher current density operation with low resistance. Additionally, solid polymer electrolyte membranes tend to substantially limit the quantity of gas that crosses from one half-cell to the other through the membrane, resulting in higher gas purity and reduced losses.

However, solid polymer electrolytes also tend to be more resistive to ionic conductivity than liquid or gel electrolytes. The higher resistance leads to increased efficiency losses. PEM electrolyzers also tend to require costly materials such as platinum-group metal catalysts and titanium or gold support structures. As a result, despite their advantages, PEM electrolyzers can be quite expensive to build and operate.

The second type, alkaline electrolyzers, use an aqueous alkaline electrolyte solution to conduct ions between the electrodes across an electrically non-conductive separator. Alkaline electrolyzers benefit from lower cost materials and may potentially display improved performance owing to the highly conductive nature of the electrolyte. As compared with PEM electrolyzers, alkaline electrolyzers tend to be less susceptible to gas crossover. Nonetheless, alkaline electrolyzers remain susceptible to other complications. One of the most substantial shortcomings of alkaline electrolyzers is the parasitic losses caused by so-called "shunt currents."

In conventional state-of-the-art alkaline electrolyzers, the water split in the electrolysis reaction is the water in the aqueous electrolyte solution which is pumped through a cell stack. Circulating the electrolyte through the stacks provides various benefits such as exposing the electrodes to a well-mixed electrolyte solution, allowing for the removal of dissolved gases external to the cells, and allowing for simple maintenance of hydroxide (or other electrolyte) concentration.

Such alkaline electrolyte systems generally use a manifold or other common electrolyte flow channel to direct electrolyte into and through all cells of a stack. These common channels containing electrically conductive electrolyte create a conductive path between cells through which electric currents can flow. These "shunt currents" do not support the desired electrochemical reactions in the cells, and therefore represent a form of inefficiency sometimes referred to as a parasitic loss.

Most approaches to mitigating or eliminating shunt currents tend to be minimally effective, costly, or introduce further system inefficiencies. Nonetheless, the costs and inefficiencies imposed by shunt currents are widely accepted as the inevitable cost of operating an alkaline electrolyzer.

Applicants have taken a different approach to avoiding shunt currents, and in the process realized several other advantages. Instead of fighting the challenges of a flowing electrolyte system architecture, Applicants have developed an electrochemical cell stack architecture that eliminates the need for flowing electrolyte through an entire cell stack by integrating functions of the "balance of plant" into each layer of the cell-stack. In such a system, each cell or half-cell contains a quantity of electrolyte that is confined within the cell or half-cell and fluidically isolated from electrolyte in any other cells. The electrolyte thus confined is not capable of creating unwanted electrically conductive paths with other cells within the stack. As a result, parasitic shunt currents are avoided. The avoidance of shunt current provides for benefits unavailable to conventional alkaline electrolyzers, such as the ability to incorporate more cells within a single stack than is feasible in conventional alkaline electrolyzers, thereby achieving higher stack voltages and improving overall efficiency. The lack of flowing electrolyte also allows for improved gas purities by mitigating forces tending to cause gas produced in one half-cell to cross over into a counter-half-cell (generally referred to herein as "gas crossover" or simply "crossover").

Notwithstanding references herein to alkaline electrolysis systems, the skilled artisan will recognize that the devices, systems, and methods described herein may be applied to a wide range of electrochemical cells and systems, including various chemical-producing electrolyzers, battery systems, fuel cell systems, electrochemical systems for purifying water, materials, or chemicals, and other electrochemical cell systems.

The unique architecture described herein comprises several components and sub-systems, including an electrolyte confinement system for substantially confining aqueous electrolyte within each cell or half-cell; an electrolyte capture system for capturing any electrolyte that escapes the confinement system; an electrolyte return system for returning electrolyte that escapes a cell or half-cell back into the cell or half-cell chamber; a passive pressure-driven water supply system for supplying a make-up liquid (e.g., deionized water in some embodiments) to the each cell or half-cell to replace liquid (e.g., water) consumed in electrochemical reactions within the cell while substantially minimizing pressure differences across the separator membrane; a high-pressure gas collection system for collecting produced gases at high pressures without requiring external gas compression; and a volume expansion system for accommodating volumetric expansion and contraction of fluids within a cell.

Some embodiments of the subsystems above may also utilize a unique pump configuration referred to herein as a "ventricular" pump. Embodiments of electrochemical systems herein may also be configured to passively but automatically control various pressure regions and pressure gradients under active fluid pressure control at a minimal number of points within the system.

In some embodiments, an electrochemical system as described herein may be operated at a high absolute pressure while maintaining relative pressure-differences between various pressure regions within desired ranges. Operating a gas-producing electrochemical cell at a high absolute pressure may allow for gases to be produced and delivered at high pressures without the need (or with a reduced need) for additional compressors to pressurize gases to a pressure required by a particular application.

In various embodiments, an electrochemical system to be operated at an elevated pressure (i.e., at an absolute pressure greater than atmospheric pressure) may include a cell-stack and/or other structures within one or more pressure vessels or by using a plate-and-frame cell stack arranged to hold the desired degree of pressure relative to atmospheric pressure. In some embodiments, operating at a high absolute pressure may be accomplished by pre-pressurizing one or more cell regions with an inert or minimally-reactive gas (e.g., nitrogen, argon, helium, neon, or various combinations of these or other gases). In other embodiments, a high operating pressure may be initially established and/or maintained by pumping a make-up liquid (e.g., water) into the cell-stack at a desired absolute pressure. For example, in some embodiments, an electrochemical system may be pre-pressurized and operated at an absolute pressure of about 10 bar, 20 bar, 30 bar, 40 bar, 50 bar, 60 bar, 70 bar, 80 bar, 90 bar, 100 bar, 10 atm, 20 atm, 30 atm, 40 atm, 50 atm, 60 atm, 70 atm, 80 atm, 90 atm, 100 atm or more.

In an aspect, provided is a stack of confined electrolyte electrochemical cells, each individual electrochemical cell independently comprising: a) a first half-cell chamber containing a first volume of electrolyte in contact with a first electrode; b) a second half-cell chamber containing a second volume of electrolyte in contact with a counter-electrode; c) a separator separating the first half-cell chamber from the second half-cell chamber; and d) a first electrolyte capture-and-return system in communication with the first half-cell, the electrolyte capture-and-return system configured to receive a captured electrolyte from the first volume of electrolyte escaping the first half-cell chamber and to drive the captured electrolyte back into at least one of the first half-cell chamber and the second half-cell chamber via an electrolyte return conduit. In embodiments, the capture-and-return systems in an individual electrochemical cell may be fluidically isolated from capture-and-return systems in the other electrochemical cells in the stack. In embodiments, the stack may comprise a bipolar stack comprising bipolar plates joining adjacent cells.

The electrochemical system may further comprise a second electrolyte capture-and-return system in communication with the second half-cell chamber, the second electrolyte capture-and-return system configured to capture electrolyte from the second volume of electrolyte escaping the second half-cell chamber and to drive the captured electrolyte back into the first half-cell chamber, the second half-cell chamber or both.

The first and second electrolyte capture-and-return systems may comprise a liquid-gas separation chamber. The liquid-gas separation chamber may use gravity to allow for the capture of liquid electrolyte while having a headspace to allow for the flow of gas, including product gas. The first and second electrolyte capture-and-return systems may be in fluid communication with a gas removal manifold and the gas removal manifold is in fluid communication with each of the electrochemical cells in the stack. The first and second electrolyte capture-and-return systems may comprise a gas-removal liquid. The gas removal liquid may be maintained within a pre-determined range of fluid pressure.

The electrochemical system may further comprise a fluid escape element through which gas and liquid electrolyte escapes the first half-cell chamber or second half-cell chamber into the first electrolyte capture-and-return system or second electrolyte capture-and-return system, respectively. The fluid escape element may be configured to impart a resistance to fluid flow. The fluid escape element may be configured to impart a non-linear resistance to fluid flow, wherein the fluid comprises both gas and liquid. The fluid escape element may comprise an egress channel through which a bolus of gas and a bolus of liquid may only flow in series. A fluid escape element can comprise one or more egress channels and/or one or more membranes, according to embodiments described herein. In some embodiments, a fluid escape element can consist of one or more egress channels and/or one or more membranes, according to embodiments described herein.

The electrolyte capture-and-return system may comprise an electrolyte capture volume. The electrolyte capture-and-return system may comprise a membrane positioned between said half-cell and said electrolyte capture volume. The electrolyte capture-and-return system may comprise a membrane to promote the flow of product gas while maintaining electrolyte in the electrolyte capture-and-return system, for example, positioned between a product gas outlet and the electrolyte capture volume. The electrolyte capture-and-return system may comprise one or more pumps configured to return the electrolyte to the first half-cell or the second half-cell. The electrolyte capture-and-return system is configured to allow for mixing of the electrolyte, for example, between the two half-cells of an electrochemical cell.

The electrochemical system may be a battery, a flow battery or a fuel cell. The electrochemical system may be an alkaline electrolysis cell. The electrochemical cell generates hydrogen gas and oxygen gas as product gasses. The electrolyte may be an aqueous alkaline solution. The electrolyte may comprise potassium hydroxide, sodium hydroxide, lithium hydroxide or any combination thereof.

The electrochemical cell may further comprise an expansion chamber in fluid communication with the first half-cell and the second half-cell, the expansion chamber being configured to allow volumetric expansion of fluid in one or both of the half-cell chambers as gas bubbles in the electrolyte increase the volume of the mixed fluid. The expansion chamber is configured to reduce pressure gradients between the first half-cell and the second half-cell. The expansion chamber may maintain substantially equal pressure in the first half-cell and the second half-cell, for example, a difference in pressure of less than 2 atm, less than 1 atm, less than 0.5 atm or optionally, less than 0.25 atm. The expansion chamber may be in fluid communication with the electrolyte capture-and-return system.

The electrochemical cell may further comprise an expansion resistor in operable communication with the expansion chamber. The expansion resistor may be a spring, a bellow, a diaphragm, a balloon, a physical property of the expansion chamber or any combination thereof. The expansion chamber may comprise a divider to maintain separation of the electrolyte from the first half-cell and the second half-cell. Such a divider may also be configured to allow fluid pressures in the two half-cells to equilibrate. The expansion chamber may impart a resistance to expansion causing an increase in fluid pressure when the expansion chamber volume exceeds a threshold volume. The expansion chamber may impart a resistance to expansion causing fluid pressure to increase linearly, geometrically, exponentially, stepwise, or otherwise with increasing expansion chamber volume.

The electrochemical cell further comprises a make-up liquid supply in fluid communication with the electrochemical cell to provide make-up liquid to the first half-cell, the second half-cell, or both. The electrochemical system may further comprise a one-way valve positioned between the make-up liquid supply and the electrochemical cell. The make-up liquid supply may be provided to the electrochemical cell by a supply manifold in fluid communication with each electrochemical cell in the stack. The one-way valve may regulate the flow of make-up liquid into the electrochemical cell based on a pressure differential between the supply manifold and the electrochemical cell. The make-up liquid may be deionized water.

The electrochemical system may further comprise a pump, for example, a ventricular pump or a positive displacement pump, operably connected to each of the electrochemical cells and arranged to drive captured electrolyte from the electrolyte capture volume into one or both of the half-cell chambers. The pump may be capable of driving both liquid and gas through the electrolyte return channel. The pump may comprise a compressible section of conduit surrounded by an actuation fluid. Each electrochemical cell in the stack may comprise at least one compressible conduit section in a housing volume exterior to the electrochemical cell. Each half-cell chamber of each electrochemical cell in the stack may comprise a compressible conduit section in the housing volume. The actuation fluid may be contained in a continuous housing volume surrounding compressible conduit sections of all electrochemical cells.

The stack may be arranged in a prismatic layered configuration (e.g., a plate-and-frame configuration), a concentric cylindrical configuration, a spiral jellyroll configuration, a prismatic jellyroll configuration or any other rolled jellyroll configuration.

In an aspect, provided is an electrochemical system comprising: at least one confined electrolyte electrochemical cell comprising: a) the electrolyte; b) a first half-cell comprising a first electrode in contact with first portion of the electrolyte and a first electrolyte capture-and-return system; c) a second half-cell comprising a second electrode in contact with a second portion of the electrolyte and a second electrolyte capture-and-return system; and d) a separator separating the first half-cell from the second half-cell; wherein the first electrolyte capture-and-return system is configured to capture the electrolyte displaced from the first half-cell and return at least a portion of the displaced electrolyte to the first half-cell without mixing with electrolyte from any other cell; and wherein the second electrolyte capture-and-return system is configured to capture electrolyte displaced from the second half-cell and return at least a portion of the displaced electrolyte to the second half-cell without mixing with electrolyte from any other cell.

The first electrolyte capture-and-return system may be fluidically isolated from the second half-cell and wherein the second electrolyte capture-and-return system may be fluidically isolated from the first half-cell.

In an aspect, provided is a method of generating at least one product gas comprising: i) providing an electrochemical system comprising: at least one electrochemical cell comprising: a) an electrolyte; b) a first half-cell having a first electrode in communication with first portion of the electrolyte and a first electrolyte capture-and-return system; c) a second half-cell including a second electrode in communication with a second portion of the electrolyte and a second electrolyte capture-and-return system; and d) a separator separating the first half-cell from the second half-cell; ii) capturing at least a portion of electrolyte displaced from the first half-cell via a first electrolyte capture-and-return system and returning the captured electrolyte to the first half-cell; iii) capturing at least a portion of electrolyte displaced from the second half-cell via a second electrolyte capture-and-return system and returning the captured electrolyte to the second half-cell; and iv) reacting the electrolyte in the at least one electrochemical cell thereby generating at least one product gas.

In an aspect, provided is a method for generating hydrogen and oxygen gas comprising: i) providing an electrolyzer comprising: a plurality of electrochemical cells each independently comprising: a) an aqueous electrolyte; b) a first half-cell having a first electrode in communication with first portion of the aqueous electrolyte, a first electrolyte capture-and-return system and an oxygen gas capture system; c) a second half-cell including a second electrode in communication with a second portion of the aqueous electrolyte and a second electrolyte capture-and-return system and a hydrogen gas capture system; and d) a separator separating the first half-cell from the second half-cell ii) capturing at least a portion of electrolyte displaced from the first half-cell via a first electrolyte capture-and-return system and returning the captured electrolyte to the first half-cell; iii) capturing at least a portion of electrolyte displaced from the second half-cell via a second electrolyte capture-and-return system and returning the captured electrolyte to the second half-cell; and iv) electrolyzing the aqueous electrolyte in each of the electrochemical cells, thereby generating hydrogen and oxygen gas, wherein each oxygen gas capture system is in fluid communication with one another and each hydrogen gas capture system is in fluid communication with one another. In some aspects, the capture-and-return systems may be configured to capture 80%, 90%, 95%, 99%, 99.9%, 99.99% or between 99% and 100% (% mass or % volume) of the electrolyte displaced from either half-cell in liquid form and/or in the form of mist and to return at least the captured electrolyte to the cell or half-cell from which it was captured.

The first electrolyte capture-and-return system may be in fluid communication with the second electrolyte capture-and-return system in each of the electrochemical cells. The first electrolyte capture-and-return system and the second electrolyte capture-and-return system may be associated with an individual electrochemical cell and fluidically isolated from electrolyte capture-and-return systems of other electrochemical cells in the electrolyzer.

A person having skill in the art will recognize that the various embodiments and features described as an electrochemical system may be integrated with the various methods, electrolyzers and other systems described herein.

In an aspect, provided is a ventricular pump comprising: a) a housing chamber containing an actuation fluid; b) a plurality of conduits, each extending through a portion of the housing, each conduit comprising a compressible region located within the housing and surrounded by the actuation fluid; each conduit having an upstream one-way valve located upstream of the compressible region, and a downstream one-way valve located downstream of the compressible region; c) an actuator in communication with the housing chamber; wherein the actuator is configured to apply a compressive and/or expansive force to the actuation fluid sufficient to at least partially compress the compressible regions of the conduits.

The actuation fluid may be an incompressible liquid or a compressible gas. Some or all of the upstream one-way valves and some or all of the downstream one-way valves may be located outside the housing chamber. Some or all of the upstream one-way valves and some or all of the downstream one-way valves may be located inside the housing chamber.

Some or all of the compressible regions of the conduits may comprise a section of compressible tubing. The electrochemical systems and methods described herein may use some or all of the electrolyte return conduits as the conduit of the ventricular pump as described herein. The ventricular pump housing may comprise a portion of an electrochemical stack housing.

The housing chamber may comprise a plurality of apertures in layers of a stacked plate-and-frame cell-stack structure. The ventricular pump may further comprise a compressible conduit section positioned within or adjacent to the housing configured to allow an actuation fluid within the housing chamber to drive fluid within the compressible conduit section.

BRIEF DESCRIPTION OF THE DRAWINGS

The following detailed description sets forth illustrative embodiments with reference to the accompanying drawings, of which.

DETAILED DESCRIPTION

Principles, embodiments and examples of each of these sub-systems will be described in detail below with reference to the drawings, which schematically illustrate various examples of electrochemical systems exhibiting confined electrolyte features and components. The drawings comprise schematic projections in the sense that they illustrate components in ways intended to promote understanding and description, despite the fact that many actual implementations of such systems will typically utilize very different relative orientations, scales, and positions of various components.

Figure 1:
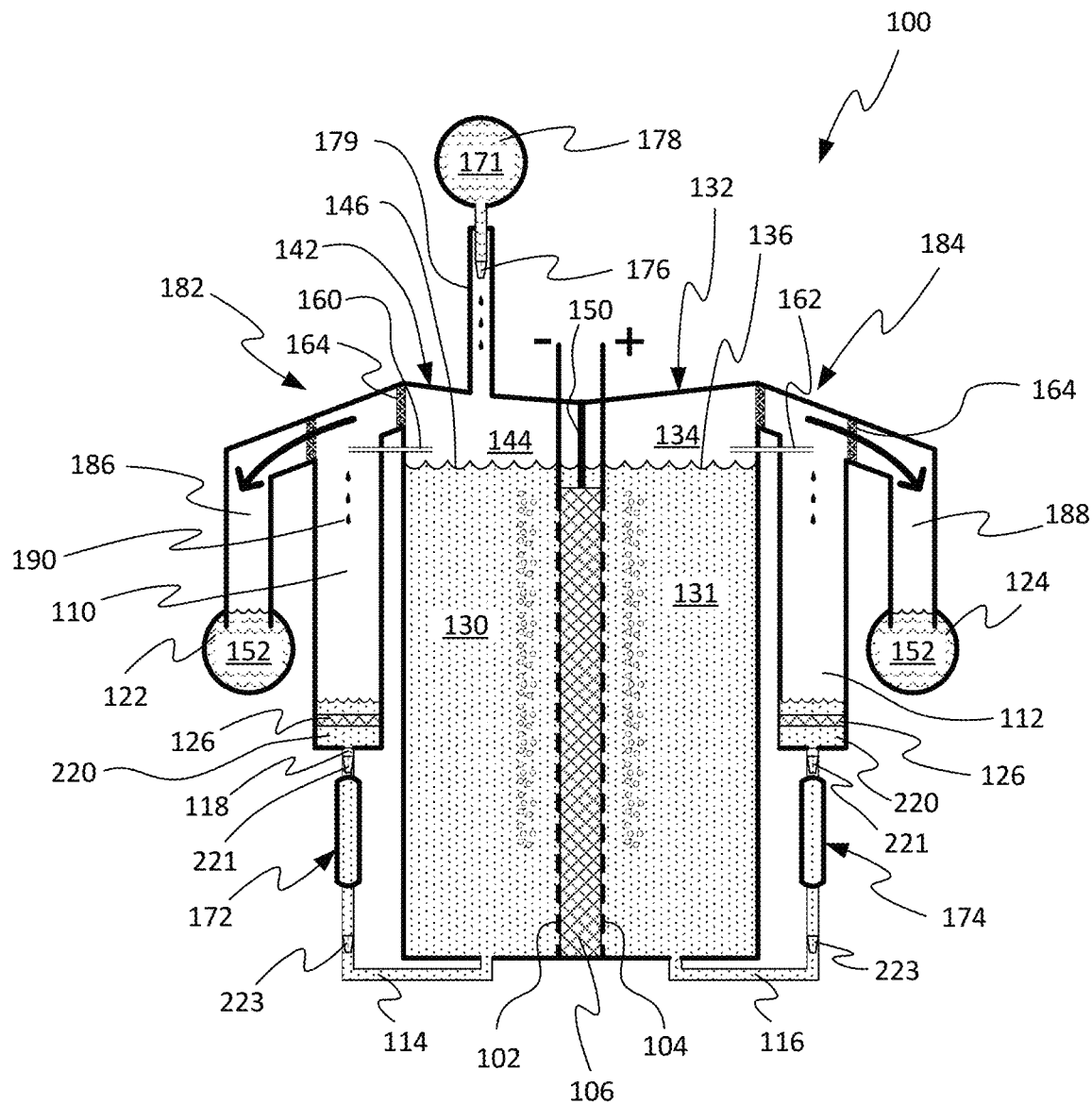
FIG. 1 is a schematic illustration of an electrochemical system with a cell-specific electrolyte capture and return system.

For example, the relative size and orientations of various illustrated components do not necessarily correlate with actual sizes or orientations of such components in real physical implementations of such systems. As a specific example, FIG. 1 shows all components of a cell 100 in a common cross-sectional plane, including cell electrodes 102, 104, separator 106, electrolyte capture volumes 110, 112, electrolyte return channels 114, 116, and gas removal manifolds 122, 124. Any electrolyte capture volume can be interchangeably referred to herein as an electrolyte collection volume. In some actual implementations, the cell's separator 106 and electrodes 102, 104 may be oriented at a right angle to the illustrated orientation such that their two-dimensional surfaces lie in planes parallel to the illustrated cross-sections. Many different orientations and arrangements are possible, including the example arrangement described herein with reference to FIG. 12 and FIG. 13, among many other possible arrangements.

In a cell-stack based on the system of FIG. 1, each cell in the cell-stack may include half-cell chambers 142, 132, a separator 106, electrodes 102, 104, fluid escape elements 160, 162, 164, electrolyte collection volumes 110, 112, gas collection volumes 186, 188, electrolyte return conduits 114, 116. The supply manifold 178 and the gas-removal manifolds 122, 124 may be joined to all other cells in the stack and to additional processing equipment, for example as described herein with reference to FIG. 4. In some embodiments, fluid flows in the electrolyte return conduits 114, 116 may be driven by a single pump actuator (e.g., ventricular pump actuator) joined to return conduits in several (or all) cells of a cell-stack.

Definitions of Terms Used

As used herein, the term "cell" or "full-cell" refers to an electrochemical unit in which an anode electrode is connected to a cathode electrode by an ionically-conductive pathway (e.g., a liquid electrolyte, salt bridge, solid polymer electrolyte or other pathway for ionic conductivity). A cell may be electrolytic (driven by a voltage and/or current applied across the electrodes) or galvanic (in which spontaneous reactions produce a voltage difference between the electrodes which may drive an electrical current through an external electrical circuit).

As used herein, the term "half-cell" may refer to a single electrode of a cell (either cathode or anode) or structures associated with that one electrode. Because a full cell requires two electrodes interacting with one another electrochemically, an electrode interacting with an identified half-cell may be referred to as a "counter electrode" or a "counter half-cell" with respect to the first identified half-cell. The voltage of a half-cell may be measured relative to a "reference electrode" thereby providing a "half-cell voltage." A full-cell voltage is the (typically absolute value) sum of half-cell voltages of both half-cell electrodes of a full cell.

Generally, an electrochemical cell comprises a first half-cell and a second half-cell, wherein the first half-cell comprises a first electrode and the second half-cell comprises a second electrode, the second electrode being at a different potential with respect to the first electrode. Generally, an opposite polarity reaction occurs in one half-cell compared to the other half-cell. For example, during operation of the electrochemical cell, oxidation (or, reduction) occurs in the first half-cell and reduction (or, oxidation, respectively) occurs in the second half-cell. For example, during operation of the electrochemical cell, current flows into the first electrode of the first half-cell and current flows out of the second electrode of the second half-cell, or vice versa, when the first and second electrodes are in direct or indirect electrical communication with each other during the electrochemical cell's operation.

A "half-cell chamber" is a chamber or volume and/or structures comprising a half-cell or electrode thereof. For example, a first half-cell chamber may contain a first electrode (or at least a portion thereof, such as a surface of the first electrode), optionally an electrolyte, optionally a reactant species (such as reactant gas or liquid), and optionally a produced species (such as a produced gas), and optionally other structures such as compliant conductive gas egress layers, flow channels, or other structures. For example, a wall or volume-confining surface of a half-cell chamber can be a surface of an electrode, a bipolar plate, a cell-frame, or other structures. A boundary of a half-cell chamber can fully or partially correspond to a physical boundary, such as a physical surface of a physical object. A boundary of a half-cell chamber can fully or partially correspond to a non-physical boundary, such as a space, plane, imaginary surface, or position between the half-cell chamber and another chamber, volume, structure, or conduit. Typically, but not necessarily, two half-cell chambers (e.g., corresponding to an anode and a cathode) of a full cell are separated by a separator. Typically, any two half-cell chambers have mutually exclusive volumes (not overlapping volumes) with respect to each other.

As used herein, the term "fluid" refers to matter in a state capable of flow. Fluid may include liquid-only, gas-only, or mixtures of gas and liquid. In some cases, fluid may also include highly viscous liquids or "gel" materials. As used herein, "gas" refers to any material in a gaseous phase of matter under the pressure and temperature conditions obtaining in the system being described. For example, "gas" may include oxygen gas ($O_2$), hydrogen gas ($H_2$), chlorine gas ($Cl_2$), water vapor, or other gases or gas mixtures.

As used herein, two or more regions referred to as being in "fluid communication" with one another indicates a pathway by which fluid may travel between the regions. Such pathways may include channels, tubes, membranes, conduits, volumes, pipes, hoses, or other structures through which fluid (liquid and/or gas) may transport or be transported, such as by advection, convection, buoyancy, diffusion, flow, or other fluid transport mechanism. Unless otherwise specified, the term "fluid communication" may also include fluid pathways through which flow may be selectively or intermittently interrupted by a valve, or other structure. Regions in fluid communication can be in direct fluid communication or in indirect fluid communication. Two regions in indirect fluid communication may include intermediate pathways or structures through which a fluid may flow between the two regions. The term "fluidically connected" is also used herein to refer to regions that are in fluid communication.

As used herein, the term "electrolyte" may generally refer to any liquid or liquid-like substance (e.g., flowable gels) present in one or both half-cells of an electrochemical cell. Therefore, "electrolyte" may include alkaline electrolytes, acidic electrolytes, solutions containing reactants such as brine or seawater, deionized water, or other liquids or solutions. Example alkaline electrolytes may include aqueous alkaline solutions such as potassium hydroxide, sodium hydroxide, lithium hydroxide, or combinations thereof. Example acidic electrolytes may include acidic aqueous solutions such as hydrochloric acid, sulphuric acid, or others. Some electrolytes may comprise neutral pH aqueous solutions such as un-purified water, purified water, deionized water, or highly purified and/or deionized water. Electrolytes may also include ionic liquids, molten salts, or others.

The choice of electrolyte for a particular electrochemical system may be based on other system components. For example, if a separator membrane comprising an ionomer layer (also known as a "solid electrolyte" layer) is chosen, then the electrolyte may comprise substantially only purified and/or deionized water (although in some embodiments, some ionomer layer membranes, such as AEMs, may also be used with an alkaline or acidic electrolyte). If a separator membrane comprises a porous polymer, ceramic, or other membrane, then the electrolyte will typically comprise an alkaline or acidic solution. In the various embodiments described herein, the term "electrolyte" is used generically to encompass all of these configurations, unless otherwise specified.

As used herein, the term "make-up liquid" may include any liquid consumed in electrochemical reactions within an electrochemical cell such as those described herein. As the term suggests, in many embodiments make-up liquid is supplied to an electrochemical cell to make up for (i.e., replace) liquid consumed in the electrochemical reactions in that cell. In many cases, a make-up liquid may comprise water, such as high purity deionized water or less pure water. In some embodiments, a make-up liquid may include an electrolyte solution, which may be the same electrolyte used in other parts of the cell or an electrolyte solution with a different composition. In further embodiments, a make-up liquid may comprise other mixtures (aqueous or non-aqueous) of liquids, at least some components of which are expected to be consumed in the electrochemical cells.

As used herein, the term "deionized water" may refer to water that has been treated to remove at least solid particulates, dissolved or entrained (as bubbles) gases and dissolved ions. Deionized water may be deionized to varying degrees, which may be measured or reported in terms of electrical conductivity (or resistivity). Fully deionized water is typically reported as having an electrical resistance of over 18 megaohm-cm, or a conductivity of less than about 0.05555 microsiemen/cm. "Ultrapure" water typically refers to water with an electrical resistance of at least 1 megaohm-cm (or a conductivity of less than 1 microsiemen/cm). These measures are typically made at 25° C., as temperature has a strong influence on electrical conductivity (and resistance). Deionized water described for use in any aspects of systems and methods herein may have a conductivity (at 25° C.) of less than about 20 microsiemen/cm. In some embodiments or uses, deionized water having a conductivity less than about 1 microsiemen/cm or less than about microsiemen/cm may be used. Some embodiments or uses may use theoretically "pure" water having a conductivity of about 0.055 microsiemen/cm.

As used herein, the term "separator" or "separator membrane" may refer to any structure positioned between a positive electrode and a negative electrode of a common electrochemical cell and performing the function of creating an electrically non-conductive separation between the positive and negative electrodes while allowing ionic conductivity between the positive and negative electrodes. Separators may include open-structured spacers creating substantially zero ionic resistance or minimal resistance to ionic diffusion, or structures creating greater resistance to ionic diffusion such as porous, microporous, or nano-porous membranes (e.g., polymer membranes), gels, beads, solid electrically insulative and ion-conducting sheets (e.g., ionomers, "solid electrolyte" membranes, proton-exchange membranes, or anion exchange membranes), ceramics, or other structures or materials as described in further detail and examples herein. In some embodiments, the term "PEM separator" refers to a separator comprising a proton-exchange membrane (PEM) ionomer layer alone or in combination with other layers. In some embodiments, the term "AEM separator" refers to a separator comprising an anion-exchange membrane (AEM) ionomer layer alone or in combination with other layers.

As used herein, the term "liquid-gas separator" may refer to one or more structures capable of dividing a liquid-gas mixture into separate liquid and gas streams. Various example liquid-gas separator structures are shown and described herein below.

As used herein, the term "passive control" refers to control methods and mechanisms that do not rely on electronic controllers, sensors, electronically controlled actuators, electric motors or pumps (or other control) and that do not consume energy. "Passive" control methods and devices typically involve the use of self-managing feedback loops comprising materials or devices with particular properties, such as damping properties, deformation properties, resilience properties, or others. Passive control contrasts with "active" control methods as defined herein, which typically involve sensors that monitor system state or changes in state (e.g., temperature, pressure, pH, etc.) and/or powered actuators that maintain system conditions under control of an electronic controller. Such active control methods consume energy and are therefore parasitic in character when considering the energy consumption of the system as a whole.

"Capture-and-return system" refers to a system (including conduits, chambers, devices, membranes, elements, etc.) configured to collect electrolyte exiting a half-cell chamber and return it into the half-cell chamber and/or a counter-electrode half-cell chamber of the same cell. In an embodiment, for example, the capture-and-return system comprises an electrolyte collection volume (110, 112) and a gas separation volume (182, 184) to facilitate separation of product gas and electrolyte that has escaped the half-cell. The capture-and-return system may also comprise an electrolyte return conduit arranged and configured to return captured electrolyte into one or both half-cell chambers of the cell from which the electrolyte escaped, and an isolated a pump or pump component arranged and configured to drive the captured electrolyte through the electrolyte return conduit without mixing with electrolyte from any other cell of the stack. Various other useful components may be included in or used in conjunction with the capture-and-return system and described herein.

Cell regions, structures, or volumes may be referred to herein as being "fluidically isolated" from one or more other regions, structures, or volumes in the same cell or different cells. In such usage, the term "fluidically isolated" refers to those regions, structures, or volumes as being separated by one or more permanent, non-permeable fluid barriers that prevent direct fluid (gas and/or liquid) flow between those structures. Similarly, two or more regions, structures, or volumes may be referred to as being "electrically isolated" from one another, indicating that one or more electrically non-conductive (or electrically insulative) material or structure prevents electrical current from flowing from one to the other. In some embodiments, a capture-and-return system of a first cell or half-cell may be fluidically and/or electrically isolated from capture-and-return systems of other cells even if gas collected from the first cell or half-cell is merged with gas collected from the other cells or half-cells and even if make-up water is delivered to the cells or half-cells from a common supply. In some embodiments, electrolyte return systems of two or more cells or half-cells may be fluidically isolated from one another even if common pumping or actuation fluid drives ventricular pumps in both cells or half-cells. A system may also be fluidically isolated from other cells while allowing for electrical communication between cells (e.g., bipolar connections) or stacks (e.g., series or parallel electrical connections between stacks). When two regions are fluidically isolated from each other they are not in fluid communication with each other.

"Contact" refers to any operational communication between the electrolyte and an electrode including, for example, physical communication, chemical communication, electrochemical communication, and/or ionic communication, etc. For example, contact may refer to ionic communication between an electrode and electrolyte so that the electrolyte is capable of reacting chemically or electrochemically with species, catalysts, or structures in the electrode. An electrolyte may be in contact with multiple electrodes. The electrode may be partially or fully submerged in the electrolyte or ions present in the electrolyte may be conducted through a separator (e.g. a wetted or gelled separator or other wetted/wicking structure, a solid ionomer or other ion-conducting structures). Contact between an electrode and an electrolyte may involve one or more intermediate structures such as an interfacial layer or material such as an oxide layer or solid electrolyte interface layer.

"Stack" or "cell-stack" as used herein refers to any grouping of a plurality of electrochemical cells in an electrical, physical, and/or logical structure. Stack may refer to any physical geometry or configuration. For example, stack may refer to electrochemical cells connected in series, in parallel or in more complex configurations. Individual electrochemical cells within a stack may be arranged in a prismatic layered configuration, a concentric cylindrical configuration, a wound "jellyroll" configuration (spiral, prismatic, or otherwise rolled), or others. Nonetheless, the benefits of confining electrolyte to each cell are most beneficial in a series-connected bipolar cell-stack configuration. A cell-stack may be configured in a filter-press configuration, also referred to as a "plate-and-frame" configuration made up of multiple layers stacked together and comprising manifolds for delivering fluids to and removing fluids from each individual cell within the cell-stack.

A group of electrolysis cells may be arranged in a cell-stack in a bipolar configuration in which adjacent electrochemical cells are electrically joined in series via a conductive bipolar plate that is impermeable to both liquid and gas. Each bipolar plate has a positive charge on one side associated with a positive half-cell of a first cell and a negative charge on the opposite face associated with a negative half-cell of an immediately adjacent cell.

As used herein, the term "manifold" generally refers to a fluid-carrying channel that extends through a cell-stack and is common to all individual cells of a cell-stack. Manifolds or features described as "common" to all cells of a cell-stack may deliver fluid to or remove fluid from each of the cells. Common manifolds are in fluid communication with each cell in a fluidic parallel arrangement. One principal benefit of the confined-electrolyte systems described herein is that common manifolds containing electrically conductive fluids are broadly eliminated, thereby eliminating pathways for parasitic shunt currents.

As used herein, some features or structures are described as being "unique to" a particular cell or half-cell, or each cell (or half-cell) in a stack may be referred to as having a feature "unique to" each cell. A structure or feature identified as "unique to" a cell or half-cell is a structure or feature that may only interact with other structures or features of that respective cell or half-cell, respectively, without interacting with any structure, feature, gas or liquid from any other cells or half-cells.

As used herein, "consumption" of water, or water that is "consumed," refers to electrochemical, electrolytic, conversion or splitting of the water into hydrogen gas and oxygen gas. For example, a rate at which water, such as process water, is consumed in a cell refers to the rate at which the water is electrochemically converted, or split, into hydrogen gas and oxygen gas in the cell. The rate of water consumption in a cell depends factors including, but not limited to, temperature associated with the cell (e.g., the temperature of process water, electrode temperatures, and/or other solid cell components), pressure associated with the cell (such as a fluid pressure in one or both chambers of the cell), and/or electrical current applied to the cell and the availability of electrode reaction sites sufficiently wetted with process water to allow electrochemical reactions to occur efficiently.

The term "ion-exchange electrolyzer" is used herein as a generic term encompassing electrolyzers utilizing solid-polymer electrolyte membranes configured to exchange anions and/or cations (including protons). Therefore, the term "ion-exchange electrolyzer" includes electrolyzers utilizing a PEM (proton exchange membrane) (also known as a cation exchange membrane, abbreviated CEM), an AEM (anion exchange membrane), or other membrane comprising, consisting of or consisting essentially of an ionomer material. Such membranes may be made as independent free-standing structures (e.g., a sheet of material) or may be integrated with a positive or negative electrode such as by coating one or more electrode surfaces with one or more layers of ionomer (and optionally other polymers) to form a membrane-electrode assembly (MEA).

"Ionomers" are generally defined as polymers made up of alternating repeat units of electrically neutral units and ionized units covalently bonded to a polymer backbone. Such ionized units are often carboxylic acid groups. Depending on the nature of the ionic groups chemically attached to a polymer backbone, ionic polymers (ionomers) may be divided into cationomers, anionomers, and ampholytes which contain both cationic and anionic groups. Although relatively few ionomer membranes are available commercially, a wide range of ionomer materials have been studied as described, for example in "Ionomers; Synthesis, Structure, Properties and Applications" edited by M. R. Tant, K. A. Mauritz, and G. L. Wilkes (1997, ISBN-13: 978-0751403923). Example ionomers include ethylene acrylic acid copolymer (EAA), sold under the tradenames SUR-LYN® and NUCREL®, by DuPont®.

Example PEM materials include sulfonated tetrafluoroethylene-based fluoropolymer-copolymers (e.g., perfluorosulfonic acid or PFSA) such as the category of membranes from DUPONT® known by the trademark NAFION®. Example AEM membranes include various membranes sold by Dioxide Materials under the trademark SUSTANION®. The company FUMATECH BWT GmbH also sells various ionomer membranes under the trademarks FUMAPEM®, and FUMASEP®, FUMION®, and FUMEA®, any of which may be used in an ion-exchange electrolyzer as described herein. Membranes comprising any other PEM, AEM or other ionomer materials may also be used in ion-exchange electrolyzers as described herein.

References herein to catalysts, such as hydrogen evolution catalysts, oxygen evolution catalysts, or others, are intended to include any catalyst known to be capable of catalyzing the identified reaction, and may include platinum-group metals, precious metals, noble metals, base metals, alloys of two or more metals, high-surface-area carbon, high-surface area metal or metal alloy structures, conductive polymers, or other materials demonstrated to catalyze a desired electrochemical or chemical reaction.

In various embodiments, the architecture, systems, and methods described herein may be applied to various electrochemical systems and processes. For example, in some embodiments, an electrochemical system having features described herein may be an alkaline electrolyzer system in which an aqueous alkaline hydroxide electrolyte (e.g., potassium hydroxide, sodium hydroxide, lithium hydroxide, or combinations thereof) is used to split water in the electrolyte into hydrogen gas at the negative electrode and oxygen gas at the positive electrode. In other embodiments, electrochemical systems as described herein may use other liquid electrolytes, such as acidic aqueous solutions, neutral pH aqueous solutions, ionic liquids, molten salts, or others.

Although some embodiments herein are described with reference to systems optimized for electrolytic splitting of water into hydrogen and oxygen gases, the various systems, methods, structures, and embodiments described herein may also be applied to other electrochemical systems sharing structural or functional similarities with the systems described herein.

Introduction to Confined Electrolyte System Components & Concepts

FIG. 1 schematically illustrates one cell and other components of an electrolyzer system configured to confine electrolyte to a cell 100. The illustrated cell 100 includes a positive electrode 104 and a negative electrode 102 spaced from one another by a separator 106. The positive electrode 104 is shown within a positive half-cell chamber 132 with a volume of positive electrolyte 131 submerging the positive electrode 104 and a positive gas headspace 134 shown above a level 136 of the electrolyte 131. Similarly, the negative electrode 102 is shown in a negative half-cell chamber 142 which contains a volume of negative electrolyte 130 submerging the negative electrode 102 and a negative gas headspace 144 is shown above the level 146 of the electrolyte 130. As will be described in various embodiments herein, a gas headspace may or may not be present in one or both half-cell chambers.

In some embodiments, a headspace divider 150 may be present to separate a headspace into separate positive headspace 134 (headspace of the positive-polarity half-cell) and negative headspace 144 (headspace of the negative-polarity half-cell) regions, thereby preventing gases produced by the electrodes 104, 102 from mixing. In various embodiments, the separator 106 or other cell components may also be configured to minimize or prevent gas crossover from one half-cell chamber to the other.

In some embodiments, the negative headspace region 144 may be in communication with a negative gas removal manifold 122, and the positive headspace region 134 may be in communication with a positive gas removal manifold 124. In some embodiments, one or both gas removal manifolds 122, 124 may contain a gas-removal liquid 152.

In various embodiments, one or more fluid escape elements 160, 162, 164 may provide a pathway between each half-cell chamber 132, 142 and a corresponding gas removal manifold 124, 122. Such fluid escape elements 160, 162, 164 may be configured to allow the escape of gas from the half-cell chamber 132, 142 while substantially limiting a quantity of liquid electrolyte 130, 131 that escapes from the half-cell chamber 132, 142. In some embodiments, the fluid escape element may also be configured to maintain a desired pressure differential between a respective half-cell chamber and a corresponding gas removal manifold. For example, various gas escape elements may be configured to maintain a pressure differential of about 0.01 mbar to about 1 bar or more. FIG. 1 illustrates multiple fluid escape element structures and locations, the details of which will be further described herein below.

In some embodiments, the negative half-cell chamber 142 and the positive half-cell chamber 132 may also be in communication with respective electrolyte collection volume 110, 112. Each electrolyte collection volume 110, 112 may be in fluid communication with a respective electrolyte return conduit 114, 116 which may return electrolyte to the respective half-cell chamber under the force of one or more pumps 172, 174.

FIG. 1 also illustrates a supply inlet 176 configured to deliver make-up liquid from a supply manifold 178 to the cell 100 to replace liquid consumed or otherwise removed from the cell, including liquid that is consumed by being converted to one or more gases at the electrodes 102, 104 and removed from the cell via the gas removal manifolds 122, 124. Make-up liquid may also replace liquid removed from the cell in vapor form (e.g., water vapor). In the case of a water electrolyzer system for producing hydrogen from water, the make-up liquid may be substantially pure water, such as deionized water or other water of sufficient purity for a particular application. In other embodiments, the make-up liquid may comprise some quantity of an electrolyte liquid or other liquid mixed with water.

In various embodiments, an electrochemical system containing features and advantages as described herein may be constructed in monopolar or bipolar stack configurations. In some embodiments, features and sub-systems described herein may be integrated into individual layers and cells within a cell stack. In some embodiments, some features or subsystems may be integrated into a stack, while others may be provided external to a stack. Example monopolar and bipolar stack configurations are described on pages 33-39 of the publication entitled "Pre-investigation of Water Electrolysis, PSO-F&U 2006-1-6287, Draft 04-02-2008" by J. O. Jensen, V. Bandur. N. J. Bjerrum, S. H. Jensen, S. Ebbesen, M. Mogensen, N. Trophoj, L. Yde, of the Technical University of Denmark and the Danish RISO, which is referred to herein as the "Jensen Report."

Water electrolyzers traditionally have been grouped in two classifications—unipolar and bipolar. In unipolar electrolyzers, electrodes of the same polarity are electrically connected to one another in parallel. The oldest form of industrial electrolysis of water uses the tank electrolyzer in which a series of electrodes, anodes and cathodes alternately, are suspended vertically and parallel to one another in a tank partially filled with electrolyte. Alternate electrodes, usually cathodes, are surrounded by diaphragms that prevent the passage of gas from one electrode compartment to another. The diaphragm is impermeable to gas, but permeable to the cell's electrolyte. The whole assembly is hung from a series of gas collectors. A single tank-type cell usually contains a number of electrodes, and all electrodes of the same polarity are connected in parallel, electrically.

In bipolar electrolyzers, electrodes are connected to one another in electrical series. Electrolyzers of the bipolar design may comprise a single massive assembly of a relatively large number of electrodes, each of which is cathodic on one side and anodic on the other. More recent electrolyzer designs use stacks so that the positive electrode of one cell is directly connected to the negative electrode of the next. A bipolar assembly of cells has superficial resemblance to a filter press because the electrolyte is manifolded to flow through each cell in parallel while hydrogen and oxygen exit lines are similarly manifolded through the stack. The assembly is held together by a number of heavy longitudinal tie bolts, in a manner similar to that of the plate- and frame filter press. Each electrode is insulated from, and electrically in series with its neighbor; and each pair of electrodes, with separating diaphragm, forms an individual cell unit. In practice, filter-press-type cells are usually constructed with separate electrodes in each cell that are electrically connected through a solid metal (or other conductive material) separator plate (a "bipolar plate") that serves as an electrical conductor while keeping the hydrogen cavity of one cell separate from the oxygen cavity of the next. The direction of current flow is from one end of the "cell-stack" to the other. A bipolar electrolyser may thus contain from ten to several hundred individual cells in series. Because the cells of the filter-press-type electrolyzer can be relatively thin, a large gas output can be achieved from a relatively small piece of equipment.

Figure 2:
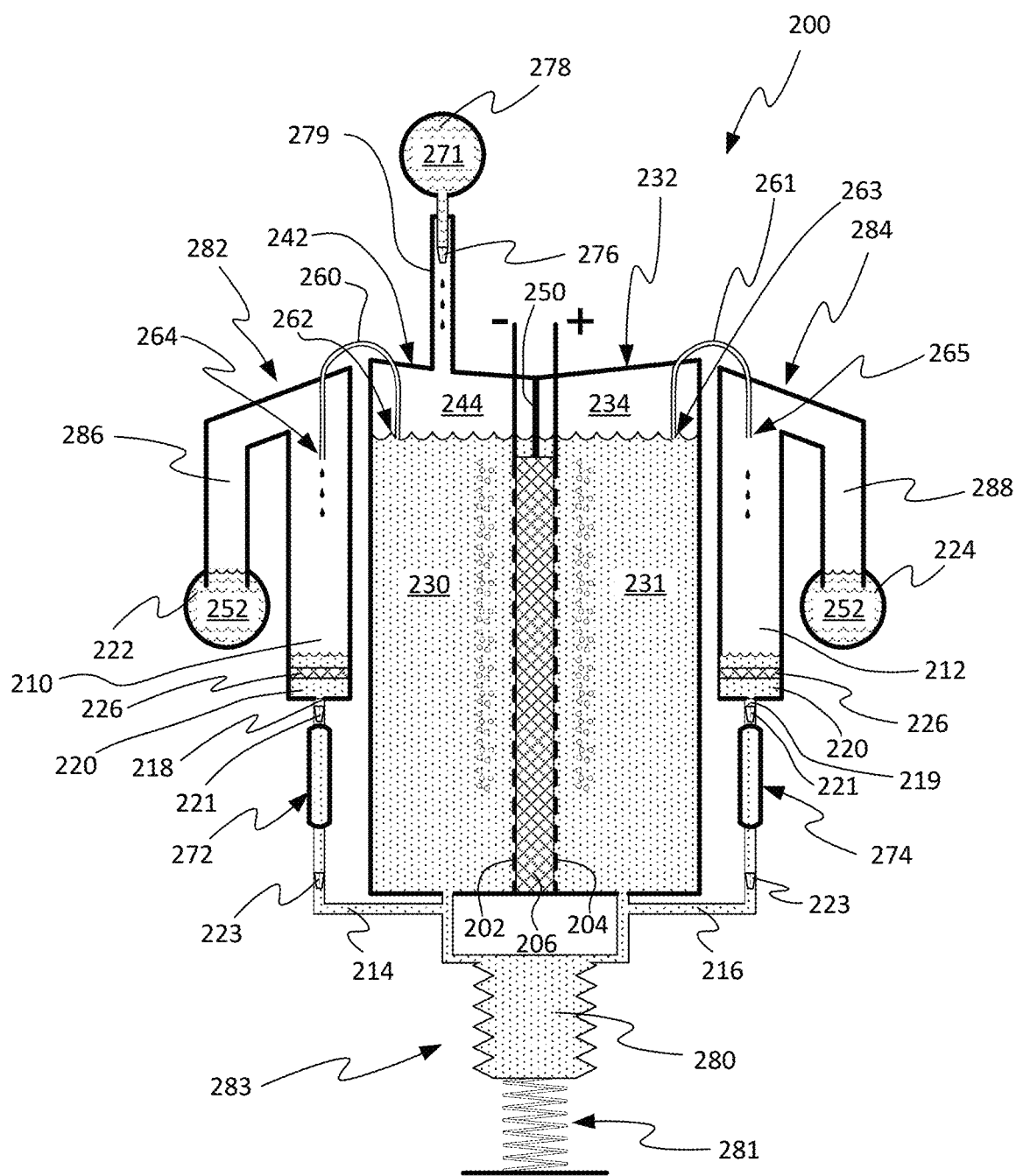
FIG. 2 is a schematic illustration of an electrochemical system with cell-specific electrolyte capture and return and volume expansion systems.

In some embodiments as shown in FIG. 2, the electrolyte return conduits 114, 116 may also be in fluid communication with an expansion volume 280 configured to allow volume expansion of the contents of one or both half-cell chambers. In some embodiments, a fluid conduit may allow fluid communication between the positive electrolyte 131 and the negative electrolyte 130 at a location other than an expansion volume 280. Some example cell configurations with other electrolyte fluid communication regions are described herein with reference to FIG. 6-FIG. 9.

In a cell-stack based on the system of FIG. 2, each cell in the cell-stack may include half-cell chambers 242, 232, a separator 206, electrodes 202, 204, fluid escape elements 260, 261, electrolyte capture volumes 210, 212, electrolyte return conduits 214, 216, gas collection volumes 286, 288, and expansion volume 280. The supply manifold 278 and the gas-removal manifolds 222, 224 may be joined to all other cells in the stack and to additional processing equipment, for example as described herein with reference to FIG. 4. In some embodiments, fluid flows in the electrolyte return conduits 214, 216 may be driven by a single pump actuator (e.g., ventricular pump actuator) joined to return conduits in several (or all) cells of a cell-stack.

In various embodiments, an electrochemical system as described herein may be configured to automatically manage pressure relationships between various pressure regions. Cross-separator pressure differences tending to drive gas crossover can be minimized by maintaining and managing these various pressure regions. These pressure regions include a make-up liquid supply manifold, half-cell chambers, gas separation volumes, and gas removal manifolds. In various embodiments, these pressure regions may be maintained actively by closed-loop electronic controllers operating based on sensor input, or passively by structures with innate properties that will tend to dampen rapid pressure oscillations and/or structures that will perform a desired operation in response to a system condition.

Embodiments of an electrochemical system as described herein may be configured such that pressure in cell is increased by gas-generation reactions, and pressures in gas removal manifolds and a make-up liquid supply manifold may be independently controlled by one or more active controllers. As will be further described below, the half-cell chambers may be configured to resist flow of fluids leaving the half-cell, and such flow resistance may dampen the effect of pressure variations in controlled gas removal manifolds on the half-cell pressures.

Electrolyte Confinement System

The electrolyte confinement system generally comprises features and structures configured to retain the vast majority of electrolyte within each cell or half-cell chamber while allowing produced gas to escape the cell or half-cell chamber. Some features of the electrolyte confinement system may be configured to allow gas and electrolyte to escape a cell or half-cell chamber in a pressure-balanced manner that produces a minimal pressure differential across a cell separator.

As used herein, the term "cross-separator pressure differential" refers to a difference in fluid pressure between two half-cell chambers of a common cell, typically (but not necessarily) divided by a separator. As described herein, many cell configurations may include a separator membrane dividing a cell into half-cells and creating an electrically non-conductive separation between positive and negative electrodes of the cell. On the other hand, some cells may omit a separator membrane or may include other structures serving a similar purpose. The term "cross-separator pressure differential" is not intended to necessarily imply that a separator membrane is present in the cell, but merely refers to a difference in pressure between the two regions.

With reference to FIG. 1, the electrolyte confinement system may include at least one enclosed half-cell chamber 132 or 142 with one or more fluid escape elements 160, 162, 164 configured to allow produced gas to escape the half-cell chamber 132, 142. In some cases, a fluid escape element 160, 162, 164 may also be configured to allow a quantity of liquid electrolyte 130, 131 to escape the half-cell chamber 132, 142. The electrolyte confinement system may also include cell structures configured to separate a positive half-cell chamber 132 from a negative half-cell chamber 142. Such structures may include a separator membrane 106 and a headspace divider 150.

The fluid escape elements 160, 162, 164 may comprise structures that allow at least gas to escape a half-cell chamber 132, 142. In some embodiments, a fluid escape element may be configured to allow gas only or both gas and liquid to escape the half-cell chamber 132, 142 when fluid pressure exceeds a threshold. In this context, "fluid pressure" may refer to pressure of liquid electrolyte, pressure of a headspace gas, and/or pressure of a "froth" of gas bubbles and liquid electrolyte in a dispersed mixture.

In conventional electrolyzer systems, even if gas removal conduits are maintained at high gas pressures, gases produced at positive and/or negative electrodes are directed from half-cell chambers to gas removal conduits with few flow restrictions. In most conventional electrolyzers, gas removal conduits also function as out-flow conduits for electrolyte (or process water) which flows through each cell. However, if one electrode generates gas bubbles differently than the other electrode (e.g., significantly different bubble sizes, release rates, volumes, etc.), gases may mix with electrolytes at unpredictably different rates. This may lead to an unpredictable (and therefore uncontrollable) transient cross-separator pressure differential, which may in turn cause liquid and/or gas to rapidly cross through the separator from a momentarily higher-pressure half-cell to the momentarily lower-pressure half-cell. This "sloshing" effect can lead to unacceptably low gas purity of a product gas as well as potentially creating an explosive gas mixture.

As used herein, the term "gas separation volume", "gas separator", "gas-liquid separator," or "gas collection volume" may refer to one or more volumes external to a half-cell 132, 142 into which gas may flow on the way to being collected in a gas removal manifold 122, 124 while being separated from any liquid (e.g., electrolyte and/or make-up liquid) exiting the half-cell. For example, a gas-liquid separator, such as gas-liquid separator 184, can include gas collection volume(s) (e.g., 186) and electrolyte capture (collection) volume(s), such as electrolyte collection/capture volume 110. In various embodiments, a gas-liquid separator may comprise one or more volumes connected in fluid communication by one or more fluid pathways and providing separate outlets for gas and liquid. For example, in some embodiments, a gas collection volume may include an electrolyte capture volume 110, 112 (as described further herein) in addition to a gas removal manifold 122, 124 and any conduits or volumes (e.g., 186, 188) therebetween. As used herein, the terms "gas-liquid separator, "liquid-gas separator," "gas/liquid separator," and "liquid/gas separator" are interchangeable. In some embodiments, the terms "gas separator" and "gas-liquid separator" are interchangeable.

While references in this section are made to FIG. 1, the description is equally applicable to any other embodiments suggested or described herein. In some embodiments, a fluid escape element 160, 162, 164 may impart a resistance to flow in the flow path between a half-cell chamber 132, 142 and a corresponding gas-removal manifold 122, 124. Such a resistance to flow may be measurable as a pressure-drop across the fluid escape element 160, 162, 164. For example, in some embodiments, each half-cell chamber 132, 142 may be maintained at fluid pressures higher than its respective gas-liquid separator by creating a resistance to fluid (gas and/or electrolyte) flowing out of the half-cell chamber 132, 142. For example, in some embodiments, this may be accomplished by placing a flow-restricting fluid escape element 160 in a flow path between a half-cell chamber 132, 142 and a corresponding gas-liquid separator 182, 184. Limiting a fluid flow rate through a fluid escape element 160 may maintain a desired degree of back-pressure or resistance to fluid flow out of the half-cell chamber 132, 142. Such a flow resistance may beneficially maintain a desired pressure difference between an interior of a half-cell chamber 132, 142 and a corresponding gas-liquid separator 182, 184. Such flow-resisting structures may prevent transient fluctuations in pressures experienced by the gas-liquid separators 186, 184 from being transmitted to the half-cell chambers 132, 142, thereby mitigating fluctuations in pressure differences across a separator membrane.

A fluid pressure difference between an interior of a half-cell chamber 132, 142 in which a gas is produced and a gas-liquid separator 182, 184 arranged to collect the produced gas will be referred to herein as an "exit pressure differential." In some embodiments, the electrolyte collection volume 110, 112 and the gas-liquid separator 182, 184 are referred to as an electrolyte capture-and-return system. The electrolyte capture and return system, in some embodiments, may also include additional components such as pumps, return channels, valves and the like. In some embodiments, an electrolyte capture-and-return system includes one or more gas-liquid separators, such as gas-liquid separators 182 and 184, one or more fluid escape elements, such as one or more egress channels (e.g., 160, 162), and one or more pumps, preferably one or more pumps unique to the respective electrochemical cell or half-cell, such as pumps 172 and 174, which may be a ventricular pump as described herein with reference to FIG. 3A-3C.

In some embodiments, as in FIG. 1 and FIG. 2 (for example), an electrolyte capture volume 110 may be a separate volume from a gas collection volume 186, 188. In some embodiments, as shown for example in FIG. 3 (described in further detail below), an electrolyte capture volume 110, 112 may be the same volume as a volume that includes a gas collection manifold 122, 124.

The exit pressure difference across a fluid escape element (e.g., 160) may be very small (e.g., less than 1 psi; e.g., selected from range of 0.1 bar to 1 psi; e.g., 0.5±0.2 bar; e.g., less than or equal to 0.5 bar but greater than 0 bar) as long as the half-cell pressure exceeds the gas-liquid separator (or, gas removal manifold) pressure. In practical terms, a larger exit pressure differential may allow for greater damping of variations in a controlled gas-removal manifold pressure. In various embodiments, the size of an exit pressure difference between an interior of a half-cell chamber 132, 142 and a gas-liquid separator 182, 184 may be anywhere from a fraction of one (1) psi to one atmosphere (1 atm or about 15 psi) or more. In some particular embodiments, the exit pressure differential may be as small as about 0.1 bar up to about 1 bar or more. In some particular examples, the exit pressure differential may be at least 0.01 bar, at least bar, at least 0.1 bar, at least 0.2 bar, at least 0.3 bar, at least 0.4 bar, at least 0.5 bar, at least bar, at least 0.7 bar, at least, 0.8 bar, at least 0.9 bar at least 1 bar, or up to 2 bar or more. The exit pressure differential may be 0.05 atm to 0.35 atm, 0.35 atm to 0.7 atm, 1 atm to 2 atm, or more.

Therefore, in some embodiments, fluid escape elements 160 may be configured to limit a flow rate of fluids exiting a half-cell chamber 132, 134 and/or to establish a threshold fluid pressure to be exceeded before fluid will flow through the fluid escape element 160. Fluid escape elements described herein may generally fall into two categories: "series" elements and "parallel" elements.

Series fluid escape elements generally provide a single restricted pathway for the egress of fluid (i.e., gas, liquid, or mixtures of both). In a series element, liquid and gas must follow the same pathway from a high-pressure end to a low-pressure end. As used, herein, series fluid escape elements may be broadly referred to as "egress channels." FIG. 1 and FIG. 2 schematically illustrate example egress channels at 160, 260, and 261.

An egress channel (series fluid escape element) may generally comprise a long and narrow channel with one end located in a relatively high-pressure region (e.g., a half-cell chamber 132, 142, 232, or 242) and an opposite end located in a relatively low-pressure region (e.g., a gas-liquid separator 182, 184, 282, or 284). Egress channels may be "long and narrow" in that they have an interior cross-sectional area (in a plane perpendicular to its flow path) that is small relative to their total path-length. For example, an egress channel may have a total path length that is 5 times, 10 times, 100 times, 500 times, 1000 times, (or more) greater than a cross-sectional dimension (e.g., diameter) of the egress channel. In some cases, an egress channel may also include a tortuous path and/or mechanically-restricted conduits. Thus, in various embodiments, series fluid escape elements (or "egress channels") may comprise one-way check valves, "hypodermic" tubes, long and narrow channels, apertures (e.g., small openings in sheet or plate structures), or other series flow-restricting structures.

In some embodiments, a fluid escape element in the form of an egress channel may comprise a section of tube of a rigid or flexible material with a length several times longer than an internal cross-sectional area. Flow limiting channels may be made of materials impervious to fluids flowing through them, such as degradation by hot, alkaline, acidic, and/or other electrolytes that may be used.

Egress channels may beneficially provide a non-linear resistance to flow when the fluid is a mixture of liquid and gas. For example, an egress channel may apply a linear resistance to liquid flow, and a differently-linear resistance to gas flow, but a randomly dispersed mixture of liquid and gas passing through an egress channel will experience a non-linear resistance to flow. While not intending to be bound by any particular theory, it is believed the gas and liquid mixture may tend to pass through the egress channel as discrete pockets of gas and liquid of random volumes. The liquid pockets may tend to experience a greater resistance to flow due to surface tension interactions with the egress channel wall(s), while pockets of compressible gas which do not directly experience surface tension with the walls may tend to be held up by liquid pockets. Compressible gas pockets may also be compressed between liquid pockets in some cases. This non-linear flow resistance may be beneficial in maintaining at least a desired pressure difference between a half-cell chamber and a corresponding gas-liquid separator.

In various embodiment, different materials, material properties, and/or shapes of an egress channel may affect the degree of liquid flow resistance through the channel. For example, resistance to flow through a channel may be related to surface tension (or hydrophobicity as measured by contact angle with the material), wherein a material that exhibits higher surface-tension with the electrolyte (more hydrophilic, a smaller contact angle) may exert a greater flow resistance than a material exhibiting a lower surface tension (more hydrophobic, larger contact angle). Materials which exhibit a contact angle of less than 90° are generally referred to as being "hydrophilic" with respect to a particular fluid, whereas a material exhibiting a contact angle greater than 90° is generally referred to as being "hydrophobic" with respect to that material. In some embodiments, an egress channel material may be selected to be hydrophilic (exhibit a contact angle of less than 90°) relative to the electrolyte. If greater flow resistance is desired, an egress channel material may be selected to be hydrophobic (exhibit a contact angle of greater than 90°) relative to the electrolyte. In some embodiments, an egress channel may comprise a tube of a circular cross-section with an interior tube diameter that is approximately equal (within about 10% difference) to a diameter of a meniscus curve formed by the electrolyte sitting statically in the tube. The same approximate relationship may hold in the case of non-circular cross-sections (that is, a side-length of a square or rectangular cross-section channel may be approximately equal to the meniscus diameter).

In some implementations, an egress channel may be configured to produce a non-linear flow resistance that is "self-correcting" in that, a large volume of gas escaping through the egress channel will tend to cause a rise in liquid level within the half-cell chamber (e.g., as liquid is driven into the half-cell chamber by a pump and/or as make-up liquid enters the half-cell as further described below). When the liquid level rises to the level of the egress channel entrance, a volume of liquid may enter the egress channel which will tend to momentarily increase the flow resistance through the channel and correspondingly increasing pressure in the half-cell chamber as gas continues to be produced at the same rate as before the rise in flow resistance. These changes in pressure and liquid level occurring in each half-cell within a stack may be very small and may occur very quickly (within a second or less), meaning this self-correction may automatically correct for pressure changes too small to be corrected for with pressure regulators acting to control pressures in the gas-removal manifolds at the stack-level.

This same behavior may also be described as a passive closed-loop control system for minimizing pressure differences across the separator membrane by automatically reversing transient pressure changes. In this way, the electrolyte acts as a mechanical transducer, converting electrolyte liquid level to a differential pressure through the egress channel. Electrolyte level acts as a pressure sensor as decreasing fluid pressure in the half-cell corresponds to an increased liquid level. The electrolyte entering the egress channel (once electrolyte rises to the level of the egress channel inlet) increases the flow resistance through the egress channel, and thereby increases the pressure in the half-cell to return the half-cell chamber to a higher pressure. By providing such features and functions in both half-cell chambers, transient pressure changes in both half-cells may be rapidly returned to an equilibrium state, thereby balancing pressure differentials between the half-cells.

Therefore, in other embodiments, any other mechanism (including digitally-controlled electromechanical devices or other passively-operated control devices) may be used to increase a resistance to gas (and/or liquid) flow exiting a half-cell chamber in response to a decrease in that half-cell's pressure or a rise in electrolyte-level in the half-cell. In some embodiments, such control systems may be configured to achieve the desired pressure-balancing while substantially preventing electrolyte from escaping the half-cell. For example, in one embodiment, a floating valve may be configured to increase pressure drop (flow resistance) through a fluid escape element (e.g., a channel, membrane, or aperture) when a liquid level in the half-cell rises, and/or to decrease pressure drop (flow resistance) through the fluid escape element when a liquid level in the half-cell falls. In other embodiments, an electromechanically controlled valve (such as a solenoid valve) may be driven by an electronic controller programmed to increase flow resistance in response to one or more electrical or mechanical sensor signals indicating a drop in fluid pressure within a half-cell chamber. In some such embodiments, this pressure-balancing function may be achieved while omitting pumps associated with each half-cell.

In some embodiments, egress channels configured to serve as fluid escape elements may be formed integrally within other structures in a cell, such as a half-cell chamber wall (e.g., a cell-frame plate), a bipolar plate, cell structural elements, or other features. In some embodiments, egress channels may be formed in cell structures (e.g., cell-frames, cover sheets, or other cell-frame structures) by machining, laser-cutting, lithographic techniques, additive manufacturing techniques (e.g., 3D printing), or other methods. In other embodiments, egress channels may be formed by securing (e.g., embedding, attaching, over-molding, or otherwise) a separate structure (such as a tube, valve, channel, or others) made of a different material into a cell-frame structure. Egress channels may comprise straight linear paths, curved paths, or combinations of straight and curved paths.

In other embodiments, an egress channel may comprise a section of tubing bent or otherwise formed into a desired shape and embedded in or attached to a cell-structure such as a cell-frame plate, a bipolar plate, cell structural elements, or other features. For example, such a tube may be a circular cross-section tube made of a material impervious to electrolyte and exhibiting a desired degree of hydrophobicity or hydrophilicity with the electrolyte. In some particular examples, such a tube may be a metal or a metal alloy comprising metals such as nickel, titanium, aluminum, or others. Alternatively, such a tube may comprise or be made of one or more polymer materials such as polyamide (PA), poly(tetrafluoroethylene) (PTFE), polyvinylidine fluoride (PVDF), poly(vinyl chloride) (PVC), polysulfone (PSU), polyphenylsulfone (PPSU), polyetheretherketone (PEEK), FEP (fluorinated ethylene propylene), PFA (perfluoroalkoxy), ETFE (ethylene tetrafluoroethylene), or others. Tubes may be embedded in a cell-frame by over-molding, adhesives, solvents, welding, or other techniques.

For example, in some embodiments, an egress channel may have a spiral or helical section, such as a coiled tube. In other embodiments, an egress channel may have both curved segments and straight segments, straight segments and sharp-angled turns (e.g., bends of any acute or obtuse angle), or only straight segments. Egress channels may also be oriented in any configuration relative to gravity. In other words, egress channels may be oriented such that fluid flows upwards, downwards, horizontally, or various combinations of directions while traveling from inside a half-cell chamber to a point outside the half-cell chamber. In some embodiments, a filter may be positioned at an inlet end of an egress channel. Such a filter may comprise a porous metal (e.g., a metal mesh or foam), polymer, or other material suitable for allowing liquid and gas to pass through while trapping solid particles in the porous filter.

In some embodiments, fluid escape elements may comprise one or more one-way check valves, such as duckbill valves, poppet valves, ball check valves, diaphragm check valves, tilting disc check valves, flapper valves, lift check valves, umbrella check valves, piston check valves, swing check valves, dual plate (double-door) check valves, or others. One-way check valves may be made of any suitable material such as polymers, metals, ceramics, or other material or material combinations selected to be resistant to damage from the liquid electrolytes and gases contacting the valve. Check valves may be configured with a cracking pressure—that is a threshold pressure difference between a downstream-side of the valve and an upstream side that must be exceeded before fluid will flow through the valve. In some embodiments, the cracking pressure of a check valve may be selected to maintain a desired exit pressure differential between a half-cell chamber and a gas-liquid separator.

FIG. 1 also shows an egress channel fluid escape element 160 between the negative half-cell chamber 142 and its corresponding electrolyte capture volume 110. The egress channel element 160 is shown allowing a small quantity of liquid 190 to pass through the channel and drip into the electrolyte capture volume 110.

In some embodiments, fluid escape elements may be arranged symmetrically such that each half-cell has the same number and/or flow rate capacity of fluid escape elements as its counter-half-cell. In other embodiments, cells may be configured with asymmetrical fluid escape elements, such that one half-cell has a greater fluid escape flow capacity than its counter-half-cell.

FIG. 2 schematically illustrates another embodiment of one cell 200 configured to confine electrolyte to the cell 200. Each half cell chamber 232, 242 is shown separated from respective gas-liquid separators 282, 284, joined only by an egress channel 260, 261 providing the sole fluid-communication channel out of the half-cell chamber 232, 242 into the gas-liquid separator 282, 284.

The egress channel 260, 261 providing the only pathway for fluid to flow from the half-cell chamber into the gas-liquid separator may allow the egress channel height to establish a height of a liquid level within the half-cell chamber 242, 232, thereby defining a height and volume of the headspace 244, 234 in each half-cell chamber 242, 232. Therefore, the vertical position of an egress channel opening 262, 263 within a half-cell chamber 242, 232 may be positioned at a height within the half-cell chamber 242, 232 selected as a desired approximate maximum height of an electrolyte liquid level within the half-cell chamber 242, 232. When an electrolyte liquid level rises above the opening of the egress channel 262, 263, the fluid flowing through the egress channel 260, 261 will tend to be entirely or predominantly liquid electrolyte. When the liquid electrolyte level drops below the height of the egress channel opening 262, 263, the fluid flowing through the egress channel 260, 261 will tend to be entirely or predominantly gas. Establishing a minimum headspace by establishing an approximate maximum liquid electrolyte level may advantageously leave the headspace clear for addition of a consumable make-up liquid and may help prevent electrolyte from flowing backwards up through the make-up liquid inlet 276, among other advantages.

In some embodiments, an egress channel outlet 264, 265 may be configured to drip electrolyte into the electrolyte capture volume 210, 212 while allowing gas to flow to a gas removal manifold 222, 224.

In various embodiments, a fluid escape element configuration in a positive half-cell may be the same as the fluid escape element configuration in a corresponding negative half-cell, or fluid escape element configurations may be different in opposite half-cells of a common cell. Similarly, adjacent cells may have the same or different configurations relative to one another with respect to fluid escape elements or other features.

For example, egress channel inlets 263 and outlets 265 in a positive half-cell chamber 232 and a positive gas-liquid separator 284 may be positioned at substantially the same height as egress channel inlets 262 and outlets 264 in a negative half-cell chamber 242 and a negative gas-liquid separator 282 of the same cell 200. Alternatively, egress channel inlets 263 and outlets 265 in a positive half-cell chamber 232 and a positive gas-liquid separator 284 may be positioned at a higher or lower height compared with a negative half-cell chamber 242 and a negative gas-liquid separator 282 of the same cell 200.

Parallel fluid escape elements may include porous structures such as membranes, filters, meshes, porous blocks, or other structures having a plurality of tortuous or small-diameter pathways from one side through to another side. Which of the parallel paths any particular quantity of a fluid may pass through may tend to be influenced by the physical structure of porous structure, the structure of other cell components, and/or the physics of actions occurring in the cell. Due to the differences in physical interactions of liquids and gases with a porous fluid escape element, liquids may pass through some pores more slowly (e.g., due to friction, surface tension, viscosity, etc.) while some pathways may become at least temporarily blocked by (or filled with) liquid, causing gases to pass through un-blocked pores or pathways.

Some fluid escape elements may also be configured to be "phase discriminatory" such that only one phase of matter (e.g., liquid or gas but not both) is permitted to pass through. In some embodiments, at least some degree of phase discrimination may be achieved with highly hydrophobic materials. In some examples, such hydrophobic materials may include porous membranes that may allow transmission of gaseous matter while preventing transmission of liquids. FIG. 1 illustrates example membrane fluid escape elements at 162 and 164. In some embodiments, membranes that are not necessarily phase discriminatory may be used as fluid escape elements.

Membranes with sufficiently small and/or tortuous hydrophobic pores may prevent transmission of liquid droplets or mist in addition to preventing transmission of bulk liquid flow. For example, suitable membranes may have pore sizes as small as 0.1 μm or smaller. Suitable fluid escape element membranes may be made from various materials including polytetrafluoroethylene (PTFE), expanded PTFE (ePTFE), polyethersulfones (PES), FEP (fluorinated ethylene propylene), PFA (perfluoroalkoxy), ETFE (ethylene tetrafluoroethylene), polypropylene, polyethylene, polycarbonates, polyvinylidenefluoride, cellulose acetates, polyacrylonitrile, polyetherimides, polyamide, cross-linked polyether, polypropylene, or various combinations of these and other polymers. In other examples, a parallel fluid escape element may comprise a block, sheet, or plate of a porous composite or ceramic material. Such materials may be naturally hydrophobic or may be modified by treatments or additives to impart hydrophobic properties. In other embodiments, a hydrophobic material may be combined with a hydrophilic material to form a composite membrane structure for use as a parallel fluid escape element.

In some embodiments, two or more fluid escape element structures may be combined. For example, one or more one-way valves or apertures may be combined with an egress channel in order to create a fluid escape element with two or more series fluid escape elements in series with one another. In another example, one or more series fluid escape elements (e.g., an egress channel, valve, aperture, etc.) may be combined with one or more parallel fluid escape elements (e.g., a membrane or porous block).

In various embodiments, one, two, three, or more fluid escape elements of the same or different types may be positioned in a fluid path between a half-cell chamber and a gas-liquid separator. For example, FIG. 1 illustrates three fluid escape elements separating each half-cell chamber from its respective gas removal manifold 122, 124. A first membrane-type fluid escape element 164 is shown positioned between a negative half-cell chamber 132, 142 and an electrolyte capture volume 110, 112 (described in further detail below) and a second membrane-type fluid escape element 164 separating the electrolyte capture volume 110, 112 from a gas removal manifold 122, 124. In various embodiments, one or both membranes 162, 164 may be phase-discriminating hydrophobic membranes made of a material and construction capable of allowing only gas to pass through, causing liquid or mist to collect and drip back into the higher-pressure chamber. In some embodiments, one or both membranes 162, 164 may be non-phase discriminatory.

In various embodiments, a cell 200 may include a headspace divider 250 configured to divide a gas headspace 234 of one half-cell 232 from the has headspace 244 of its counter-half-cell 242. Such a headspace divider 250 may be made of any suitable material and construction such that it has the properties of being impermeable to degradation by gases produced in either half-cell and impermeable to degradation by the liquid electrolyte. Suitable examples may include a solid non-porous sheet of an electrolyte-impervious polymer, metal, metal oxide, metal hydroxide, ceramic, or composite material. In some embodiments, a headspace divider 250 may be made of a flexible material that is impervious to the electrolyte and to gases in the half-cell chambers. Such a flexible headspace divider may deflect due to differences in fluid pressure at the divider interface, thereby allowing a degree of passively-automatic pressure-balancing between the half-cell chambers. Below the headspace 234, 244, the half-cell chambers 232, 242 may be divided by a separator 206.

In various embodiments, a separator (106 in FIG. 1, 206 in FIG. 2, or any other separator in an electrochemical system described herein) may be made of one or more of various materials, including nylon, polyethylene (PE), polypropylene (PP), polyolefins (PO), polyamide (PA), poly (tetrafluoroethylene) (PTFE), polyvinylidine fluoride (PVdF), poly(vinyl chloride) (PVC), polysulfone (PSU), polyphenylsulfone (PPSU), polyetheretherketone (PEEK), asbestos, zirconium oxide cloth, cotton, polyvinyl alcohol or polyvinyl acetate (PVA), ethyl-cellulose, methyl-cellulose, ethylene-methacrylic acid copolymers, fluorinated polymers, sulfonated polymers, carboxylic polymers, woven or non-woven cellulose, NAFION, or others. In some embodiments, a separator material may be modified by addition of cross-linking agents or by post-treatments such as corona discharge treatments for modifying surface features of the material such as modifying a hydrophilicity or hydrophobicity of the material. A degree of hydrophilicity and/or hydrophobicity of a membrane material may also be modified by inclusion of one or more additive materials tending to affect such parameters. For example, hydrophilic additives such as zirconia, titania, or other materials may be embedded in or co-extruded with a polymer membrane. In some embodiments, ceramic membranes, cermet membranes, or composite ceramic/polymer membranes may also be used. Example ceramic and cermet separator membranes are described in U.S. Pat. Nos. 4,898,699, 4,445,994, and US20150118592.

In some embodiments, a separator may be made of a suitable material and construction so as to be substantially hydrophilic and/or impervious to one or more gases. In some embodiments, separators may be made of materials from the class of materials known as ionomers, including anion exchange membranes and proton exchange membranes, which are typically solid non-porous materials capable of conducting ions without allowing diffusion or direct flow of liquids or dissolved species. Examples of ionomers include ethylene-methacrylic acid copolymers such as that produced by DUPONT® under the trademarks SURLYN® and NUCREL®, fluoropolymer-copolymers such as that produced by DUPONT® under the trademark NAFION®, or others.

In some embodiments, separators may include solid-gel materials or composite materials such as the separator materials described in US Patent Application Publications US20020012848, US20020010261, US20030099872, and US20120148899, U.S. Pat. Nos. 3,953,241, 6,358,651, and 6,183,914, or European Patent EP0624283B1. For example, a composite material separator membrane may comprise a polymer membrane (e.g., made of one or more of the materials described above) impregnated with a metal oxide or metal hydroxide (e.g., oxides, dioxides, sub-oxides, or hydroxides of metals such as zirconium, aluminum, lithium, titanium, magnesium, etc.).

In various embodiments, the electrodes 102, 104, 202, 204 may comprise any structure, materials, and catalysts suitable for enabling desired reactions in the electrochemical cell. Electrodes typically comprise a conductive substrate (e.g., a sheet, felt, foam, mesh, or other structure of metal, carbon, graphite, conductive polymer or other electrically conductive material) and a catalyst supported either directly on the conductive substrate or on a separate layer contacting or attached to the conductive substrate. Some electrodes may also comprise a gas diffusion layer containing a hydrophobic polymer. Some example electrode structures, catalysts and materials are provided in the Jensen Report referenced above. Other example electrode structures are described in U.S. Pat. No. 9,938,627, US Patent Application Publication 2015/0292094, and U.S. Pat. No. 10,026,967, each of which is herein incorporated in their entirety by reference.

In various embodiments, a cell-stack made up of confined electrolyte cells may be initially filled with electrolyte in any of a variety of ways. For example, a portion of a cell-volume may be filled with a dry powder that may be hydrated and dissolved by make-up liquid delivered via a make-up liquid supply manifold. In other embodiments, electrolyte may be added as a solid frozen block of electrolyte included during assembly of a cell-stack. In still other embodiments, electrolyte may be delivered into each cell volume in a cell-stack via a make-up supply manifold, a gas-purge manifold, or a specially-provisioned electrolyte-fill manifold.

Electrolyte Capture and Return System

FIG. 1 and FIG. 2 illustrate example features and structures referred to herein as part of an electrolyte capture and return system in which each half-cell chamber 132, 142, 232, 242 may be joined to an electrolyte capture volume 110, 112, 210, 212 arranged and configured to receive and retain a volume of electrolyte 130, 131 that escapes the half-cell chamber 132, 142, 232, 242, to separate the captured liquid electrolyte from gas leaving the half-cell chamber, and to return the captured electrolyte to one or both of the half-cell chambers. The electrolyte capture volume 110, 112, 210, 212 may comprise an outlet conduit 118, 119 joined to a return path conduit 114, 116 and a pump 172, 174 for returning electrolyte 130, 131 to the cell 100 from which it escaped.

In some embodiments, the electrolyte capture volume 110, 112, 210, 212 may be joined in fluid communication with a gas collection volume 186, 188, 286, 288 which may be in fluid communication with a gas removal manifold 122, 124, 222, 224. Together, an electrolyte capture volume and a gas removal volume may be configured to substantially separate a fluid mixture exiting a half-cell chamber 134, 132, 242, 232 into gas in the gas collection volume 186, 188, 286, 288 and liquid electrolyte in the electrolyte capture volume 110, 112, 210, 212.

In some embodiments, as shown for example in FIG. 1, an electrolyte capture and return system may be configured to return captured electrolyte 130 or 131 exclusively to the half-cell chamber 132, 142 from which it was captured without allowing mixing with electrolyte 131 or 130 captured from a counter-electrode half-cell chamber 132, 142.

In some embodiments, as shown for example in FIG. 2, an electrolyte capture and return system may be configured to allow electrolyte captured from opposite half-cell chambers 232, 242 of a common cell 200 to mix in a common volume such as an expansion volume (described in further detail below).

In various embodiments a capture volume may be configured with a wide range of suitable structures and materials. For example, in some embodiments, a capture volume for each half-cell chamber 132, 142, 232, 242 may be integrated into one or more cell-frame or structures in a bipolar or monopolar stack configuration. In other embodiments, capture volumes and conduits may be provided external to a cell-frame and configured to direct captured electrolyte back into the cell.

In some embodiments, a capture volume 110, 112, 210, 212 may be an empty volume containing only gas and/or liquid electrolyte. In other embodiments, a capture volume 110, 112, 210, 212 may contain one or more condensation materials suitable for condensing liquid electrolyte droplets from a fluid mixture escaping an associated half-cell. Condensation materials may generally feature high surface area materials impervious to degradation by electrolyte. Such condensation materials may include porous structures of metal and/or non-metal materials, such as woven or non-woven polymer or metal mesh, sheet, foam, grids, or expanded materials with three-dimensional structures. In other examples, condensation materials may comprise particles of one or more materials (e.g., ceramics, metals, or metal oxides) either loose, polymer-bound, or as sintered structures. The capture volume 110, 112, 210, 212 of the liquid-gas separator 182, 184, 282, 284 may comprise a gas pocket region above a liquid level in a liquid region.

In general, a volumetric capacity of a capture volume may be sized so as to provide a sufficient volume for capturing enough electrolyte to accommodate a maximum electrolyte egress rate from a half-cell chamber. As described elsewhere herein, the liquid content of fluid escaping a half-cell chamber at any given time may depend on a stage of operation of the cell at that time. In some embodiments, the ideal size of an electrolyte capture volume may also depend on a rate at which captured electrolyte is returned to the cell from which it escaped. The rate at which electrolyte is returned may be a function of a pumping rate.

In some embodiments, a capture volume may be constructed to have a variable volume, such as by the use of a movable piston or an expandable diaphragm, an expandable membrane, or a resilient expandable tube or conduit that may be displaced or expanded as more electrolyte is introduced to the capture volume 110, 112, 210, 212.

In some embodiments, it may be desirable to exclude gas from a bottom portion 220 of a capture volume 110, 112, 210, 212 so as to ensure that only liquid electrolyte is drawn into a pump 172, 174, 272, 274 and returned to a half-cell chamber 132, 142, 232, 242. For example, in some embodiments a section of a porous hydrophilic material 126, 226 may be positioned near a bottom portion of a capture volume 110, 112, 210, 212 so as to substantially limit formation of gas pockets adjacent to a capture volume outlet 118, 119, 218, 219. A porous hydrophilic material or membrane 126, 226 with a bubble point greater than an intake pressure of a pump 172, 174 may be used. Bubble point is the gas pressure at which gas bubbles pass through a membrane, and is a metric often listed in catalogs for membranes used in industries such as water filtration. The bubble point of a membrane or material may also be determined empirically.

Example materials or membranes 126, 226 may include polysulfone membranes, polyethersulfone membranes, sulfonated polyethersulfone membranes, polyacrylonitrile membranes, polyvinylidene difluoride membranes, membranes made from mixed cellulose esters, cellulose acetate, nylon, polyester, porous ceramic structures, three-dimensional porous metal structures such as meshes, grids, or foams (e.g., nickel, titanium, or other metals or metal alloys), ceramics, cermets, composites, or combinations of these or other materials.

A similar objective may be achieved with a floating divider configured to float on top of any electrolyte 130, 131 within the capture volume 110, 112, 210, 212. In some embodiments, a floating divider may be configured to seal the capture volume outlet 118, 119, 218, 219 so as to prevent gas from exiting the capture volume outlet when the capture volume contains no liquid electrolyte, or contains less than a threshold volume of liquid electrolyte. In still other embodiments, other phase-separating materials or structures may be used to allow substantially only liquid electrolyte to occupy a bottom region 220 of an electrolyte capture volume 110, 112, 210, 212 adjacent to an outlet 118, 119, 218, 219.

In other embodiments, hydrophilic membranes, floaters or other structures may be omitted so as to allow gas to exit the capture volume 110, 112, 210, 212 through the outlet 118, 119, 218, 219. Any gas exiting the capture volume 110, 112, 210, 212 via the outlet 118, 119, 218, 219 may be pumped into one or both half-cell chambers 132, 142, 232, 242.

Some embodiments of a capture volume 110, 112, 210, 212 may comprise an outlet 118, 119, 218, 219 with a one-way valve 221 to prevent back-flow of electrolyte from a return conduit 114, 116, 214, 216 back into the electrolyte capture volume 110, 112, 210, 212. Any type of one-way valve (or check valve) may be used, such as duckbill valves, poppet valves, ball check valves, diaphragm check valves, tilting disc check valves, flapper valves, lift check valves, umbrella check valves, piston check valves, swing check valves, dual plate (double-door) check valves, or others. One-way check valves may be made of any suitable material such as polymers, metals, ceramics, or other material or material combinations selected to be resistant to damage from the liquid electrolytes and gases contacting the valve. In some embodiments, a one-way valve may be integrated into a pump arranged to move fluid from the electrolyte capture volume 110, 112, 210, 212 through a return conduit 114, 116, 214, 216 into a half-cell chamber 132, 142, 232, 242.

In some embodiments, an electrolyte capture and return system and/or a make-up liquid supply system may operate without a liquid level sensor. In some conventional electrochemical cells, a liquid level sensor is typically used to control a rate of make-up fluid addition, a rate of electrolyte flow through the cell, and/or a rate of gas extraction from a cell. Instead, the described systems and methods utilize pressure differentials, fluid escape elements, and check valves to precisely, but passively, manage electrolyte levels and make-up fluid addition rates without the need for electronic controllers, sensors, liquid level sensors, etc. This may be advantageous in that it decreases cost and eliminates failure modes and error associated with sensors, electromechanical actuators, and electronic control systems, thereby decreasing the need for maintenance, down-time, and replacement.

A pump 172, 174, 272, 274 may be arranged along an electrolyte return conduit for transporting fluid (e.g., electrolyte, gas, and/or other fluid) from an electrolyte capture volume 110, 112, 210, 212 to a half-cell chamber 132, 142, 232, 242. In embodiments, the pump 172, 174, 272, 274 may comprise one or more positive displacement pump types, such as a piston pump, a peristaltic pump, a rotary lobe pump, a progressing cavity pump, a screw pump, a rotary gear pump, a diaphragm pump, a gear pump, a vane pump, or other positive displacement pumps or other pump types. In various embodiments, any number of pumps may be used for returning captured electrolyte to cells for a stack. In some embodiments, a system may use one pump per cell, one pump per half-cell, one pump for an entire stack of cells, or one pump for all positive half-cells of a stack and a second pump for all negative half-cells for a stack. Other configurations are also possible.

In some embodiments, a pump 172, 174, 272, 274 may be configured and arranged to return electrolytes to a cell or half-cell chamber in a "pressure balanced" manner, that is, without increasing fluid pressure in the half-cell chamber 132, 142, 232, 242 above a predetermined threshold. In some embodiments, this may be accomplished by active controls using sensors and a closed-loop control system, while in some embodiments, "pressure balancing" of a pump/cell system may be accomplished passively by using a pressure balancing pump type.

One type of "pressure balancing" pump that is well-suited to use with the various systems and methods described herein is referred to herein as a "ventricular pump," an example of which is illustrated in FIG. 3.

Pressure-Balancing "Ventricular" Pump

Figure 3A:
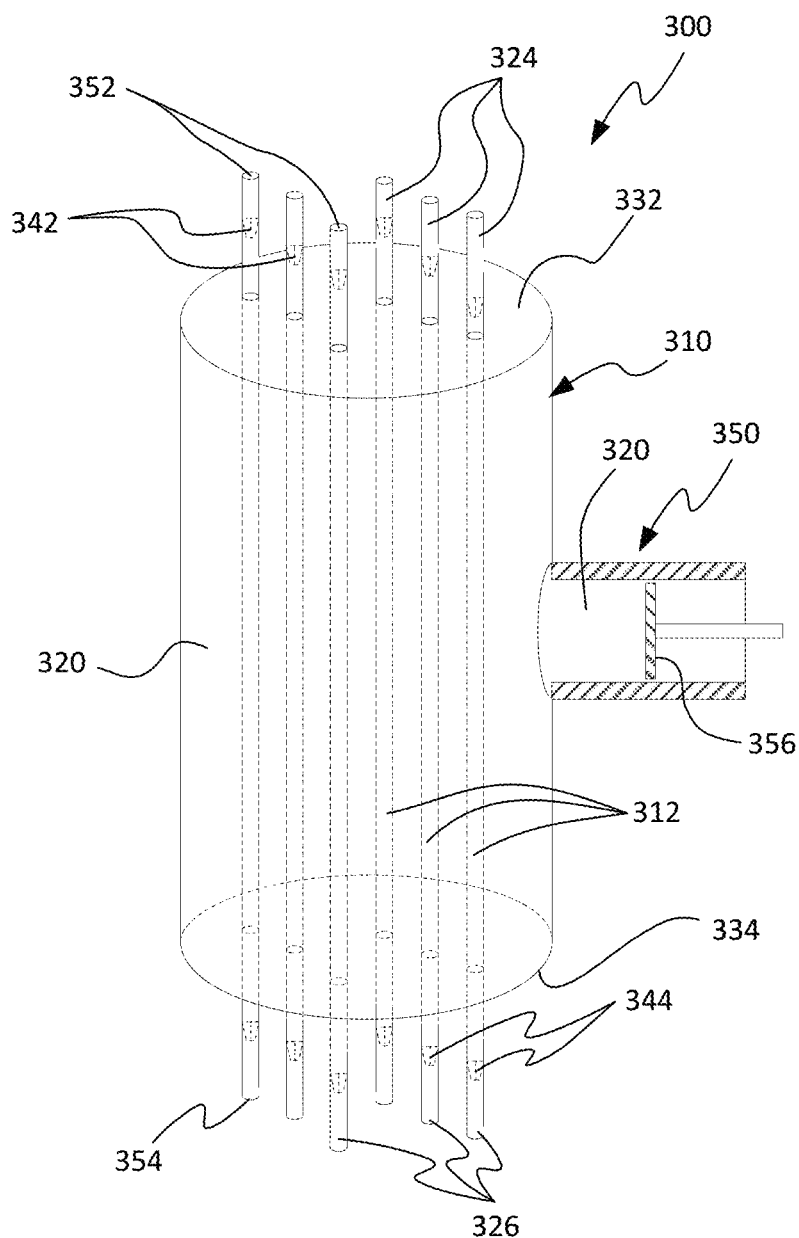
FIG. 3A is a schematic conceptual illustration of a ventricular pump.

FIG. 3A schematically illustrates an example "ventricular pump" 300 that may be used in various aspects of electrochemical system embodiments as described herein. The ventricular pump advantageously allows for passive pressure regulation of pumped fluids and may also simultaneously drive fluid flow in a large number of parallel or simultaneous flow channels with a single simple actuation mechanism. Ventricular pumps may also comprise a minimum of moving parts, may be made of inexpensive materials that are highly compatible with caustic fluids to be pumped, and may be integrated into bipolar or monopolar cell-stacks.

Ventricular pumps operate by applying a pressure to an actuation fluid (i.e., a compressible or incompressible fluid) in contact with one or more compressible "driver" elements. The applied pressure is simultaneously transmitted to the compressible driver elements (e.g., compressible tubes, diaphragms, or other deflectable structures), thereby driving fluid out of or away from the compressible elements. The direction of flow through a ventricular pump may be passively controlled by one-way check valves.

FIG. 3A is a schematic illustration in which a ventricular pump 300 may comprise a housing 310 with a plurality of fluid-driving tubes 312 extending through an interior of the housing 310 which is filled with an actuation fluid 320 surrounding the tubes 312. Each tube 312 may be coupled to an upstream fluid conduit 324 outside of a first end wall 332 and a downstream fluid conduit 326 outside of a second end wall 334 of the housing 310. An upstream one-way valve 342 and a down-stream one-way valve 344 may be placed in each tube 312 or conduit 324, 326. Both the upstream valve 342 and the down-stream valve 344 may be arranged to allow fluid flow in a first direction through the tube (e.g., downwards in the orientation illustrated in FIG. 3A) and to prevent fluid flow in the opposite direction. The ventricular pump 300 may also include an actuator 350 arranged to apply a fluid pressure to the actuation fluid 320 contained within the housing 310 and surrounding the tubes 312.

As used herein, the term "driver element," "fluid driver" or simply "driver" refers to a structural ventricular pump component that comprises a compressible or deflectable structure which, when compressed or deflected by an actuation fluid, drives a transported fluid through a fluid-carrying conduit. In the schematic example of FIG. 3A, the tubes 312 comprise both a deflectable structure (the compressible tube walls) and a fluid-carrying conduit (the lumen volume within the tube). Therefore, the tubes 312 of FIG. 3A may be described both as a "driver" and as a portion of a conduit through which fluid is driven by actuation (compression or deflection) of the driver. The term "driver" is intended to be equivalent to other terms such as "compressible element," "deflectable element," "compressible conduit section" or other terms suggesting similar structures.

In some embodiments, fluid drivers represented as tubes 312 in FIG. 3A may be made of incompressible materials such as hard plastics, metals, ceramics, etc., but arranged in a configuration allowing for compression of a chamber, such as pistons, bellows, diaphragms, etc. Fluid drivers may include any structure of any shape or arrangement capable of transmitting a (positive or negative) pressure applied by the actuator 350 to a fluid-carrying conduit 312 in order to drive fluid within the conduit 312 from an upstream end 352 to a downstream end 354.

A ventricular pump 300 may operate to convey fluid from an upstream end 352 toward a downstream end 354 of each flow channel defined by a tube 312 and corresponding upstream conduit 324 and downstream conduit 326 when an actuator 350 compresses the actuation fluid 320. The increased pressure applied to the actuation fluid 320 will be transmitted to the sections of each compressible element 312 within the fluid, thereby expelling a volume of fluid through the down-stream one-way check valve 344. The fluid in the tubes 312 will be prevented from flowing backwards by an upstream one-way valve 342. Upon release of the compressive pressure on actuation fluid 320 and the tube 312, if a fluid pressure upstream of an upstream valve 342 is greater than the reduced pressure within the housing 310 (and therefore within the tubes 312), fluid may flow in a downstream direction through the upstream valve 342 into the corresponding inner tubing section 312. In some embodiments, a negative pressure may be applied to the actuation fluid in order to draw upstream fluid into the tubing sections 312.

In some embodiments, the compressible elements 312 (or one-way valves, diaphragms, or other flexible structures described herein) may be made of any of one or more resilient compressible materials with rubber-like properties, such as, latex rubber, vulcanized rubber, silicone, natural rubber, isoprene, isobutylene isoprene, epichlorohydrin, polychloroplene, perfluoroelastomers styrene butadiene rubber (SBR), other butyl rubbers, ethylene propylene diene terpolymer (EPDM), other ethylene propylene rubbers, nitrile, neoprene (polychloroprene or pc-rubber), chlorosulfonated polyethylene (CSPE or HYPALON), fluoroelastomers, or others.

While FIG. 3A illustrates circular cross-section tubing, the tubing or other compressible elements may be any cross-sectional shape as desired. In some embodiments, compressible elements may be made of a material that is itself substantially incompressible, but in a cross-sectional or other shape that is capable of being compressed or deflected to reduce an interior volume containing a fluid to be pumped. In other embodiments, tubing, compressible elements, or other fluid driver elements may be made of a compressible material.

While resilient compressible fluid driver materials may be beneficial in that they may be actuated by either positive or negative actuation pressures and may be self-expanding on the release of actuation pressure, the fluid drivers need only be capable of being compressed or deflected by the actuation fluid 320. Resilience is not a necessary property of the tubing. Therefore, other non-resilient or minimally-resilient compressible materials may be used, such as polytetrafluoroethylene tubing, polyvinyl tubing, or others.

The number of independent flows (i.e., combinations of inflow and outflow conduits 324, 326 and conduits 312) controllable by a ventricular pump 300 is limited only by the number of fluid drivers and conduits 312 that may fit within a housing 310. Therefore, a ventricular pump 300 may be configured to hold any number of parallel pumping flows by choosing a housing size and conduit or fluid driver sizes.

In various embodiments, the housing 310 should be sealed against leakage of the actuation fluid 320. Therefore, any conduit tubes 312, or conduits 324, 326 attaching to or extending through the housing 310 may be sealed to the housing 310. In some embodiments, the tubes 312 and/or conduits 324, 326 may be sealed to the end plates such as by welds, adhesives, fittings, couplings, or other mechanisms or methods. For example, in some embodiments, the housing end caps 332, 334 may have straight, threaded, or barbed connectors attached to or integrally formed with the end caps. For example, connectors may be molded as part of the end caps (or other housing part), machined, 3D printed, etc.

In various embodiments, the fluid drivers 312 within the housing 310 may be a different material than fluid-carrying conduits 332, 334 located outside of the housing 310. Therefore, in some examples, an upstream fluid-carrying conduit 324 may be made of a first material and may be joined to an outer coupling which may be attached to or integrally formed with a housing section. A corresponding fluid driver section 312 may be joined to an inner coupling which may be attached to or integrally formed with an interior housing section. In some embodiments, an upstream 324 and/or downstream fluid-carrying conduit 326 may be integrally formed with a portion of the housing 310 or one or more parts attached to the housing 310, such as an end-cap or a side-wall.

While FIG. 3A illustrates fluid conduits 324, 326 and fluid driver conduits (tubes) 312 extending in a straight line through opposite ends 332, 334 of the housing 310, this need not be the case in all embodiments. In some embodiments, an inflow (upstream) conduit 324 and a corresponding outflow (downstream) conduit 326 may pass through the same housing wall as one another (e.g., an end-wall, end-cap, or side-wall). In some embodiments, an upstream inflow conduit 324 and a corresponding downstream outflow conduit 326 may pass through housing walls perpendicular to one another, or at any other orientation relative to one another. In such embodiments, compressible fluid driver conduits (e.g., tubes) 312 or other conduit structures within the housing may curve or bend within the housing 310.

In some embodiments, only a portion of a fluid driver 312 within the housing 310 may be compressible while other portions of a fluid-carrying conduit may be made of an incompressible material that merely directs fluid flow. In some embodiments, a ventricular pump may be configured with two or more upstream inflow conduits 324 or downstream outflow conduits 326 joined to one another in a manifold or other configuration allowing for two or more flow streams to be joined on an inlet and/or outlet end.

While the housing 310 in FIG. 3A is shown as having a cylindrical shape independent of other structures, in various embodiments the housing 310 may be any other shape as desired, such as spherical or a prismatic shape such as a rectangular or other prism. In various embodiments, the housing may be made of any materials or combinations of materials including plastics, metals, ceramics, or composite materials suitable for the actuation fluid and actuation pressures desired.

In some embodiments, a housing 310 may be integrated into an electrochemical cell-stack such as by forming a housing volume by joining multiple stacked layers. For example, a housing 310 may comprise a manifold, conduit, or other structure joining portions of multiple cell-stack layers into a common volume which may contain an actuation fluid and fluid drivers 312 for each of a plurality of individual cells or half-cells. An example is described below with reference to FIG. 3B—FIG. 3C.

In various embodiments, the one-way valves 342, 344 in a ventricular pump 300 may include any one-way check valve type such as duckbill valves, poppet valves, ball check valves, diaphragm check valves, tilting disc check valves, flapper valves, lift check valves, umbrella check valves, piston check valves, swing check valves, dual plate (double-door) check valves, or others. One-way check valves may be made of any suitable material such as polymers, metals, ceramics, or other material or material combinations selected to be resistant to damage from the liquid electrolytes and gases contacting the valve. Although one-way valves 342, 344 are shown positioned outside of the housing 310, they may alternatively be positioned inside the housing volume or within couplings, end-caps, or other structures of the housing itself. While FIG. 3A illustrates only one upstream valve 342 and one downstream valve 344 per conduit, a ventricular pump 300 may include any number of valves in a single tube or conduit.

FIG. 3A illustrates an actuator 350 in the form of a simple piston 356 which may apply a positive pressure as the piston 356 moves towards the housing 310, and in some embodiments may apply a negative pressure by moving the piston 356 away from the housing 310. In various implementations, any type of actuator may be used in place of or in combination with a piston. For example, in some embodiments, an actuator 350 may comprise a piston pump in which a piston is driven by a rotary or linear motor. In other embodiments, an actuator 350 may comprise any other pump type capable of intermittently applying an increased pressure to a fluid. Some examples of such pumps may include syringe pumps, peristaltic pumps, or other type of intermittently-actuated positive displacement pump. In other embodiments, an actuator 350 may comprise an electronically-controlled solenoid, servo, or other electromechanical device. In other embodiments, an actuator 350 may comprise a pressure regulator actuatable to intermittently apply a pressure from a high-pressure (or low-pressure) source, such as a compressed-gas source or a pressurized liquid source, to the actuation fluid.

In various embodiments, the frequency of actuation (i.e., how often an actuation pressure is applied per unit of time) may be chosen based on a desired rate of pumping (e.g., in terms of fluid volume or mass per unit time), which may be chosen based on a volume of fluid to be moved by the ventricular pump. A magnitude of pressure applied by an actuator may also be selected based on other system parameters, such as an expected or desired down-stream pressure.

However, the actuation pressure need not be tightly controlled, because the volume of fluid driven out of each fluid driver 312 during each actuation may simply be the compressible interior volume of the tube or other compressible or deflectable driver section. Over-compression of the fluid drivers 312 may be tolerated by selecting compressible materials capable of withstanding the excess pressure. On the other hand, a maximum actuation pressure may be selected based on a desired maximum downstream pressure. If a pressure in a particular conduit 326 downstream of a downstream valve 344 exceeds (or is equal to) a pressure in the fluid drivers 312 experiencing the actuation pressure, then fluid will simply not flow out of the corresponding tube during that actuation.

In some embodiments, a ventricular pump may be operated in an open-loop controlled manner, independent of any other system state. The nature of a ventricular pump is such that, if upstream fluid is unavailable (i.e., is at a low pressure) or if downstream pressure exceeds a pressure in the fluid driver 312 caused by an actuation pressure, fluid will simply not flow through the pump, but the pump will not necessarily be damaged by continuing to apply actuation pressures to the driver. In some cases, fluid may flow in some drivers/conduits 312 and conduits 324, 326 while no fluid flows in other drivers/conduits 312 and conduits 324, 326 in the same pump 300. Therefore, a single actuator 350 may drive fluid at different rates through the various drivers/conduits 112 and conduits 324, 326 without adverse effects on the pump 300 or other parts of the system.

The actuator 350 may generally be configured to cycle between a "low" applied actuation pressure and a "high" applied actuation pressure. Fluid will be expelled from the fluid drivers 312 when a "high" applied actuation pressure exceeds a fluid pressure downstream of a downstream valve 344. Fluid will be drawn into the fluid driver conduits 312 when a pressure upstream of the upstream valve 342 is greater than a "low" pressure of the actuation fluid within the housing 310. The "high" and "low" pressures may be positive or negative in absolute terms (i.e., relative to atmospheric conditions), and will be operational when the foregoing pressure relationships are present. Therefore, the absolute pressures applied to the actuation fluid is less important than the relative pressures as compared with expected or designed pressures upstream and downstream of the ventricular pump housing 310 and/or fluid driver 312.

In various embodiments, the pressure applied by an actuator 350 to an actuation fluid 320 may be an absolute positive pressure or an absolute negative pressure. In some embodiments, an applied actuation pressure may be cycled between a "low" positive absolute pressure and a "high" positive absolute pressure. Alternatively, an applied actuation pressure may be cycled between a positive absolute pressure and a negative absolute pressure. In further embodiments, an applied actuation pressure may be cycled between a "low" (more negative) negative absolute pressure and a "high" (closer to zero) absolute pressure.

In various embodiments, an actuator 350 may be arranged to apply an actuation pressure to a single ventricular pump housing 310 or to a plurality of ventricular pump housings 310 either simultaneously or alternately. For example, alternate application of an actuation pressure may comprise applying actuation pressures at opposite ends of a piston cycle, by valve configurations directing pressure to alternate conduits, or by other mechanisms. Simultaneous application of actuation pressure to multiple ventricular pumps may be accomplished by applying pressure to an actuation fluid in a conduit common to multiple branches, each branch leading to one or more ventricular pump housings and/or fluid drivers.

In various embodiments, the actuation fluid may be a compressible fluid such as air, nitrogen, argon, or other gas or gas mixtures, or an incompressible fluid such as water, an oil, or other incompressible liquid. If a compressible actuation fluid is used, then during application of an actuation pressure to the actuation fluid, a pressure applied to a fluid driver 312 may be lower than the actuation pressure by a pressure quantity required to overcome any resistance of the fluid driver 312 to compression or deflection. Therefore, an excess pressure (greater than a desired pressure) may be applied to a compressible fluid in order to impart a desired pressure to the fluid drivers 312.

The ventricular pump type provides several advantages in an electrochemical system as described herein. In addition to being a low-cost pump with very few wearable moving parts, a ventricular pump allows for simple passive control of fluid flows based on relative pressures of fluid volumes, including gas-liquid fluid mixtures. Additionally, because a ventricular pump can control a large number (e.g., hundreds or even thousands) of parallel flows, a single pump may be used for controlling fluid flows in a large number of independent volumes, such as individual half-cells of an electrochemical cell-stack which may contain several hundred cells.

An example of operating a ventricular pump in an electrochemical system may be understood with reference to FIG. 1 and FIG. 2. Electrolyte 130, 131 in the electrolyte capture volume 110, 112, 210, 212 may be pumped into the cell 100, 200 by a ventricular pump 300. The ventricular pump 300 may be periodically actuated at a frequency sufficient to return electrolyte to the cell 100, 200 at a desired rate. For example, in some embodiments electrolyte may be returned to the cell 100, 200 at a rate roughly equal to the expected rate at which electrolyte escapes the half-cell chamber 232, 242 into the capture volume 110, 112, 210, 212. The outlet 118 of the capture volume 110, 112, 210, 212 may be joined to a conduit at an inlet end of the ventricular pump 300, and one or more tubes or other fluid drivers 312 may be joined to the capture volume outlet conduit.

Upon each actuation of the ventricular pump 300, a volume of electrolyte downstream of the capture volume outlet 118 may be driven downstream towards the return conduit 114, 116, 214, 216 by actuation of a fluid driver. The fluid pressure in the return conduit 114, 116, 214, 216 may be affected by the expansion volume 280 (if present) and the fluid pressure within the half-cell chamber 232, 242. If the pressure in the return conduit 114, 116, 214, 216 is less than the fluid pressure imparted by the ventricular pump actuation, then the volume of fluid from the tube 312 will be driven into the return conduit 114, 116, 214, 216. When the ventricular pump actuation pressure is released (or decreased), if the fluid pressure in the capture volume 110, 112, 210, 212 exceeds the "low" fluid pressure in the fluid driver section 172, 174, 272, 274, then a volume of fluid will flow through the upstream valve 221 to fill the fluid driver conduit within the ventricular pump 300.

FIG. 1 and FIG. 2 schematically illustrate a single ventricular pump fluid driver 172, 174, 272, 274 associated with each half-cell electrolyte capture volume 110, 112, 210, 212. However, in various embodiments a single ventricular pump fluid driver may be associated with any number of half-cell electrolyte capture volumes. For example, in some embodiments, all electrolyte return pump tubes in an entire cell stack may be associated with one ventricular pump fluid driver, or with one common housing volume. In other embodiments, all positive half-cell electrolyte return pump fluid drivers may be in one ventricular pump housing (actuated by a first common fluid volume) and all negative half-cell return pump tubes may be in a second housing (actuated by a second common fluid volume). In some embodiments, a single actuator may apply an actuation pressure to both a first actuation fluid driving positive half-cell ventricular pumps and a second actuation fluid driving negative half-cell ventricular pumps. In other embodiments, fluid drivers may be bundled into various other combinations of cells or half-cells. In some embodiments, a "pump" or a pump component may be provided for each individual electrochemical cell, or alternatively, for each individual half-cell, for example, as an individual conduit or an individual conduit section.

In various embodiments, a ventricular pump housing may comprise a volume defined by apertures in layers of a stacked plate-and-frame cell-stack structure. In such embodiments, a fluid driver section may be positioned within or adjacent to the housing so as to allow an actuation fluid within the housing to drive fluid within the conduit section downstream of the fluid driver.

Figure 3B:
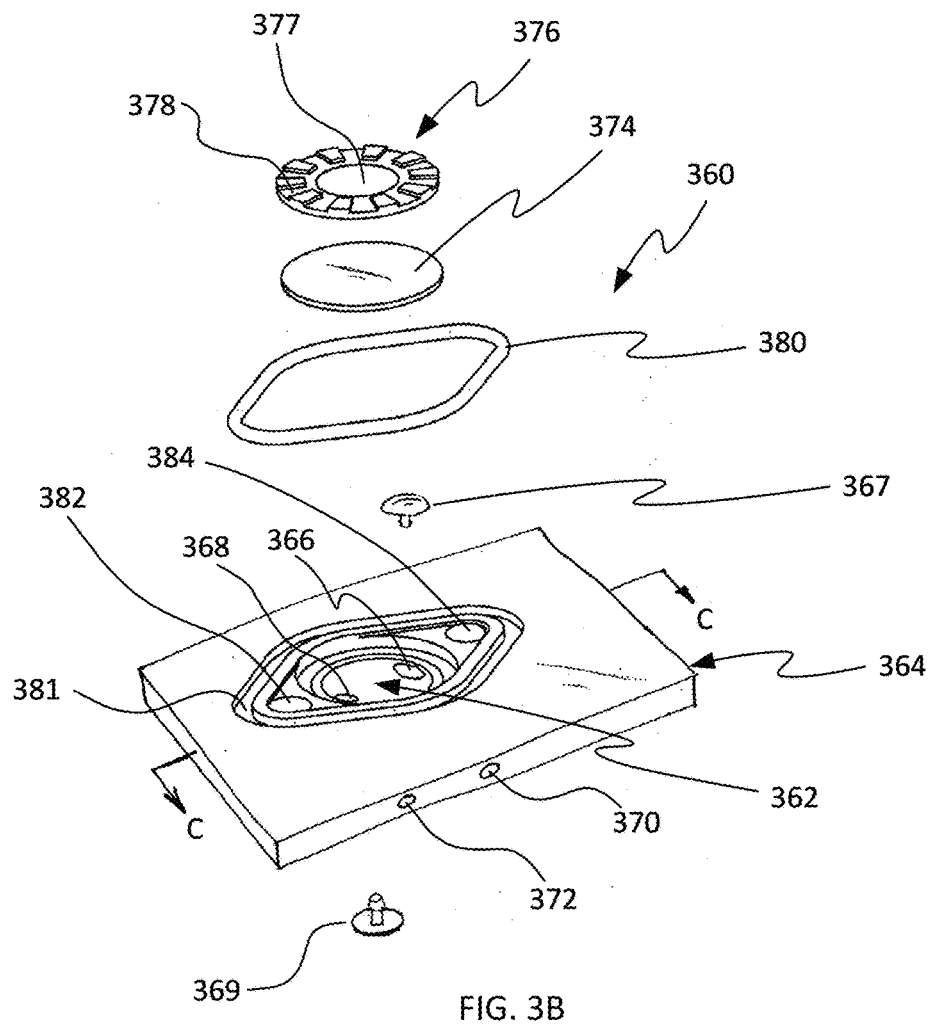
FIG. 3B is a schematic exploded perspective view of an example ventricular pump implemented in a planar substrate such as a cell-frame structure.
Figure 3C:
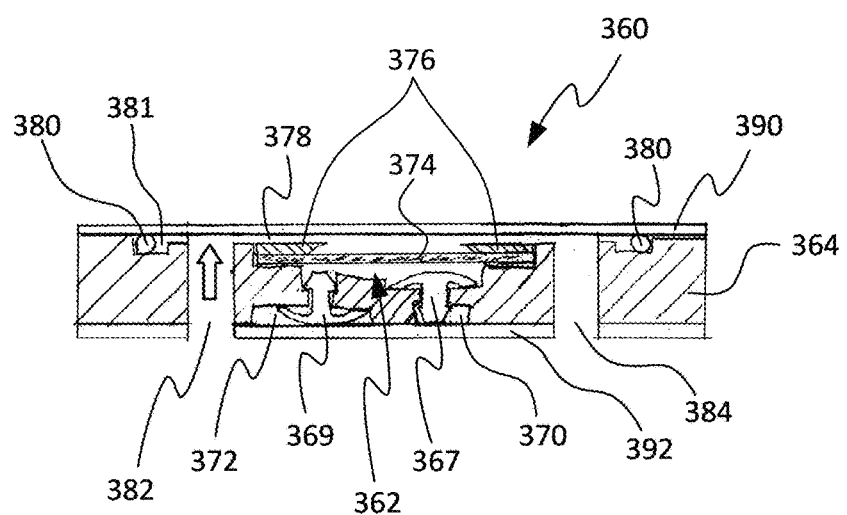
FIG. 3C is a cross-sectional view illustration of the example ventricular pump of FIG. 3B.

FIG. 3B and FIG. 3C illustrate an example embodiment planar implementation of a ventricular pump which may be integrated into a stackable cell-frames as further described below with reference to FIG. 11-FIG. 12B. Although the substrate and pump features are illustrated in a horizontal plane in FIG. 3B and FIG. 3C, cell-frames and pump features may be oriented in a vertical plane (or any other plane) in various implementations of a cell-stack.

In the example embodiment shown in FIG. 3B and FIG. 3C, a ventricular pump 360 may comprise a pump chamber 362 (which may perform a function similar to the housing 310 of FIG. 3A) formed as a feature within a substrate 364, which may be a portion of a cell-frame in a cell-stack. The pump chamber 362 comprise an in-flow (upstream) aperture 366 and an out-flow (downstream) aperture 368, each configured to receive a one-way valve 367, 369. FIG. 3B and FIG. 3C illustrate the one-way valves as umbrella-type valves, but any other one-way valve type may be used as described herein. The in-flow (upstream) aperture 366 may be fluidically connected to an in-flow (upstream) conduit 370 in the substrate 364. Similarly, the out-flow (downstream) aperture 368 may be fluidically connected to an out-flow (downstream) conduit 372 in the substrate 364.

The pump 360 may also comprise a fluid driver in the form of a flexible diaphragm 374 (although other fluid driver types may also be used as described herein). In the illustrated embodiment, a cover 376 may also be provided to transmit a compressive force to a periphery of the diaphragm 374 against the substrate when the assembly is compressed. The cover 376 may also comprise various openings 377, channels 378, or other structures to allow actuation fluid to flow around the cover 376 to contact the diaphragm 374. In some embodiments, a cover 376 may comprise other structures such as a solid disk with holes or slots to allow actuation fluid to pass therethrough. The cover 374 may be made of a material more rigid or less compressible than the diaphragm 374 so as to ensure a seal while maintaining actuation fluid flow channels.

A gasket or O-ring 380 may also be provided to seal the pump chamber 362 from surrounding volumes when compressed against a channel 381 in the substrate 364. In various embodiments, the gasket or O-ring 380 may seal against an adjacent planar structure (not shown in FIG. 3B) such as an adjacent cell-frame or a cover-sheet pressed against the cover 376 and the O-ring 380.

FIG. 3B also illustrates a first actuation fluid conduit 382 and a second actuation fluid conduit 384. In some embodiments, the actuation fluid conduits 382, 384 may be used as in-flow (upstream) and purge conduits respectively. For example, actuation may be performed by driving actuation fluid into the first conduit 382 while flow out of the second actuation conduit 384 is prevented, thereby causing a pressure increase in both conduits and in the pump housing 362 above the diaphragm 374. In such an example, when actuation is complete, pressure may be decreased by allowing flow out of the second actuation fluid conduit 384. In some embodiments, either one or both conduits 382, 384 may be used to apply an actuation pressure to the actuation fluid over the diaphragm 374, and/or pressure may be released through either conduit 382, 384. In some embodiments, a single actuation fluid conduit 366 or 368 may be present, omitting a second conduit.

FIG. 3B further shows a driven-fluid in-flow (upstream) conduit 370 through which a driven fluid (e.g., electrolyte in some embodiments herein) may flow into the pump chamber 362. The driven fluid may also flow out of the pump chamber 362 via a driven-fluid out-flow (downstream) conduit 372. In various implementations, one or more of the driven-fluid in-flow conduit 370, the driven-fluid out-flow (downstream) conduit 372, the in-flow (upstream) aperture 370 and the out-flow (downstream) aperture 372 may be located at regions of the substrate distant from the pump chamber 362, while being fluidically connected to the pump chamber 362 by conduits or channels. An example of such a configuration is described herein with reference to FIG. 11-FIG. 12B.

FIG. 3C is a cross-section of the assembled ventricular pump 360 of FIG. 3B through section line C-C. The assembled pump of FIG. 3C further includes a top cover-sheet 390 sealed against the O-ring 380 so as to enclose the pump chamber 362 and the actuation fluid conduits 382, 384. A bottom cover-sheet 392 is included to enclose and contain the one-way valves 367, 369 and the driven-fluid in-flow (upstream) conduit 370 and the driven-fluid out-flow (downstream) conduit 372. In some embodiments, the actuation fluid 382, 384 conduits may be continuously connected through all cell-frames of a cell-stack (i.e., the conduits 382, 384 may pass through an opening in the top cover sheet or adjacent cell-frame).

When actuation fluid is driven in the actuation fluid conduit 382 towards the pump chamber 362, pressure (and/or fluid flow) may be transmitted through the actuation fluid conduit 382, through the channel 378 in the cover 376, and into contact with the actuation-side (top side as shown) of the diaphragm 374. Under the influence of the actuation pressure, the diaphragm 374 may be deflected downwards towards the one-way valves 369, 370, thereby increasing fluid pressure in the pump chamber 362 below the diaphragm 374. The out-flow (downstream) one-way valve 369 may open under influence of the increased pressure, allowing fluid to flow out of the pump chamber 362 through the driven-fluid out-flow (downstream) conduit 372.

When the actuation pressure is released or reversed, pressure in the driven-fluid in-flow (upstream) conduit 370 may exceed pressure in the pump chamber 362 below the diaphragm 374, thereby allowing driven-fluid to flow into the pump chamber 362 through the in-flow (upstream) one-way valve 367.

Volume Expansion System

As shown in FIG. 2, in some embodiments of an electrochemical system as described herein, each cell 100, 200 may be configured with an expansion volume 280 configured to allow volumetric expansion of fluids within a cell volume while passively controlling cell pressures. In some embodiments, an expansion volume 280 may also be configured to provide a region at which the fluid pressures of the positive electrolyte 131 and the negative electrolyte 132 of a cell are "tied together" in the sense that a lower-pressure electrolyte may directly decrease pressure of the higher-pressure fluid within the expansion volume and conduits joined thereto.

When an electrolytic cell 100, 200 configured for gas-generating electrochemical reactions is initially powered on from an idle state, gas bubbles are rapidly formed and displace liquid electrolyte 130, 131. In a volume of unchangeable size, this increase in gaseous fluid will cause the fluid pressure in the half-cell to rapidly increase. Differences in the rate at which gas is produced in each half-cell can cause substantial cross-separator pressure differences, which can drive liquid electrolyte and/or gas bubbles across the separator or around seals, causing gas crossover and/or leakage. Additionally, if an electrochemical reaction in the cell is exothermic, gas and liquid electrolyte in the half-cell chamber will tend to expand. If the volume is constrained, the thermal expansion will instead increase the fluid pressure in the half-cell chamber. In conventional electrolyzers, such pressure swings are managed by flowing electrolyte through each cell, thereby carrying away excess fluid volume.

By providing each cell with an expansion volume into which a fluid may expand, the pressure within each half-cell may be passively controlled without the need to flow electrolyte through the cell. Allowing electrolyte from both half-cell chambers to expand into a common volume may allow for passive equalization of pressures in the half-cells, thereby minimizing cross-separator pressure differentials.

In the example of FIG. 2, the expansion volume 280 is illustrated as an expandable bellows 283 which resists expansion due to a spring force represented schematically by a spring 281. In various implementations, an expansion volume may be made of materials and structures capable of containing a fluid volume while allowing expansion. For example, an expansion volume may comprise a balloon-like structure, one or more flexible diaphragms, one or more bellows, or other structures.

In some embodiments, an expansion volume 280 may be configured to exert a degree of resistance to expansion, forcing at least some increase in pressure as a fluid volume expands. This is illustrated schematically by the spring 281 in FIG. 2. In various embodiments, a resistance to expansion may be implemented as a spring-constant of an expandable member such as a bellows, diaphragm, balloon, etc. In some embodiments, resistance to expansion may be controlled through the use of a working fluid (liquid or gas) on the opposite side of an expansion volume boundary (e.g., a diaphragm or balloon wall). In some embodiments, a resistance to expansion may be a function of expansion displacement, thereby applying an increasing resistance to expansion as the volume expands. For example, resistance to expansion may be a linear function or non-linear function (e.g., geometric, step-function, exponential, etc.) of a linear, area, or volumetric measure of expansion.

In some embodiments, an expansion volume may be divided into separate regions or compartments configured to prevent mixing of positive electrolyte 131 and negative electrolyte 130 but allowing both electrolytes to expand together. For example, a flexible expandable diaphragm may be used to separate positive and negative electrolytes. In other examples, an expansion volume may be divided into two chambers by a non-flexible divider. In such embodiments, each expansion volume chamber may be separately joined to respective half-cell chambers by one or more fluid conduits.

In still further embodiments, a cell may be configured with separate and independent expansion volumes for the positive electrolyte 131, 231 and the negative electrolyte 130, 230. For example, in some embodiments, an electrolyte return conduit 114, 214, 116, 216 may be made of or joined to an expandable conduit such as a section of a resilient expandable tubing or other expansion volume structures such as those described above.

Figure 13:
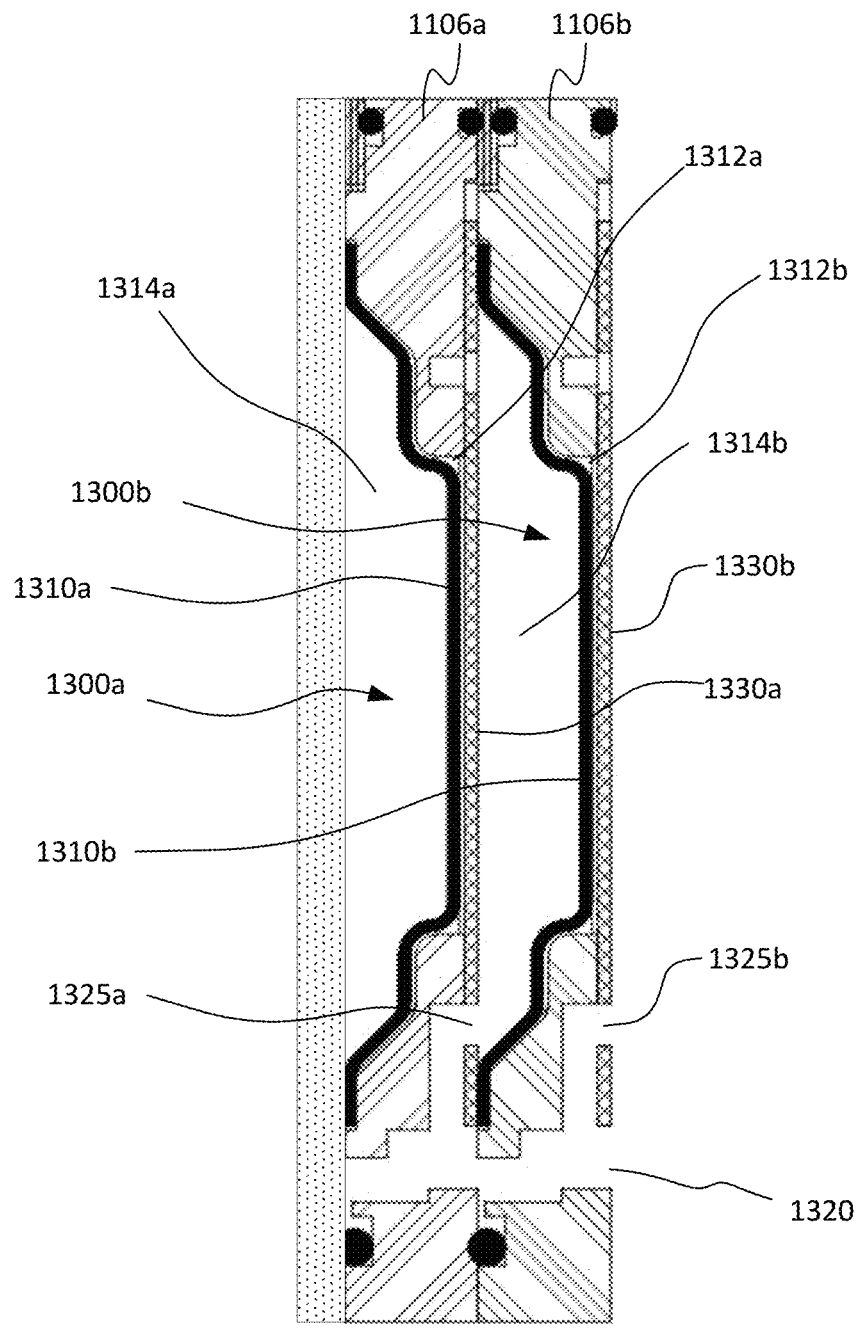
FIG. 13 is a cross-sectional illustration of expansion volumes integrated into cell-frames of two adjacent cells in a cell-stack, taken through line X-X shown in FIG. 12A.

In some embodiments, whether or not electrolytes 131, 130 are joined in a common pressure volume such as an expansion volume 280, a separate region of common pressure may be provided in a cell 100, 200. For example, in some embodiments, the positive headspace 134, 234 may be joined to a negative headspace 144, 244 by a common make-up liquid supply conduit 179, 279 or drip chamber (described further below). Alternatively, a pressure region common to the positive and negative electrolytes from a single cell may be provided at any other region of a cell. In various embodiments, a common pressure region may be configured to allow or prevent mixing of positive and negative electrolytes. FIG. 13, described in further detail below, illustrates an example expansion volume implemented in a substantially planar cell-frame as a component of a cell-stack of multiple electrochemical cells.

Gas Collection System

With reference to FIG. 2 (but equally applicable to examples in other figures), each electrochemical half-cell 232, 242 in an electrochemical system may be in fluid communication with a gas removal manifold 222, 224 in which a gas removal fluid 252 may flow. Gas escaping a half-cell chamber 232, 242 via one or more fluid escape elements 260, 261 may build pressure within a gas-liquid separator 282, 284 in communication with the gas removal manifold, which may be maintained at a pressure lower than a half-cell pressure and lower than a make-up liquid supply manifold pressure as described above. Gas contacting the gas removal liquid 252 may dissolve and/or form bubbles in the gas removal liquid 252 and may then be carried away from the cell 200 by the flowing gas removal liquid 252.

In some embodiments, the gas removal liquid 252 may be the same liquid delivered into the cell 200 via the supply manifold 278 to replace liquid consumed in the electrochemical reactions within the cell 200. For example, in embodiments in which the electrochemical system is an alkaline electrolyzer, the gas removal liquid 252 and the make-up liquid may be (at least predominantly) deionized water. In other embodiments, the gas removal liquid 252 may be a different liquid than that supplied to the cell. The gas-removal liquid is preferably an electrically non-conductive liquid, preferably no more conductive than deionized water as defined herein. For example, the gas removal liquid 252 may be an aqueous solution, a molten salt, an ionic liquid, an oil, a non-aqueous electrolyte solution, etc. Optionally, a gas-removal liquid may have a different, or substantially different, composition compared to any of the electrolytes used in half-cell(s). Optionally, for example, the gas-removal liquid comprises the same solvent as used in an electrolyte of the cell(s), but is free, or substantially free, of the solute(s) used in the electrolyte(s). A gas-removal liquid can comprise one or more chemical species, such as one or more liquid species, and optionally one or more dissolved species. Generally, a gas-removal liquid corresponds to a volume of liquid used for (optionally, primarily, essentially, or only used for) removal of gas from a region, such as a gas-removal manifold, such as by dissolution and/or bubble entrainment of the gas in the gas-removal liquid, optionally followed by transport of the gas removal liquid away from said region.

In some embodiments, a gas-removal manifold may contain substantially only the produced gas (i.e., a gas-removal liquid may be omitted). However, the use of a liquid gas-removal medium (or, gas removal liquid) provides several advantages. For example, any electrolyte mist traveling with the gas may be dissolved in or incorporated into the gas removal liquid 252 and thus removed from the gas stream, thereby washing the gas of electrolyte impurities. Also, gas bubbles entering the gas removal liquid may cause gases such as $CO_2$ or other gas impurities dissolved in the gas-removal liquid to be removed from the liquid (e.g., a sparging effect). The gas-removal liquid may also beneficially prevent persistent buildup of electrolyte deposits on walls of the gas removal manifold 222, 224 or other piping or conduits through which the gas removal liquid flows.

In some embodiments, the gas removal liquid 252 may be water, such as deionized water. In some embodiments, the gas-removal liquid in the positive gas-removal manifold 224 and the gas-removal liquid in the negative gas-removal manifold 222 may be the same liquid from a common source. In some embodiments, the gas-removal liquid 252 may be the same liquid as that supplied to the cell via the make-up liquid supply manifold 278. In other embodiments, make-up liquid in the positive gas-removal manifold 224 may be a different composition and/or from a different source than gas-removal liquid in the negative gas-removal manifold 222. Similarly, the make-up liquid supplied to the supply manifold 278 may be of a different composition and/or from a different source than make-up liquid used in either or both of the positive 224 and negative 222 gas-removal manifolds.

In some embodiments, fluid pressures and flows in the gas removal manifold may be applied or maintained by one or more pumps, such as a positive displacement pump, a ventricular pump, or any other pump type, including those described elsewhere herein. In some embodiments, a pump supplying a gas-removal liquid to a gas-removal manifold may be controlled by one or more electronic controllers operating in a closed-loop control system based on a pressure sensor or a flow sensor (or other sensor) within or in communication with the gas-removal manifold. In some embodiments, a pressure of gas-removal liquid delivered to both gas removal manifolds may be controlled by a common pump delivering gas-removal liquid to a stack of electrochemical cells. In some embodiments, the pressure of the gas removal manifolds may be controlled by backpressure regulators at a region downstream of the exit from a cell stack.

In some embodiments, the pressure of a positive gas-removal manifold 124, 224 may be controlled independent of a pressure of a negative gas-removal manifold 122, 222. In some embodiments, it may be desirable to maintain both the positive and negative gas removal manifolds at substantially the same pressure. However, in practical terms, actual pressures in the gas removal manifolds are likely to vary slightly from target control pressures, meaning some variation is to be expected between a positive gas removal manifold pressure and a negative gas removal manifold pressure. As described above, suitable fluid escape elements may dampen such variations, minimizing their effect on pressures in the half-cell chambers.

Make-Up Liquid Supply

In various embodiments, a make-up liquid may be passively or actively delivered to a cell 200 via a supply manifold 278. For example, in some embodiments of a passive delivery configuration, a make-up supply manifold 278 may be maintained at a constant fluid pressure that is approximately equal to a steady-state operating pressure of a cell or half-cell chamber into which make-up liquid is to be delivered. A one-way check valve 176, 276 at a make-up liquid supply outlet may prevent make-up liquid from being delivered when a cell or half-cell pressure exceeds the supply manifold pressure. When the pressure in the cell or half-cell chamber drops (e.g., due to fluid exiting a half-cell via a fluid escape element) below the supply manifold pressure, a quantity of make-up liquid may be delivered through the check valve 176, 276 until the pressures are equalized and the one-way valve closes again.

The composition of a make-up liquid may depend on specifics of a reaction to be performed as described elsewhere herein. For example, in the case of a water-splitting alkaline electrolyzer, a make-up liquid may consist essentially of deionized water, possibly with a small concentration of an alkaline hydroxide. For simplicity of description, the make-up liquid may be referred to herein simply as "water" although other make-up liquid compositions may be used instead of or in addition to water.

As shown schematically in FIG. 1 and FIG. 2, a make-up liquid may be supplied to a cell 100, 200 from a supply manifold 178, 278 via a supply conduit 179, 279 which may include a one-way valve 176, 276. The one-way valve 176, 276 may provide several benefits.

As described elsewhere herein, the fluid pressure within a cell may change substantially depending on a stage of operation. Nonetheless, at a "steady state" of operation, the pressure within a half-cell chamber may fluctuate only minimally. Therefore, an average cell pressure during "steady state" operation may be established empirically and/or by design. As used herein, "steady state" operation refers to a stage of operation during which operating variables of the cell (e.g., voltage, pressure, temperature, etc.) fluctuate minimally, or no more than about 10%.

In particular, a steady state pressure of the cell or a half-cell chamber is a pressure that varies by no more than about 20%, in some embodiments no more than about 10%, in some embodiments no more than about 5%, in some embodiments less than about 3%, and in some embodiments less than about 1%. In some embodiments, a steady-state pressure is a pressure that varies by less than about 2 bar, less than about 1 bar, less than about 0.5 bar, less than about 0.3 bar, less than about 0.2 bar, less than about 0.15 bar, less than about 0.1 bar, or less than about 0.07 bar. In some embodiments, a steady state half-cell pressure may vary by less than about 5 psi, in some embodiments less than about 3 psi, in some embodiments less than about 2 psi, and in some embodiments less than about 1 psi. A steady state pressure may be a pressure that varies by less than about 2 atm, less than about 1 atm, or less than about 0.5 atm, less than 0.25 atm or less than 0.05 atm.

At a steady state of operation, the fluid pressure within the cell will also tend to have minimal variation and may be referred to as a "steady state pressure" of the cell or a half-cell chamber. In some embodiments, the half-cell pressures may vary minimally from one another during steady state operation, so the steady state cell pressure may also be substantially the same as the steady state pressure within both half-cells.

In addition to a "steady state" of operation, some embodiments of an electrochemical system may experience an "idle" state, a "startup" state, and a "shutdown" state. Depending on an application of the electrochemical system, the rate or frequency at which a system is required to cycle from start up, run at steady state, shut down, and idle may vary substantially. For example, some embodiments of an electrolyzer used to produce hydrogen as an energy store may be started up, run, shutdown, and idled several times per day. In some embodiments, an electrolyzer may be operated at various currents between minimum and maximum operating currents for which the electrolyzer is designed. For example, an electrolyzer supplied with power from a solar array may experience rapid changes in supplied current due to moment-to-moment variation in power generated by the solar panels due to changing cloud cover or other conditions. Such changes in current may cause momentary changes in pressure within a cell or half-cell.

In some embodiments, the make-up liquid in the supply manifold 178, 278 may be maintained at a pressure that is approximately equal to or slightly greater than an expected steady-state pressure within the half-cell into which the make-up liquid is delivered. This allows for passive delivery of make-up liquid to the cell 100, 200 when the pressure in the half-cell chamber 232, 242 drops below the pressure maintained in the supply manifold 178, 278.

On the other hand, when a pressure in the half-cell chamber 232, 242 exceeds a pressure in the supply manifold 178, 278, gas and electrolyte are prevented from flowing back into the supply manifold by the one-way valve 176, 276. Any one-way valve may be used, including the various one-way valve examples described elsewhere herein.

In various embodiments, the pressure in the supply manifold may be maintained at a pressure that is approximately equal to a median steady state fluid pressure in the cell. In embodiments in which an electrochemical system is operated at an absolute pressure higher than atmospheric pressure, the pressure of the supply manifold make-up liquid may be maintained at a desired absolute pressure or at a desired relative pressure defined with reference to an expected, applied, or measured cell pressure.

Although FIG. 1 and FIG. 2 illustrate a supply manifold 178, 278 delivering a make-up liquid to the negative half-cell, the make-up liquid may alternatively be added to the positive half-cell, or to both half cells. In alternative configurations, a cell may be arranged so as to allow for make-up fluid to be added to an inter-electrode space between the positive and negative electrodes 102, 104, 202, 204.

In some embodiments, the supply manifold pressure may be applied or maintained by a pump, such as a positive displacement pump, a ventricular pump, or any other pump type, including those described elsewhere herein. In some embodiments, a pump supplying make-up liquid to the supply manifold may be controlled by an electronic controller operating in a closed-loop control system based on a pressure sensor or a flow sensor. In still other embodiments, a supply manifold pressure may be applied or maintained by any other mechanism capable of applying pressure to a fluid such as an elevated supply reservoir, compressed gas, or others. In some embodiments, a particular pressure may be maintained or regulated through the use of a compressed gas and/or backpressure regulators.

Fluid Pressure Controls

Figure 4:
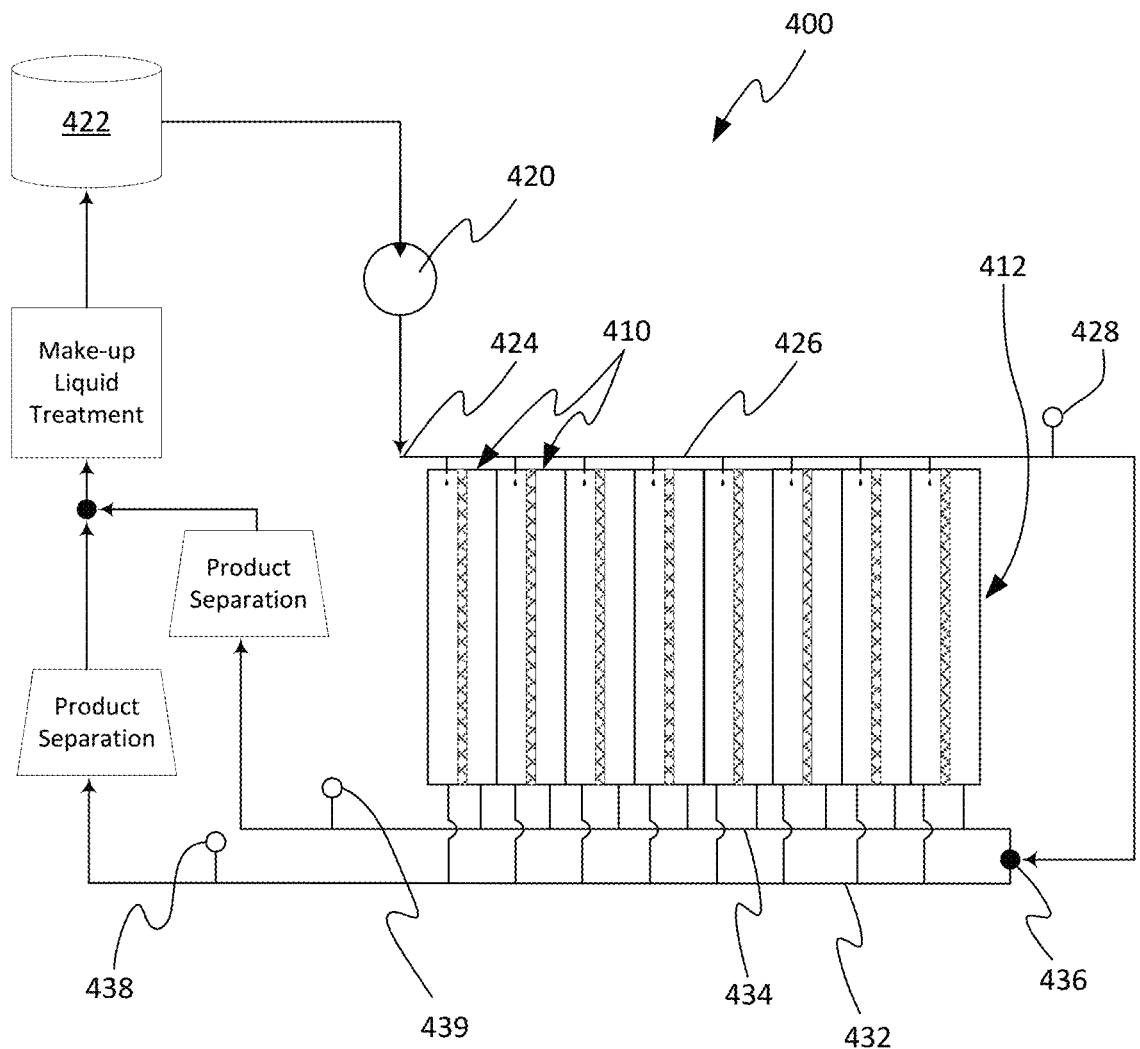
FIG. 4 is a schematic illustration of an electrolyzer system utilizing a stack of FIG. 5A-FIG. 5D are schematic charts illustrating fluid pressure, flow, and volume relationships during various stages of operation of an electrolyzer with electrolyte confinement features.

FIG. 4 is a schematic illustration of a fluid management system 400 for delivering make-up liquid to electrochemical cells 410 in a cell stack 412 and for removing produced gases from the cells 400 with a gas-removal liquid. In the system of FIG. 4, the make-up liquid and the gas-removal liquid may be substantially the same liquid, such as deionized water. For simplicity, the term "water" will be used to describe the fluid flows, but the actual composition of the gas-removal liquid and/or the make-up liquid may be different as described elsewhere herein.

As shown in FIG. 4, a first pump 420 may deliver water from a storage tank 422 to an inlet 424 of a supply manifold 426 of a cell-stack 412. The supply manifold 426 may deliver water to each cell 410 of the cell-stack 412 as described herein. In some embodiments, the first pump 420 may be controlled by an electronic controller based on measurements from one or more sensors 428. In some embodiments, a sensor 428 may comprise one or more pressure sensors, and the controller may contain digital or analog programming to maintain the water entering the stack supply manifold 426 within a desired range of pressure.

Alternatively, a sensor 428 may comprise one or more flow sensors (e.g., a sensor for detecting a volumetric flow rate or a mass flow rate) and the controller may contain digital or analog programming to maintain a flow rate of water flowing into the supply manifold 426 within a desired range. In some embodiments, a controller may control the first pump based on both pressure and flow sensors. In still other embodiments, the sensor 428 may be or comprise a back-pressure regulator configured to control a pressure in the supply manifold 426 by applying a back-pressure at a point down-stream of the cell stack 412.

In some embodiments, water exiting the supply manifold 426 may be pumped by a second pump (not shown) into the gas-removal manifolds 432, 434. Alternatively, the water exiting the supply manifold 426 may flow into the gas removal manifolds under pressure created by the first pump 420. In some embodiments, the water conduit may be divided into a positive gas-removal manifold 432 and a negative gas-removal manifold 434 at an entrance 436 to the cell-stack 412. In some embodiments, the second pump (if present) may be controlled by an electronic controller based on measurements from one or more sensors 438 (e.g., a pressure sensor and/or a flow sensor as described above) at the inlet to the gas-removal manifolds 432, 434. Alternatively, a sensor 438 may comprise a back-pressure controller configured to maintain pressure within the gas removal manifolds within a desired range of pressure.

Water passing through the gas-removal manifolds 432, 434 will collect gas produced by the cells 410 and may also collect a small quantity of electrolyte in the form of droplets, mist, or vapor. After exiting the gas-removal manifolds 432, 434, the separate mixtures of water and fluids collected from the cell-stack 412 may be directed to product separation, filtration, purification, or other treatment systems where the water may be treated prior to being directed into the storage tank and/or being returned to the cell-stack 412. In some embodiments, the storage tank, treatment systems, or other elements may be omitted.

Electrochemical systems comprising features described herein may be configured to maintain pressure relationships between various fluid pressure regions primarily under passive control. With reference to FIG. 2 (but also applicable to other configurations), pressure relationships in a cell 200 may be described with reference to four pressure regions. A first pressure region is defined as the full-cell volume which includes the positive and negative half-cell chambers 232, 242, the electrolyte return conduits 214, 216, and the expansion volume 280. A second pressure region is defined as the negative gas-collection volume 282, the negative fluid escape element 260 defining a boundary between the first pressure region and the second pressure region. A third pressure region is defined as the positive gas-collection volume 284, the positive fluid escape element 261 defining a boundary between the first pressure region and the third pressure region. A fourth pressure region is defined as the make-up liquid supply manifold 278, and the supply inlet valve 276 defining a boundary between the fourth pressure region and the first pressure region. In some embodiments, additional pressure regions may also exist. For example, a ventricular pump actuation fluid may define a fifth pressure region, and a working fluid establishing resistance to the expansion volume may define a sixth pressure region.

In some embodiments, pressure relationships between the above-defined pressure regions may be maintained by actively controlling pressure in only some of the regions, allowing components operating in response to pressure differences to passively maintain pressure relationships. As described above, a pressure in a make-up liquid supply manifold 278 may be maintained at a constant pressure that is approximately equal to or slightly greater than a steady-state fluid pressure in the full-cell 200 (or in the half-cell 244 into which make-up liquid is delivered). The positive and negative gas removal manifolds 222, 224 may be maintained at a pressure lower than a minimum pressure in the full-cell or half-cells, thereby ensuring that fluid will flow out of the half-cell chambers as described above. The fluid pressure in the full-cell may fluctuate depending on a stage of operation of a cell 200.

FIG. 5A-FIG. 5D provide schematic illustrations of the flow rate of make-up fluid entering a cell (e.g., 200 in FIG. 2) from a supply manifold 278, a volume of fluid in the full-cell (i.e., a degree of expansion of the expansion volume 280), and relative pressures of the four above-defined pressure regions at four stages of operation of the cell. The Charts of FIG. 5A-FIG. 5D illustrate relative values (not necessarily to scale) and therefore do not include numerical values. Pressure of the four pressure regions are shown relative to the left vertical axis, while a flow rate of make-up liquid is shown relative to a separate right-side vertical axis. Pressures in each of the four pressure regions and make-up liquid flow rate are shown at different values of full-cell fluid volume which is represented on the horizontal axis.

All of FIG. 5A-FIG. 5D show the full-cell pressure increasing as the expansion volume increases, with the full-cell pressure intersecting a make-up liquid supply pressure (which may be maintained constant at all expansion volumes) at a point at or near zero volume expansion. The positive and negative gas removal manifolds may also be maintained at constant pressures at all expansion volumes. In some embodiments, the positive gas removal manifold pressure may be maintained substantially equal to the negative gas removal manifold pressure. The positive and negative gas removal manifold pressures may also be intentionally held at different pressures, with either a positive gas-removal liquid or a negative gas-removal a liquid held at a higher pressure relative to the other. The positive and negative gas removal pressures are shown in FIG. 5A-FIG. 5D as different lines in order to clearly show both lines.

Figure 5A:
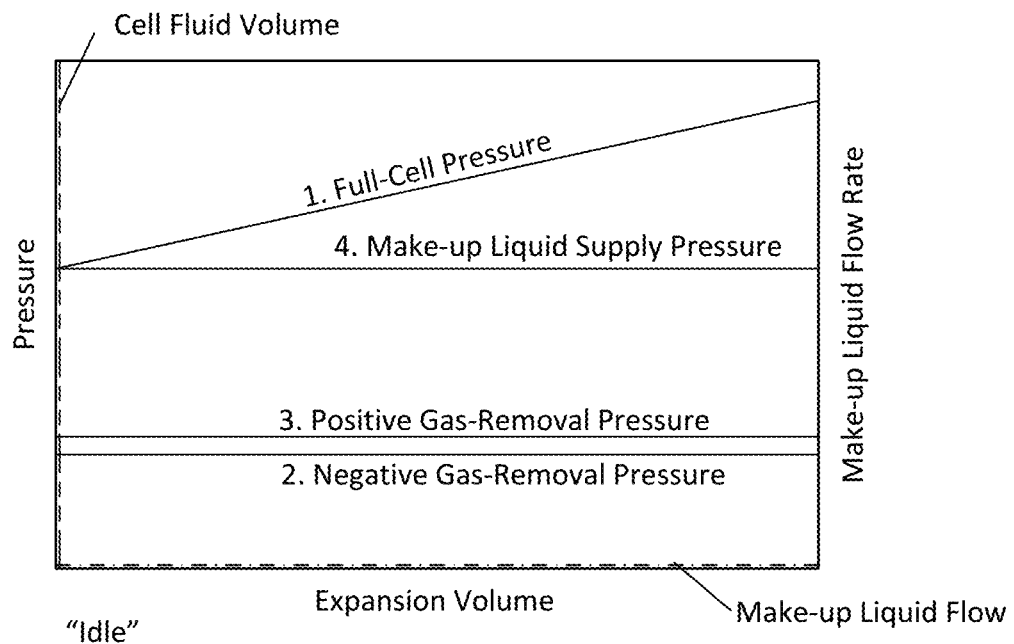

FIG. 5A represents pressures and make-up liquid flow rate at an "idle" state. At the "idle" state, the pressure regions have been pressurized to desired relative (and/or absolute) pressures, but no power is being delivered to the cell and therefore no gas is being generated. At the idle state, electrolyte return pumps 272, 274 may be operated to return captured electrolyte from the electrolyte capture volumes 210, 212 to the half-cell chambers 242, 232 and/or the expansion volume 280. As a result of the returning electrolyte flow, electrolyte in one or both half-cells may tend to flow through the fluid escape elements 260, 261 from the half-cell chambers 242, 232 into the electrolyte capture volumes 210, 212.

As shown in FIG. 5A, at the idle state the full-cell fluid volume will be at its minimum (i.e., minimal or no expansion of the expansion volume 280), and thus the full-cell fluid pressure is greater than or equal to the pressure in the make-up liquid supply manifold 278 and therefore the flow rate of make-up liquid into the cell is zero.

Before startup, the gas-liquid separators 282, 284 may be pre-pressurized above the controlled liquid pressure in the removal manifolds 432, 438. Also before startup, the half-cell chambers may be pre-pressurized to a desired minimum cell operating pressure and/or other regions may be pre-pressurized to desired pressures.

When the cell is started, the formation of gas in the cell will cause a volumetric expansion of the fluid within the half-cell chambers and accommodated by deflection of expansion volume, accompanied by an increase in pressure due to resistance imparted by the expansion volume as described above. Pressure is allowed to build in the cell as fluid expands into the expansion volume, but pressure will increase as gas is produced until gas and electrolyte escape through fluid escape element. Pressure in the gas removal manifolds may be controlled to be approximately equal to a minimum pressure expected in the cell, meaning gas pressure will build in the gas-liquid separator until gas enters solution and/or forms bubbles in the gas-removal fluid flowing in the gas-removal manifolds.

Figure 5B:
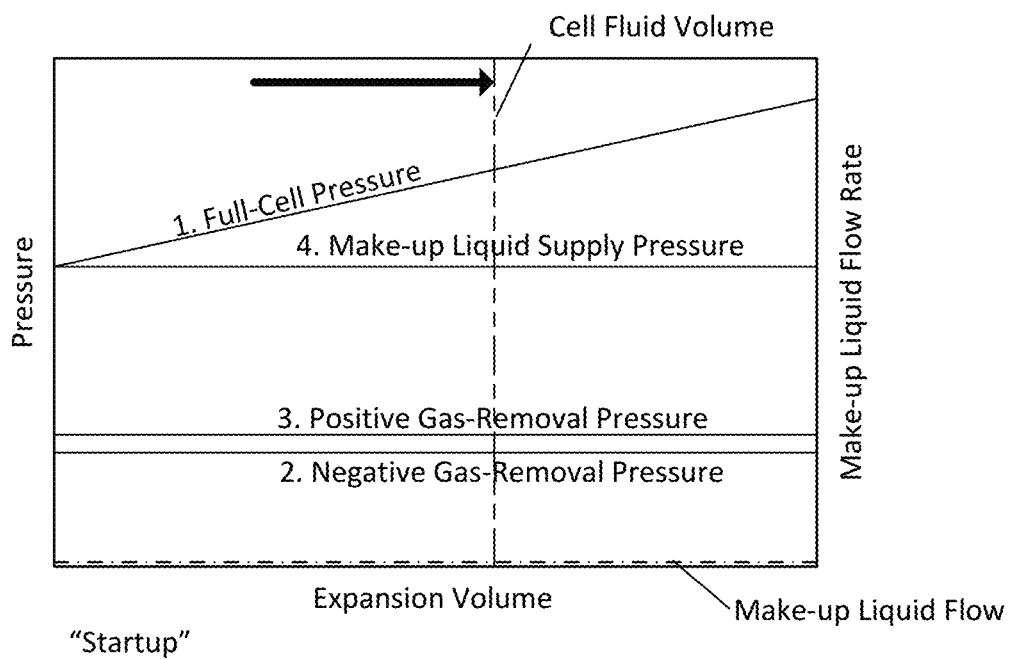

During the "startup" state illustrated in FIG. 5B, the cell fluid volume may increase (as shown by the arrow) due to gas-forming reactions in one or both half-cell chambers, and the increased fluid volume may expand into the expansion volume, thereby increasing the full-cell pressure of the liquid and gas in the half-cell chambers. Because full-cell pressure exceeds the make-up liquid supply pressure, no make-up liquid will tend to flow during the startup period. As fluid leaves the half-cell chambers 242, 232 into the electrolyte capture volumes 210, 212 and gas removal manifolds 222, 224, the volume and pressure of the fluid in the half-cells will fall.

Figure 5C:
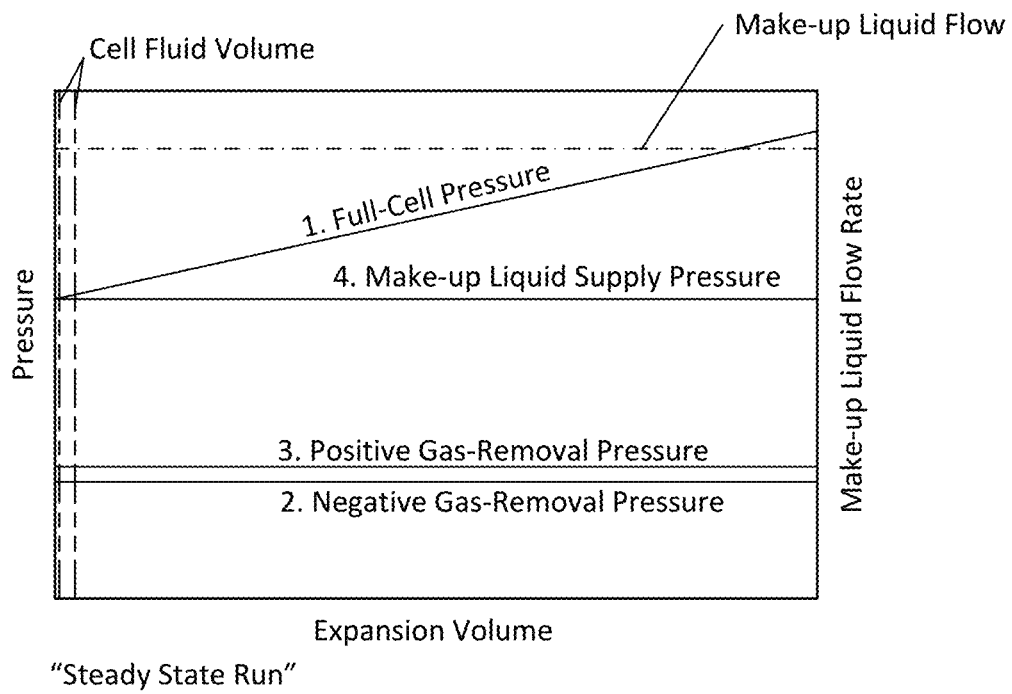

As represented in FIG. 5C, once the cell reaches a steady-state running operation, the cell fluid volume will return to a minimum, at which point make-up liquid may flow. During steady-state operation, the total volume of fluid in the cell and/or the fluid pressure within the cell will tend to oscillate between a low-pressure point at which make-up fluid may flow and a slightly higher-pressure point at which the full-cell pressure exceeds the make-up liquid supply pressure at which point no make-up fluid flows.

Figure 5D:
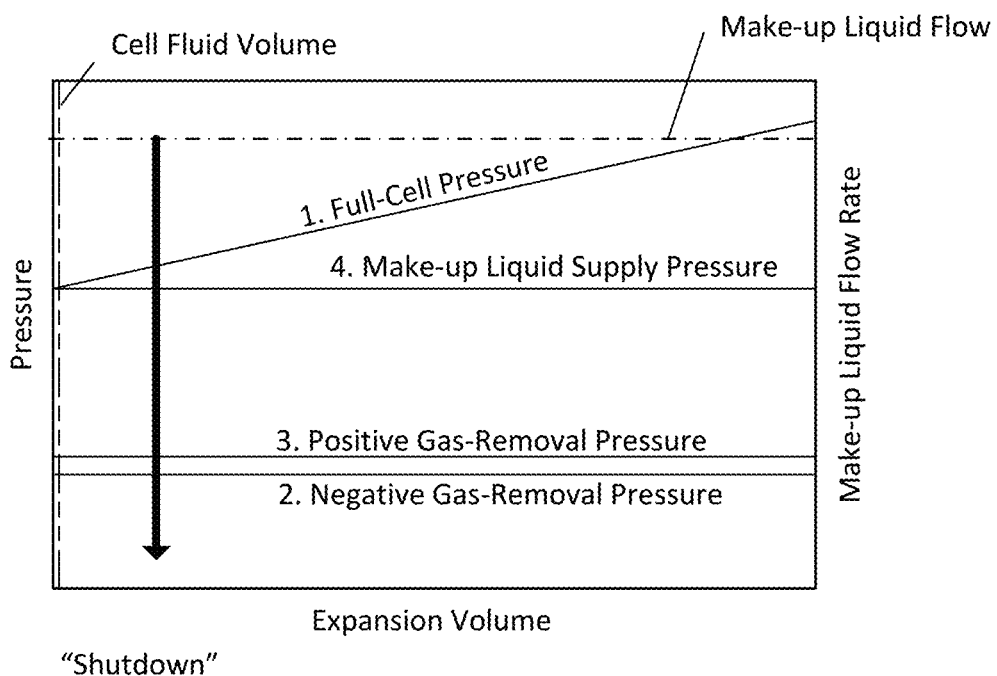

As illustrated in FIG. 5D, when the cell is shut down, the cessation of gas production will cause the full-cell pressure and volume to quickly fall back towards the "idle" state of FIG. 5A, and the make-up liquid flow rate will fall to zero as the pressure oscillations driving occasional pressure differences allowing fluid flow dissipate.

One-way check valves, such as the valve 276 separating the make-up liquid supply manifold and the half-cell volume 242, typically require a pressure difference exceeding a "cracking pressure" before they will open to allow unidirectional fluid flow. Various examples herein are described assuming "ideal" check valves which are shown requiring zero cracking pressure. In practical implementations, one-way check valves will have non-zero cracking pressures, and pressure differences between the various pressure regions will need to be sufficient to overcome the cracking pressures before fluid will flow. In some embodiments, check valve cracking pressure may be chosen based on desired performance characteristics.

In some embodiments, flow of process water in electrochemical systems described herein (including low-flow ion-exchange electrolyzers (LFIE) and other electrolyzers as described herein) may be substantially entirely controlled by monitoring and managing pressure at various points in the system. For example, in some embodiments, flow of process water through an electrochemical cell-stack may be controlled by pressure regulators affecting fluid pressure at three points: a process-water supply manifold, a positive gas-removal manifold, and a negative gas-removal manifold.

Figure 14A:
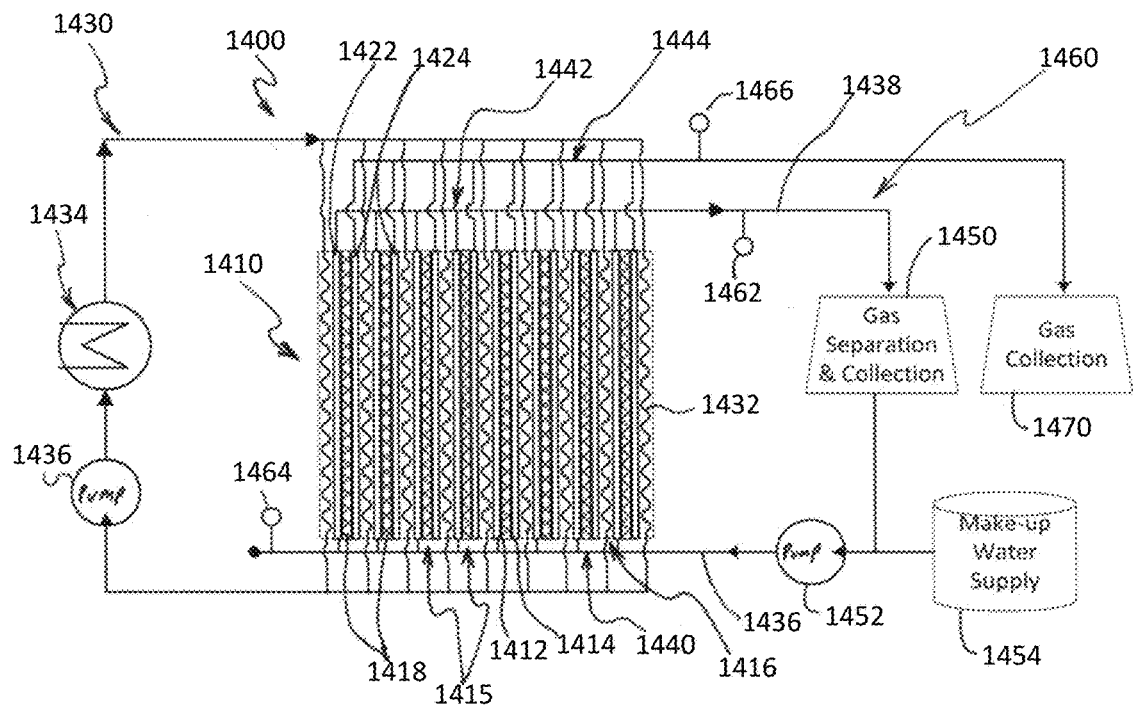
FIG. 14A and FIG. 14B are schematic illustrations of exemplary embodiments of electrolyzer systems with thermal management components independent of process water components.
Figure 14B:
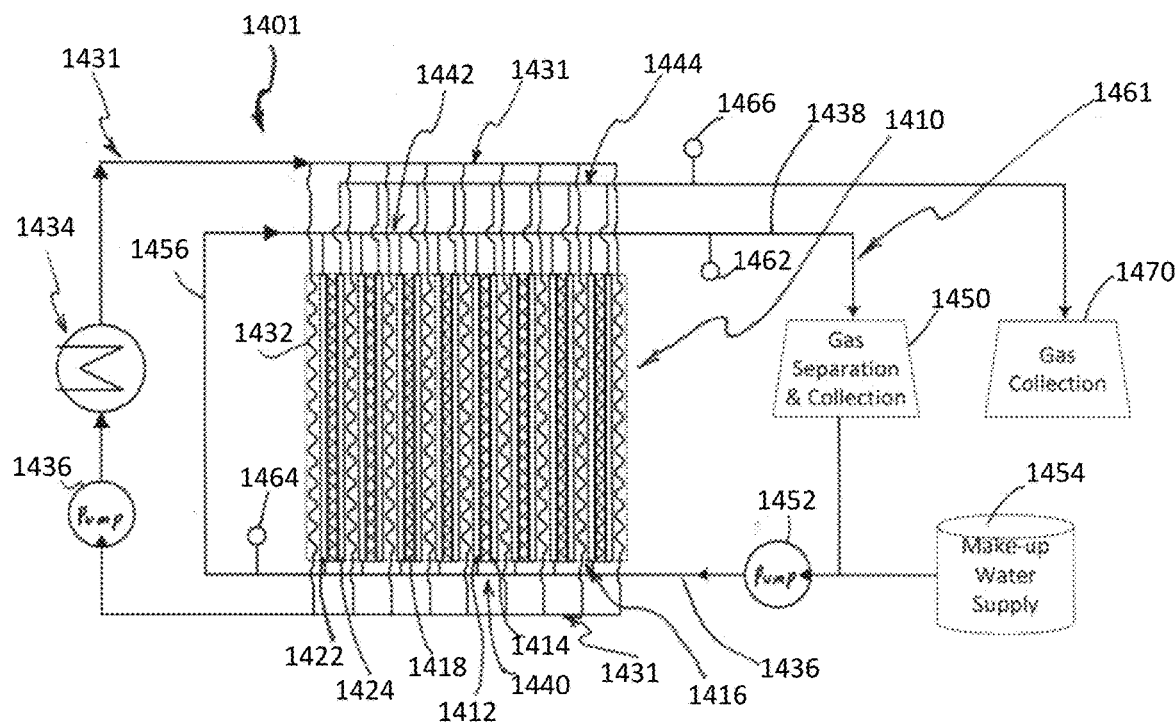

As shown in FIG. 14A and FIG. 14B, pressure in a process water supply manifold 1440 may be controlled by a back-pressure regulator 1464 located downstream of an inlet to the supply manifold 1440. In alternative embodiments, pressure in the supply manifold 1440 may be controlled by a pressure regulator located upstream of the supply manifold 1440. Alternatively, pressure in the supply manifold 1440 may be controlled by operation of the pump 1452 in a closed-loop or open-loop control system.

In other embodiments, the pump 1452 may be operated in an un-controlled or minimally-controlled manner by simply delivering a sufficient flow of process water to the supply manifold 1440 for the pressure regulators 1464, 1466, 1642 to control respective pressure by regulating back-pressure.

Similarly, in some embodiments, pressure in the first-gas removal manifold 1422 may be controlled by a back-pressure regulator 1462 located downstream of the first gas-removal manifold 1442, and pressure in the second gas removal manifold 1444 may be controlled by a back-pressure regulator 1466 located downstream of the manifold 1444.

Example Configurations

The various systems and sub-systems described above may be modified, omitted, or differently configured in various embodiments of electrochemical systems. Some examples of such configurations are described below with reference to FIG. 6-FIG. 18. The examples of FIG. 6-FIG. 18 (or portions thereof) may be variously combined with one another or with other configurations or embodiments described herein.

Figure 6:
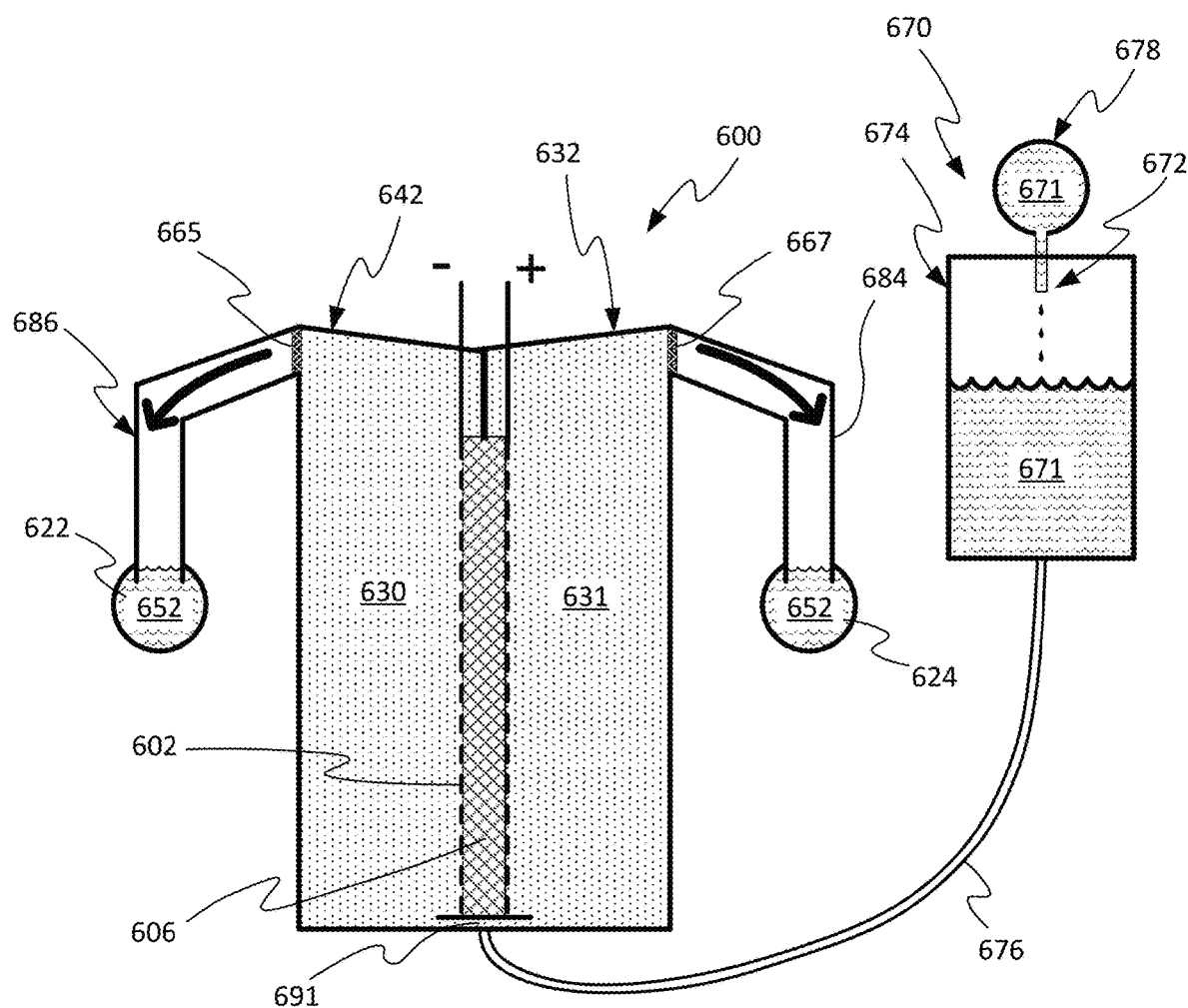
FIG. 6 is a schematic illustration of an electrochemical system in which make-up liquid may be passively delivered into the cell without exiting the cell.

FIG. 6 represents an alternative configuration in which make-up liquid is passively delivered into both half-cell chambers simultaneously. FIG. 6 schematically illustrates an electrochemical cell 600 with a positive half-cell chamber 632 and a negative half-cell chamber 642 separated by a separator 606, and being configured to retain electrolyte 630, 631 within the cell 600 or half-cell chambers 632, 642. The system of FIG. 6 differs from the embodiments of FIG. 1 and FIG. 2 in that the gas removal volume and the electrolyte capture volume are a single coincident volume 686, 684. In some embodiments, the fluid escape element 665, 667 may be a membrane, e.g., a hydrophobic phase-discriminating membrane that substantially prevents the transmission of liquid electrolyte while allowing gas to escape into the gas removal liquid 652 carried in the gas removal manifold 622, 624. Any electrolyte 630, 631 that does escape through the membrane 665, 667, either in liquid or vapor form, may be returned to the cell via the make-up liquid supply manifold 678.

FIG. 6 also schematically illustrates a modified make-up liquid supply system 670 comprising a drip-feed 672 fed by a supply manifold 678. Notably, the drip-feed 672 omits the one-way valve of the embodiments of FIG. 1 and FIG. 2, thereby supplying a constant drip-fed flow of make-up liquid from the supply manifold 678 in which make-up liquid 671 may be maintained at a controlled pressure.

The make-up liquid supply system 670 of FIG. 6 also includes a drip reservoir 674 that is fed from the drip-feed 672. Make-up liquid 671 may be directed from the drip reservoir 674 to the cell 600 by a supply conduit 676. As suggested above, the make-up liquid 671 may contain a small concentration of electrolyte that may have escaped the cell 600. In various embodiments, make-up liquid may be driven from the drip reservoir 672 into the cell 600 by gravity (e.g., hydrostatic head pressure created by locating the drip reservoir 674 vertically above the cell 600), by one or more pumps, or by pressure within the drip reservoir 674 established by a fluid pressure in the supply manifold 678 and/or in the reservoir 674 itself.

In some embodiments, as shown in FIG. 6, the supply conduit 676 may be joined to the cell 600 adjacent to a cross-over region 691 providing fluid communication between the negative electrolyte 630 and the positive electrolyte 631. This may allow a degree of pressure-equalization between the positive 631 and negative 630 electrolytes as described above and may allow for make-up liquid to be equally delivered to both half-cell chambers 632, 642. In some embodiments, the pressure at the cross-over region 691 may slightly exceed the steady-state pressure in the half-cell chambers 632, 642 (e.g., as established by a controlled pressure in the reservoir 674 and/or the supply manifold 678), thereby generally minimizing cross-over of electrolyte from one half-cell chamber to the other while also minimizing pressure differences between the half-cell chambers.

In a cell-stack based on the system of FIG. 6, each cell in the cell-stack may include half-cell chambers 642, 632, a separator 606, electrodes 602, 604, fluid escape elements 665, 667, gas removal/electrolyte capture volumes 686, 684, drip reservoir 674, drip feed 672, and supply conduit 676. The supply manifold 678 and the gas-removal manifolds 622, 624 may be joined to all other cells in the stack and to additional processing equipment, for example as described herein with reference to FIG. 4. In some embodiments, fluid flow in the make-up liquid supply conduit may be driven by a single pump actuator (e.g., a ventricular pump actuator) joined to make-up liquid supply conduits in several (or all) cells of a cell-stack.

Figure 7:
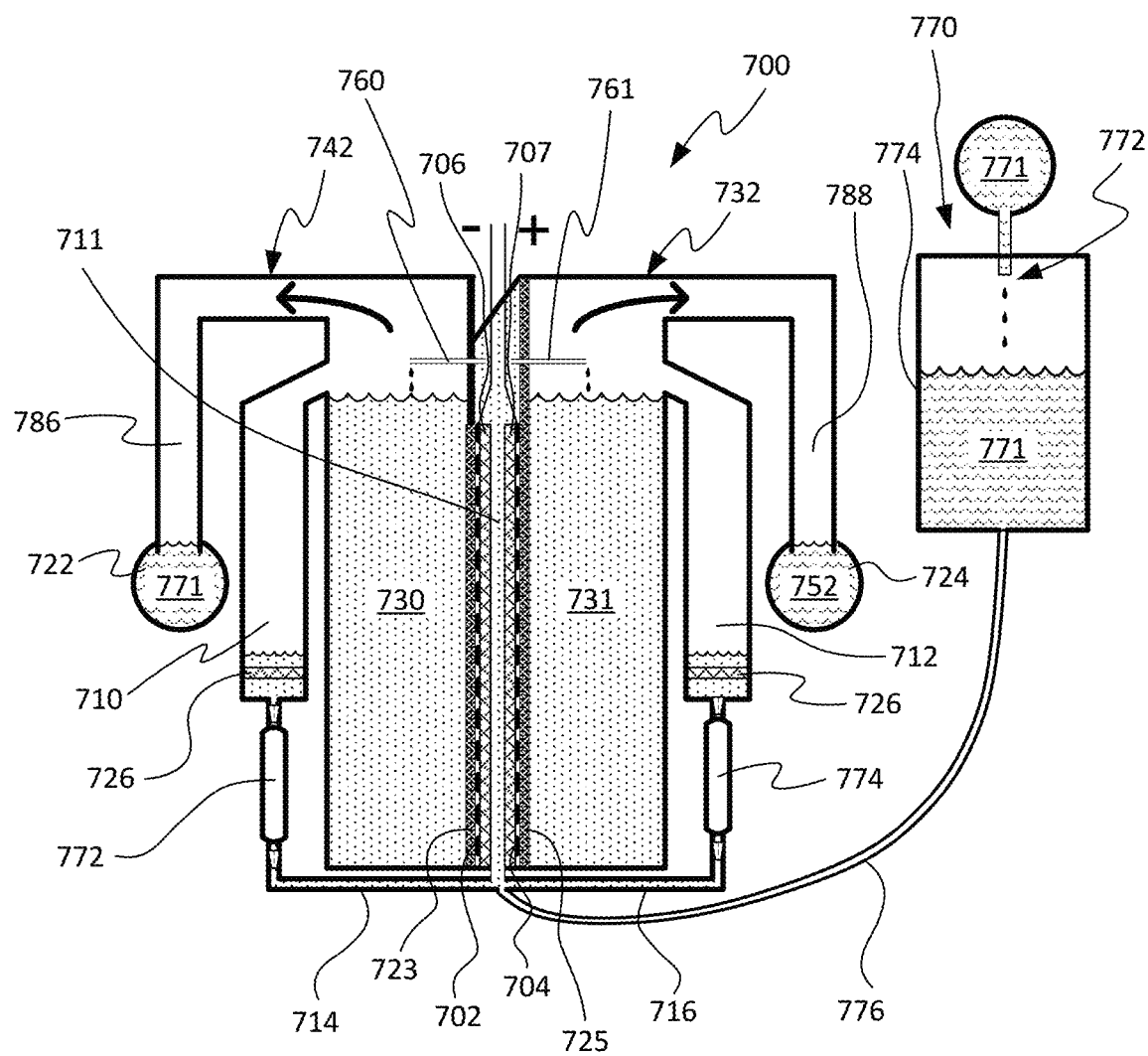
FIG. 7 is a schematic illustration of an electrochemical system in which make-up liquid is passively delivered into an inter-electrode space between positive and negative electrodes.

FIG. 7 schematically illustrates an alternate configuration of a cell 700 in which make-up liquid 771 (which may contain some electrolyte) is driven into an inter-electrode space 711 between the negative 702 and positive 704 electrodes. In the configuration of FIG. 7, each electrode 702, 704 may have a gas-removal membrane 723, 725 affixed to an outer side of the electrode. Each electrode 702, 704 may also comprise a separator membrane 706, 707 on an inner side facing the inter-electrode space 711.

As in FIG. 1 and FIG. 2, the cell 700 of FIG. 7 may include separate electrolyte capture volumes 710, 712 and gas removal volumes 786, 788, and electrolyte return conduits 714, 716 may direct captured electrolyte into the inter-electrode space under the force of one or more pumps 772, 774 such as those described above. While fluid escape elements are not shown in FIG. 7, any fluid escape elements may be used in combination with a cell such as that shown in FIG. 7.

As electrolyte and make-up liquid are driven into the inter-electrode space 711, pressure may build, and electrolyte may drip through drip tubes 760, 761 extending from the inter-electrode space to the half-cell chambers 742, 732 filled with electrolyte 730, 731. In some embodiments drip tubes 760, 761 may be constructed similarly to egress channels or other series or parallel fluid escape elements described elsewhere herein above.

In a cell-stack based on the system of FIG. 7, each cell in the cell-stack may include half-cell chambers 742, 732, separator membranes 606, 707, electrodes 702, 704, drip tubes 760, 761, electrolyte capture volumes 710, 712, electrolyte return conduits 714, 716, gas removal volumes 786, 788, drip reservoir 774, drip feed 772, and supply conduit 776. The supply manifold 771 and the gas-removal manifolds 722, 724 may be joined to all other cells in the stack and to additional processing equipment, for example as described herein with reference to FIG. 4. In some embodiments, fluid flow in the make-up liquid supply conduit may be driven by a single pump actuator (e.g., a ventricular pump actuator) joined to make-up liquid supply conduits in several (or all) cells of a cell-stack.

Figure 8:
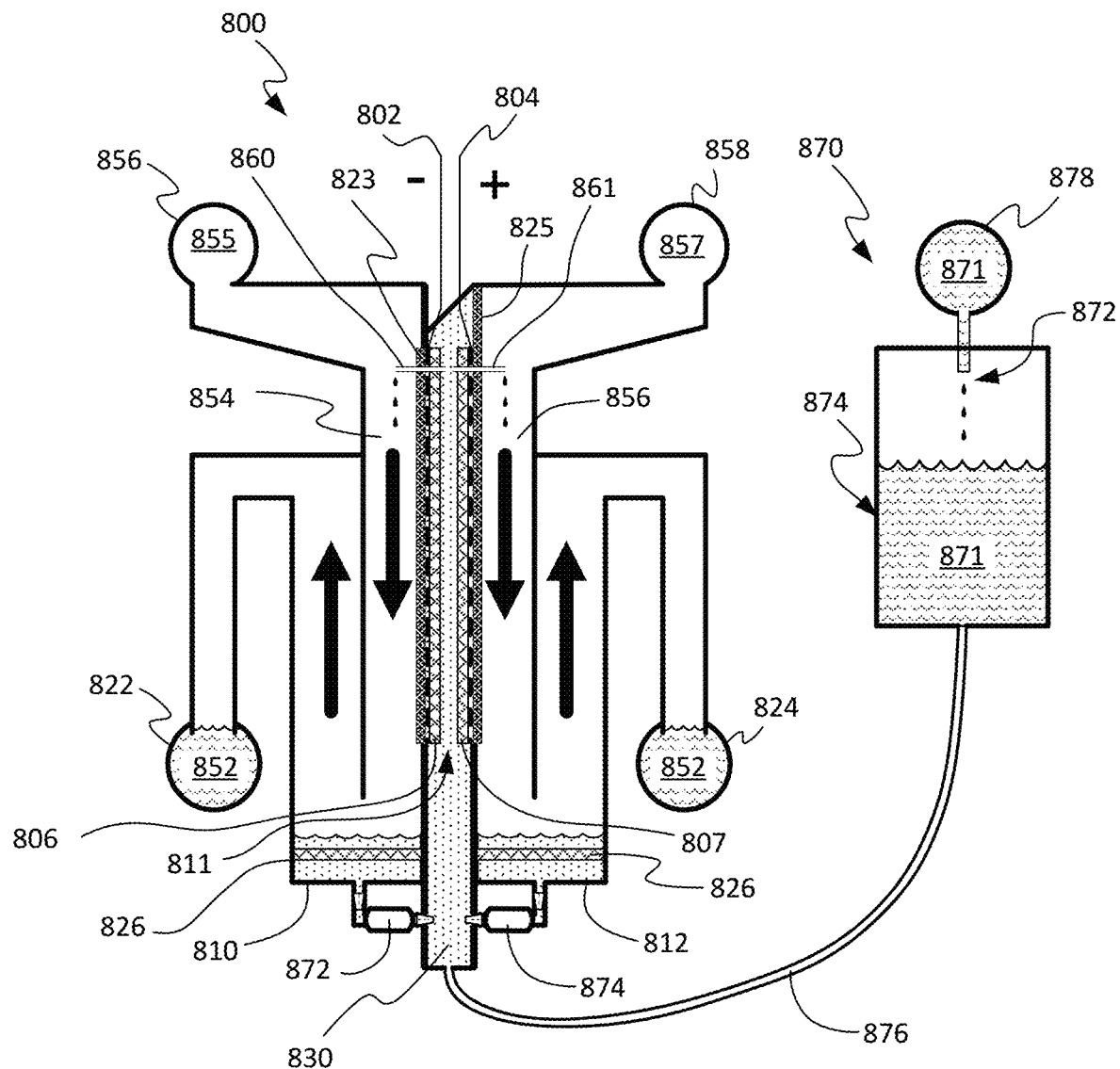
FIG. 8 is a schematic illustration of an electrochemical system configured to be cooled by flowing gases, including gases produced by electrochemical reactions within the cells.

FIG. 8 schematically illustrates a cell 800 which combines features of the cell 700 of FIG. 7 with features allowing for gas-cooling of the cell 800. The cell 800 of FIG. 8 comprises a negative electrode 802 with a separator membrane 806 on an inner side and a hydrophobic membrane 823 on an outer side and a similarly configured positive electrode 804, separator membrane 807 and hydrophobic membrane 825. Gases produced at each electrode 802, 804 may pass through the corresponding hydrophobic membrane 823, 825 into a gas-flow space 854, 856.

A cooling gas 855, 857 may be directed from an inflow manifold 856, 858 through the gas-flow space 854, 856 where it will be joined with gas produced at the corresponding electrode 802, 804. The combined gas stream may then flow into the corresponding gas removal manifold 822, 824. In some embodiments, the inflow manifold 856, 858 may receive gas circulated through all cells of a cell-stack or multiple cell-stacks.

In some embodiments, the gas-flow spaces 854, 856 may be maintained predominantly liquid-free (except for liquid electrolyte that may flow through the drip tubes 860, 860 or that may seep through the membranes 823, 825) by phase discriminatory hydrophobic membranes 823, 825. Alternatively or in addition, the gas flow spaces 854, 856 may be maintained substantially liquid-free by maintaining a gas pressure in the gas-flow spaces 854, 856 that exceeds (or is equal to) a pressure of the liquid electrolyte in the inter-electrode space 811.

The cell 800 of FIG. 8 may also include fluid egress channels 860, 861 extending from within the inter-electrode space 811 to the gas-flow spaces 854, 856. Electrolyte 830 may escape from the inter-electrode space 811 to the gas-flow spaces 854, 856 via either the egress channels 860, 861 or via leakage through the hydrophobic membranes 823, 825. Electrolyte 830 that escapes from the inter-electrode space 811 (by either path) may be collected in an electrolyte capture volume 810, 812 at the bottom of a corresponding gas-flow space 854, 856. Captured electrolyte may be returned to the inter-electrode space 811 under power of one or more pumps 872, 874, which may include a ventricular pump or other pump types as described above.

In a cell-stack based on the system of FIG. 8, each cell in the cell-stack may include gas-flow spaces 854, 856, separators 806, 807, membranes 823, 825, electrodes 802, 804, fluid escape elements 860, 861, electrolyte capture volumes 810, 812, drip chamber 874, drip feed 872, supply conduit 876, and electrolyte return conduits. The supply manifold 878, gas inflow manifolds 856, 857 and the gas-removal manifolds 822, 824 may be joined to all other cells in the stack and to additional processing equipment, for example as described herein with reference to FIG. 4. In some embodiments, fluid flow in the make-up liquid supply conduit may be driven by a single pump actuator (e.g., a ventricular pump actuator) joined to make-up liquid supply conduits in several (or all) cells of a cell-stack.

Figure 9:
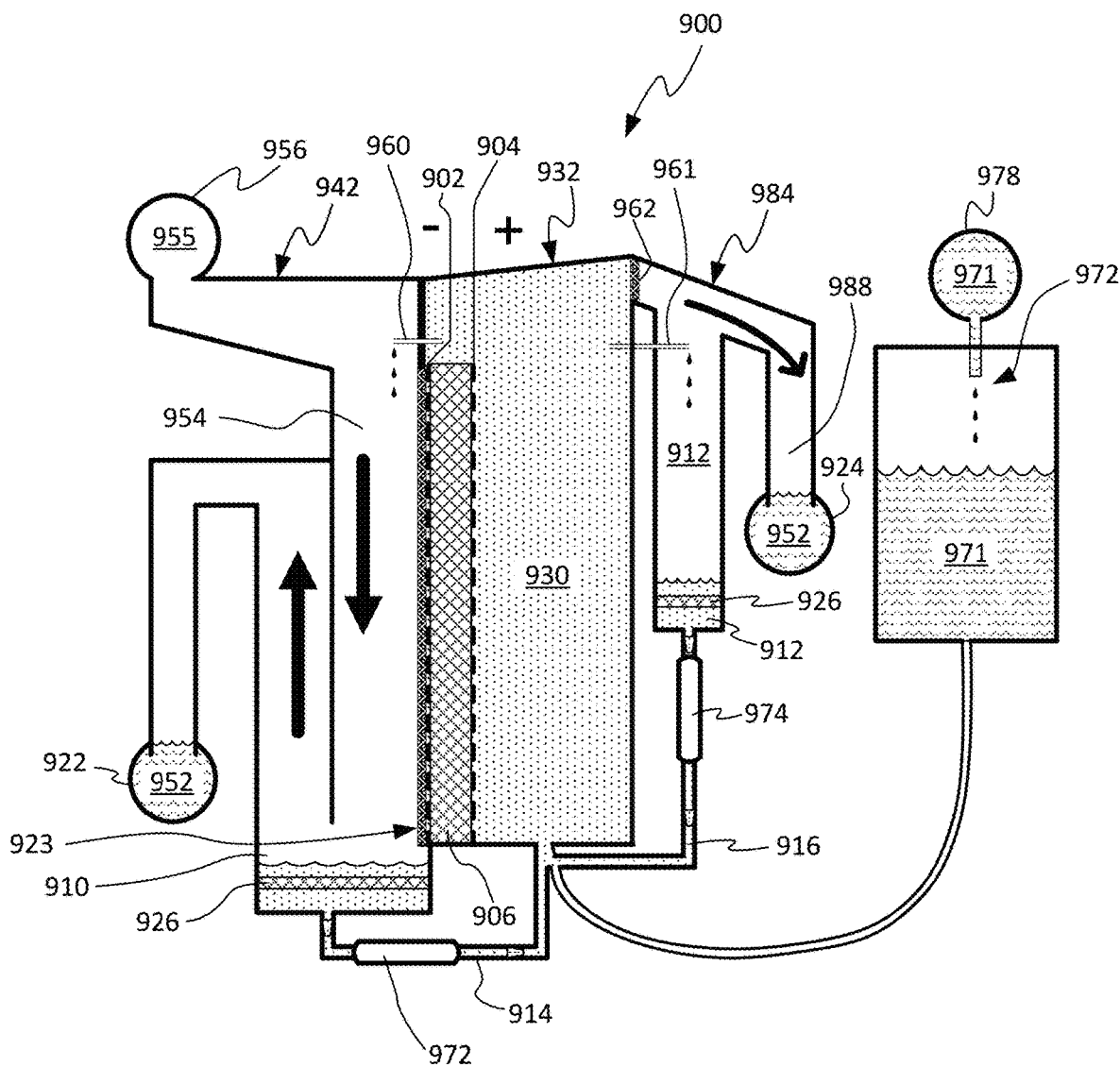
FIG. 9 is a schematic illustration of an electrochemical system comprising electrolyte confinement features and in which one half-cell is flooded with electrolyte and/or make-up liquid and a counter half-cell contains only gas, including gas produced in the counter half-cell and gas driven through the counter half-cell chamber.

FIG. 9 schematically illustrates a cell 900 that combines features of FIG. 1 and FIG. 8 to form a cell in which one half-cell may be gas-cooled, while the opposite half-cell is cooled by another mechanism (not shown). The negative half-cell 942 of FIG. 9 is configured similarly to that shown in FIG. 8, comprising a hydrophobic membrane 923 adjacent to the negative electrode 902 which abuts a separator membrane 906 on an inner side. The negative half-cell 942 also comprises a gas inflow manifold 956, a gas-removal manifold 922, a gas-flow space 954 joined to an electrolyte capture volume 910, and an electrolyte return conduit 914.

The positive half-cell 932 of FIG. 9 comprises a positive electrode 904 submerged in electrolyte 930 which may saturate a separator membrane 906 between the positive 902 and negative 904 electrodes. The positive half-cell 932 may be joined to an electrolyte capture volume 912 and a gas removal volume 988 by one or more fluid escape elements such as a fluid egress channel 961 and/or a membrane 962. The electrolyte capture volumes 910, 912 may be joined to corresponding electrolyte return conduits 914, 916 through which electrolyte may be driven by one or more pumps 972, 974.

Figure 10:
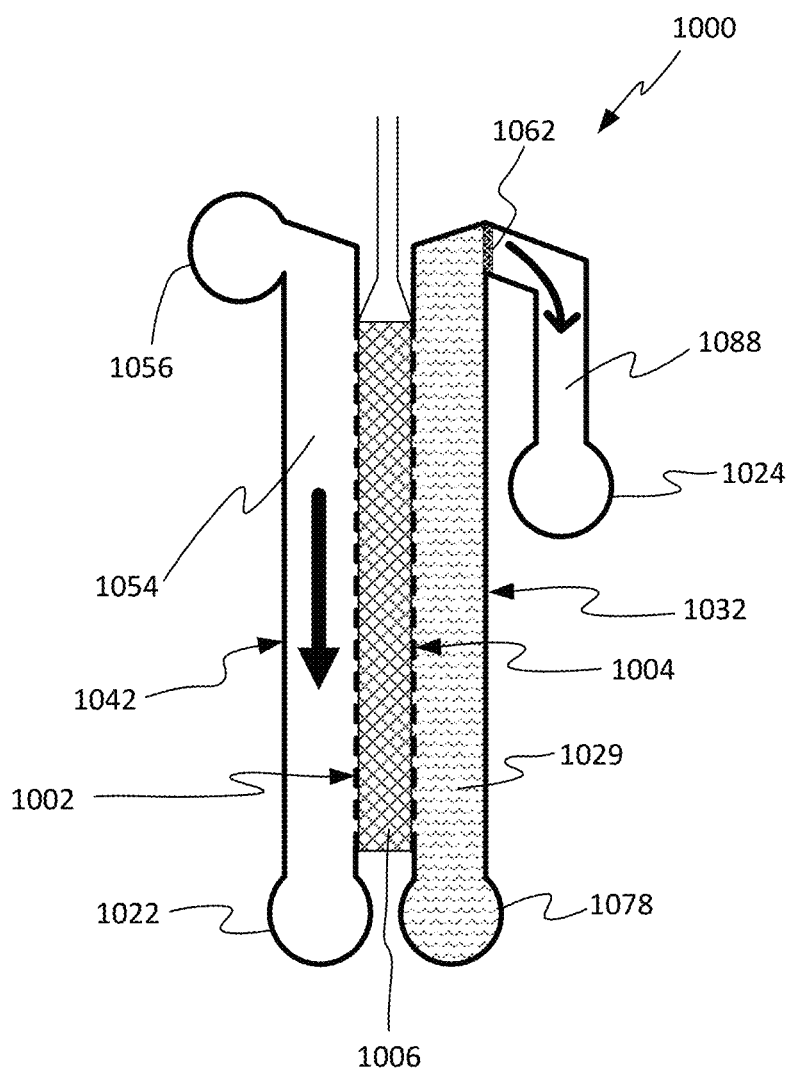
FIG. 10 is a schematic illustration of a gas-cooled PEM (proton exchange membrane) or AEM (anion exchange membrane) electrochemical cell utilizing electrolyte confinement features.

FIG. 10 represents embodiments of an electrochemical cell utilizing certain features described herein. In some embodiments, FIG. 10 represents embodiments of a gas-cooled PEM (proton exchange membrane) electrochemical cell, such as a low-flow PEM electrochemical cell, utilizing certain features described herein. In some embodiments, FIG. 10 represents embodiments of a gas-cooled AEM (anion exchange membrane) electrochemical cell, such as a low-flow AEM electrochemical cell, utilizing certain features described herein. FIG. 10 schematically illustrates a cell 1000 with a separator membrane 1006 separating a gas-side electrode 1002 from a liquid-side electrode 1004. In some embodiments, the separator membrane 1006 may be an ion-exchange membrane (i.e., a proton exchange membrane or an anion exchange membrane). In some embodiments, the ion-exchange membrane may be liquid-impermeable and/or gas-impermeable. Optionally, any of the electrochemical cells, and any of the cell stacks, described in this application can include features of cell 1000 according to FIG. and as described here.

For the purpose of this description, the liquid-containing half-cell and its components will be referred to as "right-side" components and the gas-containing half-cell and its components will be referred to as "left-side" components, notwithstanding that actual implementations may take many other positional configurations. If a proton exchange membrane (PEM) is used, the liquid-containing (right-side) half-cell may be the positive-polarity half-cell. If an anion exchange membrane (AEM) is used, the liquid-containing (right-side) half-cell may be the negative-polarity half cell.

The right-side half-cell chamber 1032 may be flooded with a liquid 1029 which may be an electrolyte or a make-up liquid, such as but not limited to process water. The liquid 1029 may saturate the separator or contact membrane 1006, creating a three-phase solid-liquid-gas interface at or within the left-side electrode 1002. A phase-discriminating hydrophobic membrane 1062 (or other fluid escape element) may separate the right-side half-cell chamber 1032 from a right-side gas-collection volume 1088 and right-side gas-removal manifold 1024. In the illustrated configuration, the right-side gas-removal manifold 1024 omits the gas-removal liquid described in connection with various embodiments above.

The cell of FIG. 10 may include a pressure-controlled gas-injector manifold 1056 that directs a first gas into a left-side half-cell chamber 1042. The first gas injected into the left-side half-cell chamber may be identical to, a component of, or mixable with a gas produced by the left-side electrode 1002 during electrochemical reactions with the right-side counter-electrode 1004. The combined injected gas and gas produced at the left-side electrode may then be collected in a gas-removal manifold 1022.

The left-side gas-removal manifold 1022 of FIG. 10 also omits the gas-removal liquid described in connection with various embodiments above. In the embodiment of FIG. 10, the left-side half-cell chamber 1042 is "liquid-free" or "gas-only." Therefore, the gas mixture removed from the left-side half-cell chamber 1042 may be removed as gas alone. The gas-only state of the left-side half-cell chamber may be maintained by controlling the gas pressure at the injection manifold 1056 to a pressure sufficient to prevent the liquid 1029 from dripping into the left-side half-cell chamber 1042.

Gas flowing through the left-side half-cell chamber 1042 may advantageously cool the cell 1000. For example, in embodiments in which the cell is a water electrolyzer producing hydrogen gas at the left-side electrode 1002 and oxygen at the right-side electrode 1004, the hydrogen gas may flow through the left-side half-cell from a recirculation system, and may carry excess heat out of the cell. For example, in a gas-cooled PEM configuration of FIG. 10, the negative half-cell chamber 1042 (left-side) is "liquid-free" or "gas-only". Therefore, the gas or gas mixture removed from the negative half-cell chamber 1042 may be removed as gas alone. The gas-only state of the negative half-cell chamber may be maintained by controlling the gas pressure at the injection manifold 1056 to a pressure sufficient to prevent the liquid 1029 from dripping into the negative half-cell chamber 1042 through or around the separator 1006. The gas pressure may be sufficient if it is approximately equal to or greater than a liquid pressure in the liquid-filled half-cell chamber. In other embodiments, the gas pressure may be sufficient if it is less than the liquid pressure in the positive half-cell by no more than the wetting pressure (or liquid ingress pressure or "bubble point") of the separator membrane 1006. The wetting pressure of a membrane is an experimentally-determined property of a membrane (typically listed as a material property of some separator membrane materials), defined as the liquid pressure difference from one side of the membrane to the other at which the liquid penetrates the membrane and passes through to the opposite side.

In various embodiments, the configuration of FIG. 10 may be modified by reversing the polarity of the electrodes. Therefore, in such embodiments, the positive (left-side) half-cell chamber 1032 would be liquid-free and the negative (right-side) half-cell chamber may be flooded with make-up liquid or electrolyte (right-side). For example, in a gas-cooled AEM configuration of FIG. 10, the negative half-cell chamber is filled with water or other make-up liquid 1029 and the positive half-cell chamber may be cooled by flowing produced oxygen gas through the positive half-cell chamber. In some embodiments, the oxygen gas in the positive half-cell chamber may be diluted by flowing supplemental oxygen gas or another gas or gas mixture into and through the positive half-cell chamber. Such a dilution gas may be a non-reactive gas such as nitrogen, argon, or other substantially non-reactive gas or gas mixture.

In a cell-stack based on the system of FIG. 10, each cell in the cell-stack may include a right-side half-cell chamber 1032, a right-side electrode 1004, a left-side half-cell chamber 1042, a left-side electrode 1002, a fluid escape element 1062, and a separator 1006. The supply manifold 1078 and the gas-removal manifolds 1022, 1024 may be joined to all other cells in the stack and to additional processing equipment, for example as described herein with reference to FIG. 4. In some embodiments, fluid flow in the make-up liquid, such as but not limited to process water, supply conduit may be driven by a single pump actuator (e.g., a ventricular pump actuator) joined to make-up liquid supply conduits in several (or all) cells of a cell-stack.

In various embodiments, features shown and described with reference to one of the figures may be combined with features shown and described in a separate figure, and such additional combinations are intended to be within the scope of this disclosure. For example, any of the configurations of FIG. 6-FIG. 9 may be modified to include a make-up liquid supply configuration as described with reference to FIG. 1 and FIG. 2.

Although various examples and embodiments provided above describe electrochemical systems configured for electrolyzing water to produce hydrogen and oxygen gases, the devices, systems, and methods described herein may also be adapted and/or applied to various other electrochemical systems. In some embodiments, an electrochemical system having features described herein may be an electrolyzer configured for use in producing one or more chemicals.

One example is a chlor-alkali process in which an aqueous electrolyte containing sodium-chloride is electrolyzed to produce chlorine gas and sodium hydroxide. In such examples, a make-up liquid may comprise a solution containing sodium chloride, and produced chemicals (e.g., chlorine and sodium hydroxide) may be removed from each cell via a product-removal conduit (e.g., "a gas-removal manifold" as described above) in gaseous and/or liquid form.

In another example, an electrochemical system having features described herein may be used to electrolyze a solution containing potassium chloride to produce potassium hydroxide and chlorine gas. In such a system, a supply manifold may deliver a make-up liquid comprising a solution containing potassium chloride, and produced chemicals (e.g., chlorine and potassium hydroxide) may be removed from each cell via a product-removal conduit (e.g., "a gas-removal manifold" as described above) in gaseous and/ or liquid form.

In other examples, electrochemical systems including devices, systems, and/or methods described herein may include electrowinning cells used for extracting metals from solutions containing the metal(s) as dissolved species. For example, some electrowinning cells may be configured for the production of zinc, platinum, gold, or other metals. In embodiments, such electrowinning systems may be configured to deliver solutions containing dissolved metals (e.g., an acidic or alkaline aqueous metal-containing solution) to be extracted as a make-up liquid via a supply manifold.

In still further examples, electrochemical systems having devices, systems, and/or methods described herein may be adapted for performing electrodialysis in which water is purified by the removal of ionic contaminants under an applied electric field. Electrodialysis cells typically include multiple chambers in fluidic series, each or some of which may have features described herein.

Plate-And-Frame Cell-Stack Examples

Various features and components enabling confined electrolyte electrolyzer systems are shown and described above schematically but may be implemented in a plate-and-frame cell-stack made up of a plurality of cell-frames incorporating electrolyte confinement, electrolyte capture-and-return, volume expansion, and other features as described herein. FIG. 11-FIG. 13 illustrate some example plate-and-frame cell-stack components embodying planar implementations of some of the confined-electrolyte features described above. The electrolyte confinement features, electrolyte capture-and-return features and systems, expansion volume, and other features described with reference to FIG. 11-FIG. 13 may be functionally similar to the features described above with reference to one or more of FIG. 1-FIG. 10.

Various example features of cell-frame structures will now be described with reference to FIG. 11-FIG. 12B. FIG. 11 is a perspective view showing a first assembled cell 1102 below and aligned with components of a second cell 1104 shown in an exploded view. FIG. 12A illustrates a first side 1202 of a cell-frame 1200 (a first half-cell chamber 1202 partially filled with a visible compliant conductive layer 1112 and an electrode 1114 behind the compliant layer 1112) while FIG. 12B illustrates the opposite side 1204 of the same cell-frame 1200 (a second half-cell chamber 1204 partially filled with a visible compliant conductive layer 1122 and an electrode 1120 behind the compliant layer 1122). Some features (or portions of features) are visible on only one side of the cell-frame 1106, therefore in describing various features, reference may be made to a single figure or to all three figures simultaneously. In various embodiments, the first half-cell may be the negative half-cell and the second half-cell may be the positive half-cell. In other embodiments, the polarities of the illustrated half-cells may be reversed.

Figure 11:
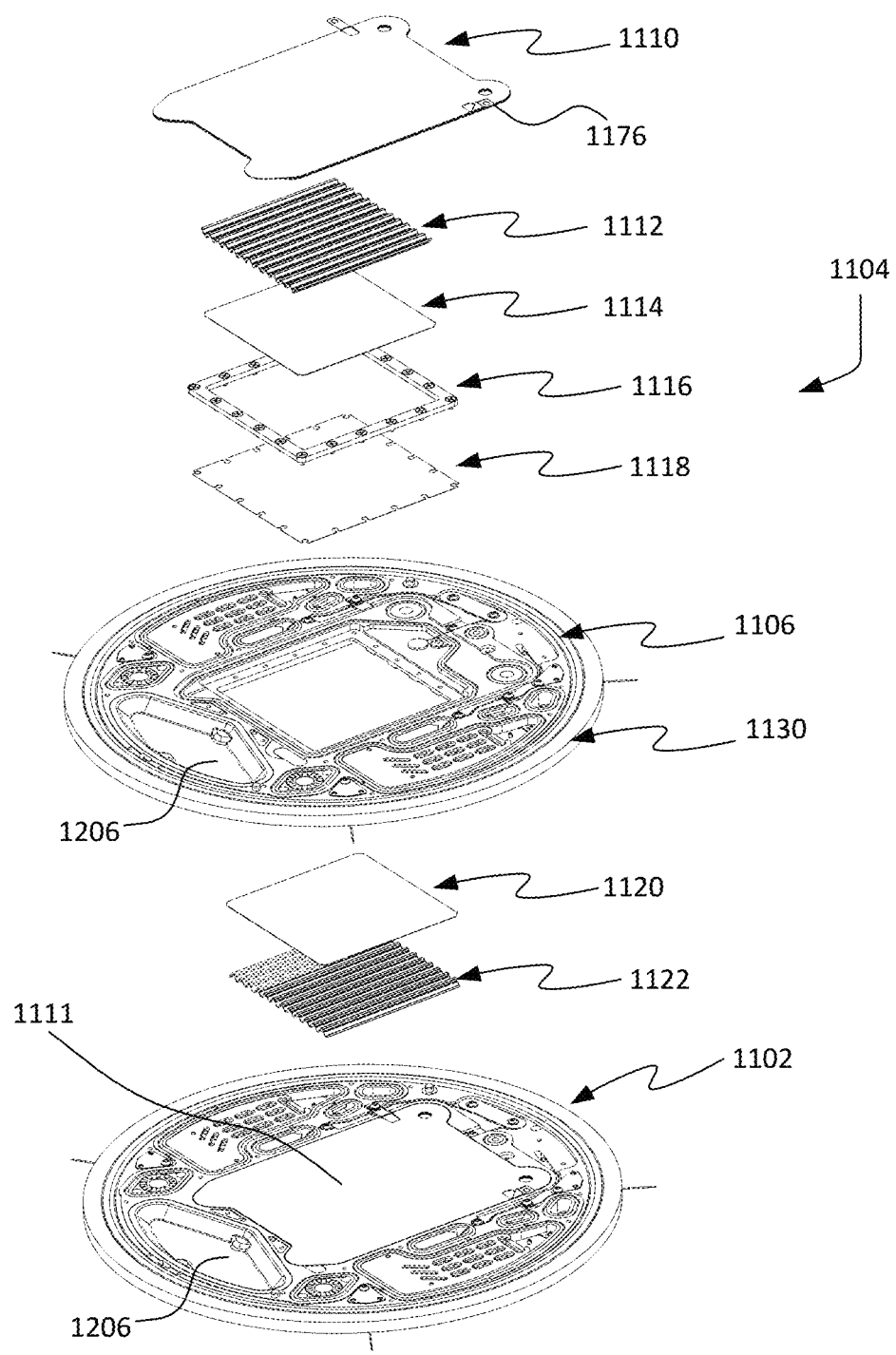
FIG. 11 is an exploded view illustration of example embodiment components of an electrochemical cell in a plate-and-frame cell-stack.
Figure 12A:
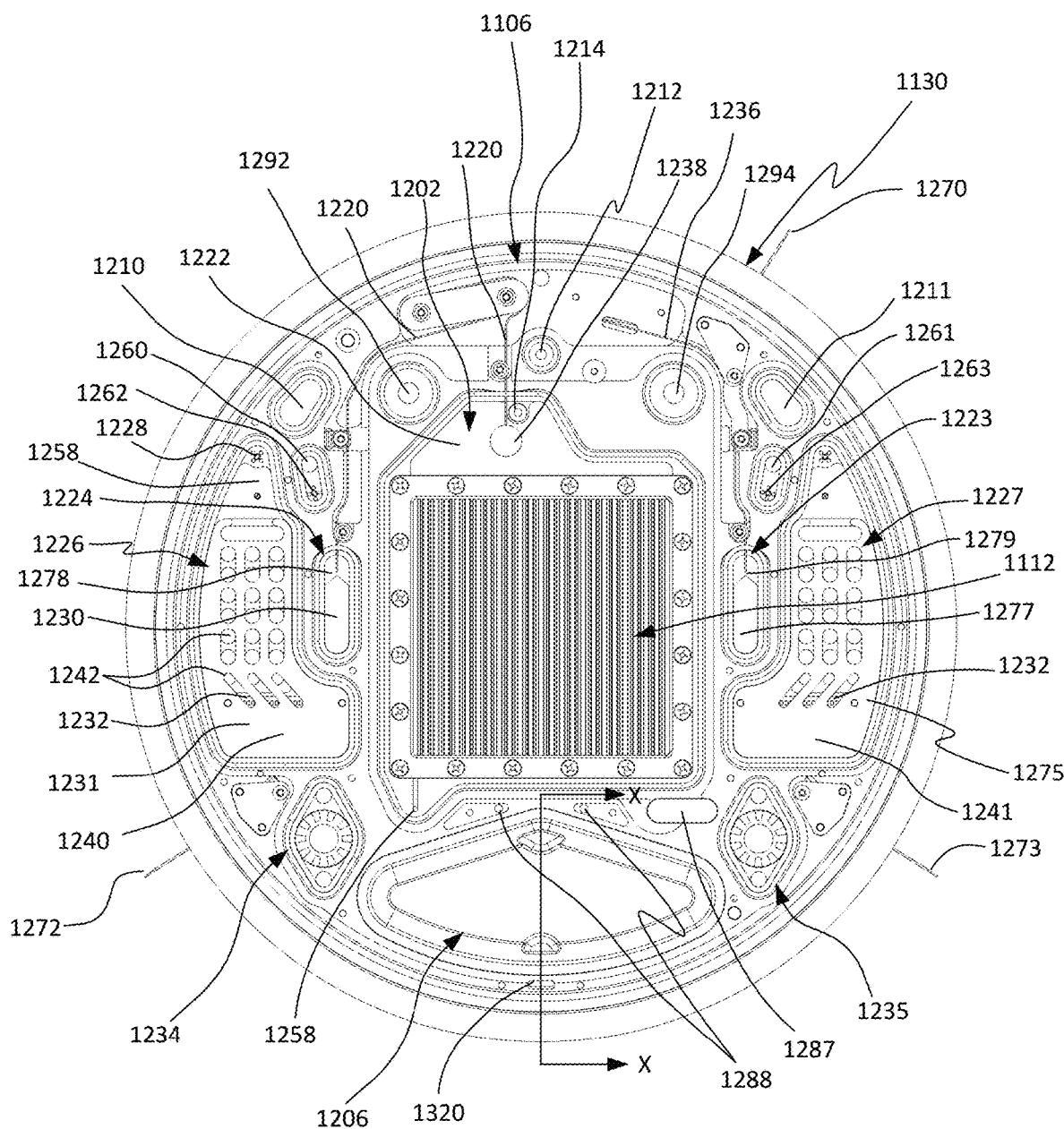
FIG. 12A is a plan-view illustration showing an example arrangement of electrolyte confinement features on a first side of a planar cell-frame configured for inclusion in a bipolar plate-and-frame cell-stack.

FIG. 11 shows some components of a complete cell 1104 in exploded view with a bipolar plate 1111 on top of a central assembly of components. Other features described herein are shown assembled in the cell-frame 1106 for ease of description. The exploded components of the upper cell 1104 include a bipolar plate 1110, a first compliant conductive layer 1112, a first electrode 1114, a separator window 1116, a separator membrane 1118, the cell-frame 1106 (containing various other components described herein), a second electrode 1120, and a second compliant conductive layer 1122. When assembled, the various structures form a relatively thin cell assembly 1102. In some embodiments, the compliant conductive layers 1112, 1122 may be slightly deformed when compressed, thereby applying consistent compression forces across the surface of the electrodes 1114, 1120, separators 1118, and bipolar plates 1110, 1111. A compliant conductive layer 1112, 1122 may also beneficially provide a non-reactive region through which gas may escape each half-cell after being generated on an electrode surface, therefore the compliant conductive layer may also be referred herein to as a "gas egress layer". In other embodiments, a compliant conductive gas egress layer 1112, 1122 may be omitted. A bipolar cell-stack may be formed by compressing multiple cell assemblies 1102 between rigid end-plates (not shown).

Figure 12B:
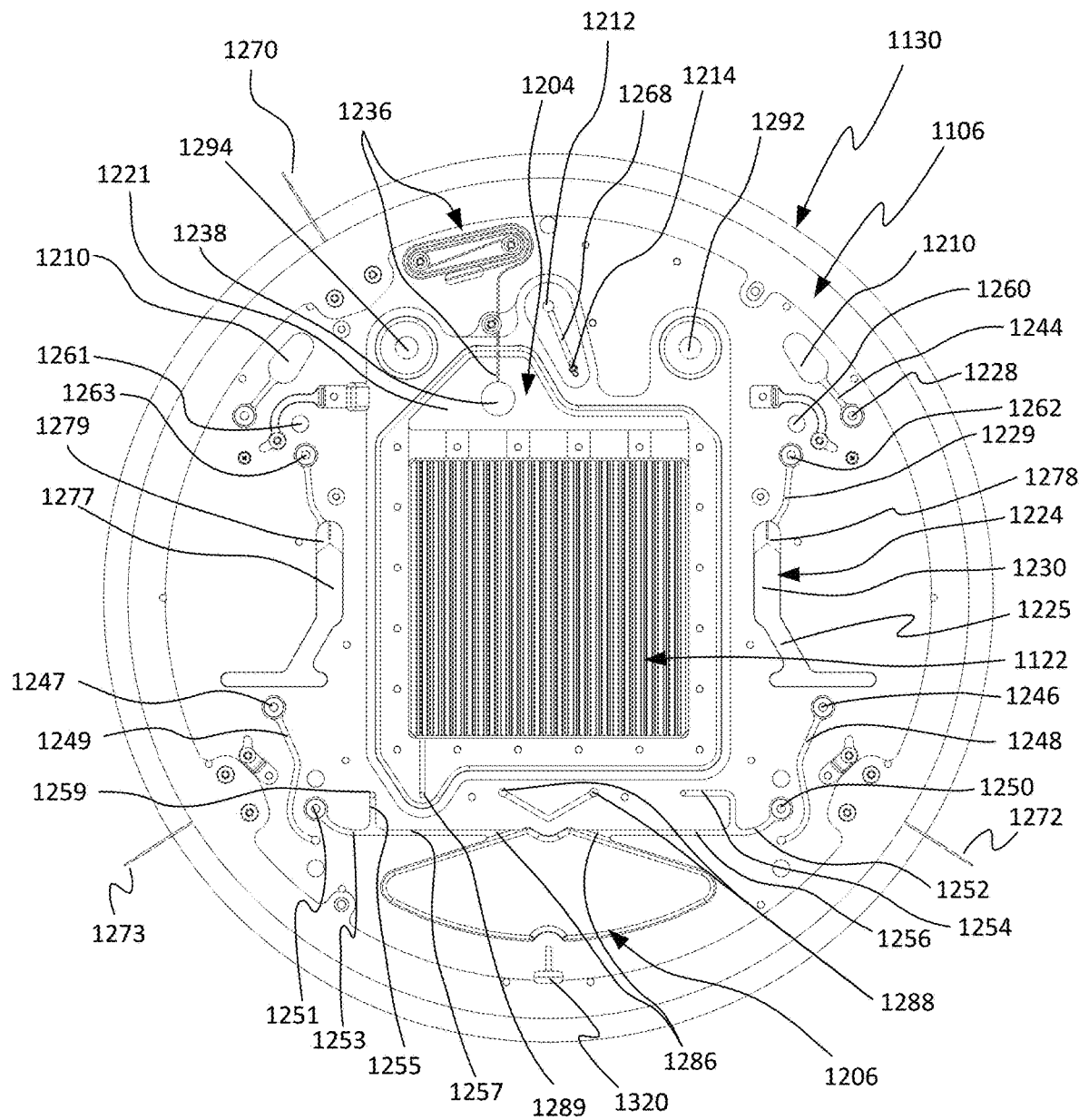
FIG. 12B is a plan-view illustration showing an example arrangement of electrolyte confinement features on a second side of the planar cell-frame of FIG. 12.

FIG. 11-FIG. 13 illustrate planar cell-frame elements, each of which comprises electrochemical cell structures and electrolyte confinement structures as described above. Although the features of FIG. 11-FIG. 12B are shown implemented in circular disk-shaped structures, the same or similar features may be implemented in planar elements of any outer shape, such as elliptical, oblong, square, rectangular, polygonal, etc. In some embodiments, a retention ring 1130 may surround one or more cell-frames 1106 so as to retain pressure within the interior of the cell-frame 1106. For example, in some embodiments, a cell-stack of cell-frames 1106 may be operated at pressures of several to hundreds of bar (i.e., hundreds of kPa to thousands of kPa) relative to a pressure outside of the cell-frame perimeter. A retention ring 1130 may be made of a metal, polymer, or composite material of sufficient tensile strength to retain pressures within the cell-frame 1106 even if the cell-frame material itself is incapable of supporting such pressures.

In some embodiments, each cell-frame 1106 may contain features supporting a single electrochemical cell, including first and second half-cell electrodes 1114, 1120 and chambers 1202, 1204 (filled by the electrodes 1114, 1120 and compliant conductive layers 1112, 1122), an expansion volume 1206 joined to both half-cell chambers 1202, 1204, gas-removal manifolds 1210, 1211 for both half-cells, a make-up liquid supply manifold 1212 joined to a supply inlet 1214 supplying make-up liquid to at least one half-cell chamber 1202, and electrolyte capture-and-return systems for both half-cells. Alternatively, each cell-frame may support features for half-cells of separate full-cells. That is, a full-cell may be formed by a first half-cell in a first cell-frame and a second half-cell in a second adjacent cell-frame.

With reference to FIG. 11, a single cell-frame assembly 1202 may comprise a cell-frame 1106, a positive electrode 1120, a separator 1118, a negative electrode 1120 and a bipolar plate 1110. A bipolar stack of multiple cells may be made by assembling multiple cell-frame assemblies 1102 with one bipolar plate 1110, 1111 between each pair of adjacent cell-frames 1106. The cell-stack may be bolted or otherwise clamped between end-plates (not shown) to compress and seal the cell-frames 1106 against one another. In various embodiments, each bipolar plate 1110, 1111 may comprise the multi-layer bipolar plate described herein with reference to FIG. 15, or any other available single-layer or multi-layer structures suitable as bipolar plates 1110.

In the example embodiment cell-frames shown in FIG. 11-FIG. 12B, a cover sheet (not shown) may be used to seal various channels and volumes as further described below. For example, a cover sheet may be secured to the cell-frame face shown in FIG. 12B in order to enclose various structures, manifolds, etc. O-rings, gaskets, or other structures may also be used to seal various conduits, manifolds, and other structures against a cover-sheet or cell-frame of an adjacent cell-frame layer. For ease of illustration, the cover-sheet is not shown as it would otherwise obscure described structures. Cover sheets may comprise one or more pieces of material as needed to seal various structures. Cover sheets may be secured to each cell-frame by adhesives (e.g., epoxies, solvents, silicones, etc.), welds (e.g., ultrasonic welds, laser welds, solvent welds, or others), compression, or other methods.

Suitable cover-sheet materials may comprise the same material (or materials) used in forming the cell-frame. Either or both the cell-frame and cover sheet may be made of polymers, metals, ceramics, or other materials resistant to degradation from electrolytes, including the various example materials listed elsewhere herein. For example, either or both the cell-frame and cover sheet may be made of: (i) metal or metal alloys comprising nickel, titanium, aluminum, or any combinations of these; (ii) polymer materials comprising nylon, polyethylene (PE), polypropylene (PP), polyolefins (PO), polyamide (PA), poly(tetrafluoroethylene) (PTFE), polyvinylidine fluoride (PVdF), poly(vinyl chloride) (PVC), polysulfone (PSU), polyphenylsulfone (PPSU), polyetheretherketone (PEEK), FEP (fluorinated ethylene propylene), PFA (perfluoroalkoxy), ETFE (ethylene tetrafluoroethylene), polyvinyl alcohol or polyvinyl acetate (PVA), polycarbonates, polyvinylidenefluoride, polyacrylonitrile, polyetherimides, polyamide, cross-linked polyether, ethylene-methacrylic acid copolymers, fluorinated polymers, sulfonated polymers, carboxylic polymers, NAFION, or any combinations of these; (iii) asbestos, zirconium oxide cloth, cotton, ethyl-cellulose, methyl-cellulose, woven or non-woven cellulose, cellulose acetates, or any combinations of these; or (iv) any combinations of any of these.

With reference to FIG. 12A and FIG. 12B, the electrolyte capture-and-return features are shown. A first half-cell chamber 1202 is formed on one side of the separator 1118 within the central region in which the compliant conductive layer 1112 is visible. The first half-cell chamber is shown partially filled with a compliant conductive layer and an electrode (not visible, behind the compliant conductive layer). The second half-cell chamber is formed in the same manner on the second side of the cell-frame (as shown in FIG. 12B). The electrolyte confinement and capture-and-return features associated with each half-cell may be functionally substantially similar to one another with some geometric variations. Therefore, while features associated with both half-cells are shown in FIG. 12A and FIG. 12B, the following description will generally be made with reference to features associated with one half-cell notwithstanding the fact that features associated with the opposite half-cell may be functionally substantially similar those described. Each of egress channels 1220, headspace region 1222, drip chamber 1224, main gas separation chamber 1226, ventricular pump 1234, electrolyte return channels 1252, 1254, 1256, gas-removal manifold 1210, gas-purge manifold 1244, etc. can be independently present and associated with the first half-cell as well as corresponding features associated with the second half-cell. Alternatively, one or more of these or other features may be present and associated with only one half-cell, such structures being omitted for the second half-cell.

As shown in FIG. 12A, a first egress channels 1220 is shown extending from a headspace region 1222 of the first half-cell chamber 1202 and having a second end in a drip-chamber 1224 of a two-chamber liquid-gas separator. Liquid and gas transported by the egress channel 1220 from the first half-cell chamber 1202 to the first drip chamber 1224 may flow from the drip chamber 1224 to the main gas separation chamber 1226 by a gas separator conduit 1225 (visible in FIG. 12B). An upper region of the main gas separation chamber 1226 forms a gas-collection volume 1258 leading to a gas-removal manifold 1210 via a one-way valve in a gas exit port 1228 and a conduit 1229 (visible in FIG. 12B). In typical operation, a gas pocket may form in the gas-collection volume above a liquid-level in the main gas-separation chamber.

In some embodiments, the drip chamber 1224 and the main gas separation chamber 1226 may be substantially filled with metal foam or metal mesh condenser structures 1230, 1231, which may serve multiple purposes as described below. The lower region of the main gas separation chamber 1226 may comprise a hydrophilic element 1232 to collect liquid electrolyte to be directed to an expansion volume 1206 or the first half-cell chamber 1202 by a ventricular pump 1234 via an electrolyte removal port 1246 and conduit 1248 (FIG. 12B). The expansion volume 1206 may be joined to the first half-cell chamber 1202 and the second half-cell chamber 1204 by conduits.

The egress channel 1220 for the first half-cell chamber 1202 (e.g., the negative half-cell) is visible in FIG. 12A (partially obscured by a small cover-sheet). A portion of the egress channel 1236 for the second half-cell chamber 1204 (e.g., the positive half-cell) is visible in FIG. 12B, while a portion passes through a hole in the cell-frame 1106 to the first side shown in FIG. 12A. As best seen in FIG. 12B, the egress channels 1220, 1236 are shown as having an elongated stadium shape (a rectangle with semi-circular ends). The egress channel of FIG. 12A and FIG. 12B is generally a long section of tubing wound multiple times around the stadium shape, creating a long pathway with curving and straight sections through which gas and electrolyte may transit after escaping a half-cell chamber 1202, 1204 before entering a drip chamber 1224. As described above, the total path length, tortuosity, cross-sectional area, and material properties of an egress channel may be varied in order to achieve a desired degree of pressure drop for liquid and gas passing through the egress channel.

In some embodiments, as shown in FIG. 12A and FIG. 12B, a filter 1238 may be provided at an inlet end of an egress channel 1220, 1236 to prevent any small particles from clogging the egress channel 1220, 1236. If present, such a filter 1238 may be made of a porous material suitably resistant to degradation by the electrolyte, for example metal or polymer mesh, foam, or expanded material.

In the embodiment of FIG. 12A and FIG. 12B, the liquid-gas separators may be divided into a drip chamber 1224 and a main gas separation chamber 1226. In some embodiments, both chambers 1224, 1226 may be substantially filled by one or more porous condensers 1230, 1231. The condenser(s) 1230, 1231 may be made of a porous material (e.g., foam, mesh, or expanded material). The porous condenser material provides surfaces on which liquid electrolyte may condense, allowing the liquid electrolyte to fall by gravity to a lower region of the drip chamber 1224 and the main gas separation chamber 1226. Liquid electrolyte collecting at the bottom of the drip chamber may flow to the main gas separation chamber 1226 by a conduit 1225 (FIG. 12B). Gas may also follow the same pathway 1225 but will tend to float as bubbles in the electrolyte or as continuous gas channel in or above the liquid electrolyte.

The condensers 1230, 1231 may also beneficially be made of a conductive material (e.g., a metal, carbon, graphite, or conductive polymer), which may allow for electronic detection of each "drip" of electrolyte exiting the egress channel 1220 into the drip chamber 1224. This "drip detection" operation may allow for continuous monitoring of the state of operation of each half-cell (and there for each full-cell) in a cell-stack, as further described below. In various embodiments, the condensers 1230, 1231 may be made of a single continuous piece of material or may comprise multiple pieces of material which may be in direct physical and/or electrical contact with one another via one or more electrical conductors.

A lower region of the main gas separator chamber 1226 may comprise an electrolyte-collection volume 1240 and electrolyte outlet 1246 (FIG. 12B) for collecting electrolyte to be pumped back into the cell by a ventricular pump 1235. The electrolyte-collection volume 1240 is functionally similar to the schematic structures for collecting electrolyte described above with reference to FIG. 1 and FIG. 2. The electrolyte collection volume 1240 may comprise a hydrophilic structure 1232 (partially visible through openings 1242 in the gas-separation condenser 1231 in FIG. 12A), such as a section of separator membrane material (as described herein), to substantially prevent or minimize gas egress through the one-way valve of the electrolyte outlet 1246.

As best seen in FIG. 12A, the condenser 1231 in the gas-separation chamber 1226 may comprise a plurality of relatively large-volume voids 1242 in the otherwise porous material. Such voids 1242 may provide regions or pathways for gas to collect while liquid will tend to condense on the surfaces of the porous condenser 1231 in regions between the voids 1242. Gas may then collect in the upper-most region 1224 of the main gas-separation chamber 1226 adjacent to a gas outlet port 1228, which may comprise a one-way valve. As visible in FIG. 12B, the gas outlet port 1228 may be joined to the gas-removal manifold 1210 by a conduit channel 1244 in the cell-frame 1106. The one-way valve in the gas outlet port 1228 may be generally configured to prevent back-flow of gas or gas-removal liquid from the gas-removal manifold 1210 into the main gas-separation chamber 1226.

In some embodiments as shown, each half-cell may comprise a ventricular pump 1134, 1135 for pumping electrolyte from the electrolyte-collection volume 1240, 1241 of the gas-separation chamber 1226, 1227 into its respective half-cell chamber 1202, 1204 and/or into the expansion volume 1206. As shown in FIG. 12B, the driven-fluid inlets 1246, 1247 of the ventricular pumps 1134, 1135 may be located distant from the pump chambers of the respective ventricular pumps 1234, 1235 and connected by conduits 1248, 1249 in the cell-frame 1106. Therefore, electrolyte captured in the electrolyte-collection volumes 1240, 1241 of the gas-separation chambers 1226 may be drawn into the ventricular pump 1234, 1235 and then driven by the ventricular pump into the pump outlet port 1250, 1251 to the pump outlet flow channel 1252, 1253. The pump outlet flow channel 1252, 1253 may branch into a first conduit segment 1254, 1255 leading to the half-cell from which electrolyte was collected and a second conduit segment 1256, 1257 leading to the expansion-volume 1206.

FIG. 12B shows example expansion channels 1255, 1257, 1254, 1256 connecting each half-cell chamber 1202, 1204 to the expansion volume 1206 via expansion volume ports 1286. The end 1158 of first half-cell expansion channel 1254 visible in FIG. 12A may connect through a hole in the cell-frame 1106 to the expansion channel 1254 visible in FIG. 12B. Similarly, a second half-cell expansion outlet 1289 visible in FIG. 12B connects to the end 1259 of expansion channel 1255 through two holes through the cell-frame 1106 covered by a cover sheet 1287 (FIG. 12A).

The expansion volume 1206 may be maintained at a pressure greater than a steady-state pressure of the half-cell chambers 1202, 1204 therefore causing electrolyte to be preferentially driven from the ventricular pumps 1134, 1135 into the respective half-cell from which the electrolyte was captured unless pressure in the half-cell chambers 1202, 1204 is similar to or greater than pressure in the expansion volume 1206.

As will be described further below with reference to FIG. 13, the pressure of the expansion volume 1206 may be controlled by a working fluid delivered via a working fluid manifold 1320. In some embodiments, one or more working fluid purge manifolds 1288 (FIG. 12A and FIG. 12B) may extend through the cell-stack to facilitate purging or removing excess working fluid from the working fluid side of the expansion volume 1206.

In some embodiments, the cell-frames 1106 and cell-stack may comprise one or more gas-purge manifolds 1260, 1261 for each set of half-cells. The gas-purge manifolds 1260, 1261 may be used to purge any air or other gas remaining in each half-cell after assembly of the cell-stack and initial introduction of electrolyte, make-up liquid, and/or working fluid (as described further below). The gas-purge manifolds 1260, 1261 may be joined to the drip chambers 1224, 1223 via one-way valves 1262, 1263 arranged to allow fluid flow from the gas-purge manifolds 1260, 1261 into the drip chambers 1224, 1223 (best seen in FIG. 12B).

A gas purge operation may be performed after initial assembly of the cell-stack or after re-assembly following some maintenance procedures. A gas-purge operation (described with reference to the first half-cell 1202 but applicable to any half-cell in which a gas purge manifold is present) may comprise directing (e.g., pumping or otherwise driving) a gas-purge liquid (e.g., make-up liquid, electrolyte, or a working fluid such as deionized water) into the gas-purge manifold 1260, through the one-way valve 1262, into the drip chamber 1224, and into the gas-separation chamber 1226. The ventricular pump 1234 may also be operated during the gas-purge operation, driving the gas-purge liquid from the gas-separation chamber 1226 and into the half-cell chamber 1202. As a result, any gases present in the half cell chamber 1202, the drip chamber 1224 or the gas-separation chamber 1226 will ultimately tend to be driven out of the cell-stack via the gas-removal manifold 1210. In some embodiments, the gas-purge operation may be used to initially fill each half-cell in the cell-stack with a desired volume of electrolyte. In other embodiments, electrolyte may already be present in the half-cell chambers (and/or in one or more of the expansion volume 1206, drip chamber 1224, and gas separation chamber 1226) prior to performing the gas-purge operation.

As shown in FIG. 12A and FIG. 12B, the make-up liquid supply manifold 1212 may be joined to an inlet port 1214 in the first half-cell chamber 1202 by a conduit channel 1268 on the second side (FIG. 12B) of the cell-frame 1106. The inlet port 1214 may comprise a one-way valve arranged to allow make-up liquid to flow from the supply manifold 1212 into the first half-cell chamber 1202 when pressure in the first half-cell chamber 1202 drops below the controlled pressure in the make-up liquid supply manifold 1212. As described herein above, in other embodiments a make-up liquid supply manifold may be configured to deliver make-up liquid to either one or both half-cell chambers 1202, 1204.

In some embodiments, a cell-stack made up of cell-frames 1106 may be configured to electrically monitor portions of each half-cell. In the embodiments illustrated in FIG. 11-FIG. 12B, each cell-frame 1106 may comprise electrical leads 1270, 1272, 1273 arranged to monitor electric potentials between various components of the cell. In some embodiments, a bipolar plate lead 1270 may be electrically connected (e.g., by one or more wires or other electrical conductors) to a bipolar plate 1110, 1111. For example, in an embodiment best seen in FIG. 11, a tab 1176 may be connected from a bipolar plate 1110, 1111 to an electrical contact on an adjacent cell-frame 1106. A first half-cell lead 1272 may be electrically connected (e.g., by one or more wires or other electrical conductors) to the condenser(s) 1230, 1231 in the drip chamber 1224 and/or the gas-separation chamber 1226 of the first half-cell. Similarly, a second half-cell lead 1273 may be electrically connected (e.g., by one or more wires or other electrical conductors) to the condenser(s) 1277, 1275 in the drip chamber 1223 and/or the gas-separation chamber 1227 of the second half-cell.

An electrical potential (voltage) between the bipolar plate lead 1270 and the first half-cell lead 1272 may be monitored for changes. An electrical circuit between the bipolar plate lead 1270 and the first half-cell lead 1272 will be an open-circuit due to an electrical discontinuity in a physical gap 1278, 1279 between each egress channel 1220, 1236 and the condenser 1230, 1277 in the respective drip chamber 1224, 1223. The egress channel may be electrically conductive either by being made of or comprising a conductive material, and/or by virtue of a conductive electrolyte. The electrical circuit may be momentarily closed when a drop of electrically conductive electrolyte drips from an egress channel 1220, 1236 onto the conductive condenser 1230, 1277 in the drip chamber 1224, 1223 thereby bridging the gap 1278, 1279 and closing electrical discontinuity.

By monitoring the frequency, duration, voltage, and other aspects of these closed-circuit events ("drips"), various indicators of half-cell health or operation may be determined or estimated. By monitoring drips in both half-cells, such indicators may be obtained for both half-cells of each cell in a cell-stack. Therefore, in such embodiments, the "drip detectors" in each half-cell (and therefore in each full cell) of a complete cell-stack may be monitored individually to identify faults in individual cells or half-cells.

For example, a continuously closed circuit (or a closed-circuit of unusually long duration) in one half-cell's drip chamber may be indicative of an improperly functioning ventricular pump. Similarly, unusually long gaps between drips, or unusually high voltages may indicate an improperly functioning electrode (or catalyst) or a malfunctioning egress channel. In another example, an unusually high voltage between a half-cell lead 1272 or 1273 and a bipolar plate lead 1270 may indicate a leak of working fluid into a half-cell chamber (as further described below). Many other metrics and indicators may similarly be deduced from signals or patterns obtained from the electrical leads.

FIG. 13 illustrates "planar" expansion volumes 1300a, 1300b of two adjacent cell-frames 1106a, 1106b in a cell-stack. In the illustrated example, an expansion volume 1300a, 1300b may comprise a diaphragm 1310a, 1310b separating an expansion volume side 1312a, 1312b (shown collapsed, i.e., zero percent expanded) from a "working fluid" side 1314a, 1314b. The working fluid side 1314a, 1314b of the expansion volume 1300a, 1300b may be filled with a working fluid via a working fluid manifold 1320 (also visible in FIG. 12A and FIG. 12B) common to all cell-frames 1106 in a cell-stack. In various embodiments, the working fluid may be any gas or liquid, such as deionized water, nitrogen, argon, etc. The working fluid may be maintained at a desired working pressure, typically a pressure greater than a steady-state operating pressure of the half-cell chambers of the cells. The working fluid pressure may be established, electromechanically controlled, and maintained to exert a resistance to expansion of each expansion volume 1300a, 1300b as described herein.

Working fluid may enter a working-fluid side of each expansion volume 1300a, 1300b via the common working fluid manifold 1320 and through an opening 1325a, 1325b in a cover-sheet 1330a, 1330b secured to a second-half-cell side of each cell-frame 1106. In some embodiments, the electrolyte side 1312a, 1312b of each expansion volume 1300a, 1300b may be defined by the diaphragm 1310a, 1310b, portions of the cell-frame 1106a, 1106b, and the cover sheet 1330a, 1330b. In other embodiments, the electrolyte side 1312a, 1312b of each expansion volume 1300a, 1300b may be defined only by the diaphragm 1310a, 1310b, and the cell-frame 1106a, 1106b (in cases in which each cell-frame extends across the expansion volume.

Electrolyte and/or gas entering the electrolyte-side 1312a, 1312b of each expansion volume 1300a, 1300b via electrolyte entry ports (1286 in FIG. 12B, not visible in the cross-section of FIG. 13) will tend to expand the expansion volume 1300a or 1300b if the pressure of the electrolyte and/or gas is greater than the established working fluid pressure. In some embodiments, the working fluid pressure may be controlled at a different pressure during different stages of operation of the electrochemical system.

In some embodiments, a cell-frame 1106 may also comprise a coolant in-flow manifold 1292 and a coolant out-flow manifold 1294 configured to direct coolant into, through, and out of coolant channels in bipolar plate structures as described in some embodiments herein. In other embodiments, coolant manifolds may be omitted or differently configured. In various embodiments, coolant may flow in either direction through coolant channels, therefore in some embodiment the coolant in-flow 1292 and out-flow 1294 may be reversed.

Independent Thermal Management

In conventional electrolyzers, it is usually necessary to cool the cells by circulating the electrolyte through them, and the electrolyte exiting from the cell carries with it the gas produced. In many designs, separation of the gas from the electrolyte is accomplished in a separating drum external to the electrolyzer. The electrolyte, free of gas, is then re-circulated through the cells. In the various confined electrolyte systems described herein, separation of gas and electrolyte is performed within each cell-frame, and electrolyte is not pumped out of the cells. In such systems, a separate mechanism for removing heat from the cell-stack may be beneficial.

The embodiments of systems and methods described in this section, such as embodiments associated with thermal management in electrochemical systems, such as electrolyzers, optionally can be combined with other embodiments of systems and methods described elsewhere in this application. For example, any of the confined electrolyte electrochemical cells described throughout this application can include or be used with any of various embodiments described in this section, such as thermal management components.

FIG. 14A and FIG. 14B illustrate example embodiments of electrolyzer systems 1400, 1401 with thermal management components independent of process water components. The coolant loop 1430 in FIG. 14A is shown substantially the same as the coolant loop 1431 in FIG. 14B.

In various embodiments, the coolant loop 1430, 1431 may comprise a pump configured and arranged to drive a cooling fluid through coolant conduits and one or more heat exchangers 1432 inside the stack 1410 as well as one or more heat-expelling heat exchangers 1434 outside of the stack 1410. In some embodiments, as shown for example in FIG. 14A, the stack heat exchangers may comprise bipolar plate structures 1416 configured with coolant conduits 1432 to cool a bipolar stack 1410 at the interface between adjacent cells 1415 (and/or at the ends of the stack 1410). In other embodiments, a heat exchanger in the stack 1410 may be configured to remove heat from edges of each electrochemical cell 1410 in the stack instead of or in addition to removal of heat via bipolar plate coolant conduits 1432.

FIG. 14A illustrates an example electrolyzer system 1400 comprising a cell-stack 1410 in a bipolar configuration. Each cell 1415 comprises a first electrode 1412 in a first half-cell chamber 1422 and a second electrode 1414 in a second half-cell chamber 1424. The polarity of the first electrode 1412 and second electrode 1414 may depend on the type of ion exchange membrane or other factors as described herein. Bipolar plates 1416 between adjacent cells 1415 may contain coolant conduits 1432. A coolant circulation pump 1436 may be configured to circulate a coolant fluid through the bipolar plates 1432, through an external heat-exchanger 1434, and return the coolant to the bipolar plates 1416. Separately, a process water circulation pump 1452 may be configured to supply process water to each cell 1415 via the supply manifold 1440, and to direct process water to gas-collection manifolds 1442, 1444 which may remove produced gases from the cells as further described below.

In alternative electrolyzer systems, coolant conduits may be arranged to surround or run adjacent to an exterior of each cell 1415 of the cell-stack 1410 rather than through bipolar plates 1416. In such embodiments, heat may be conducted in the electrodes, and collected by coolant fluid in the coolant conduits at a periphery of the cell. As in previous embodiments, a coolant circulation system may be configured to circulate coolant between the coolant conduits and an external heat-exchanger. In some embodiments, such coolant conduits may be integrated into one or more cell and/or stack frame structures or other structures in a cell-stack.

The cooling fluid may be any liquid or gas suitable for carrying heat out of the cell-stack. In various embodiments, the cooling fluid may be a liquid such as water (including deionized water or less-pure water), a glycol (e.g., ethylene glycol and/or propylene glycol), a dielectric fluid (e.g., perfluorinated carbons, polyalphaolefins, or oils), or a gas such as air, hydrogen, oxygen, nitrogen, argon, any combination of these, etc.

Thermal Management: Bipolar Plate Heat Exchanger

Figure 15:
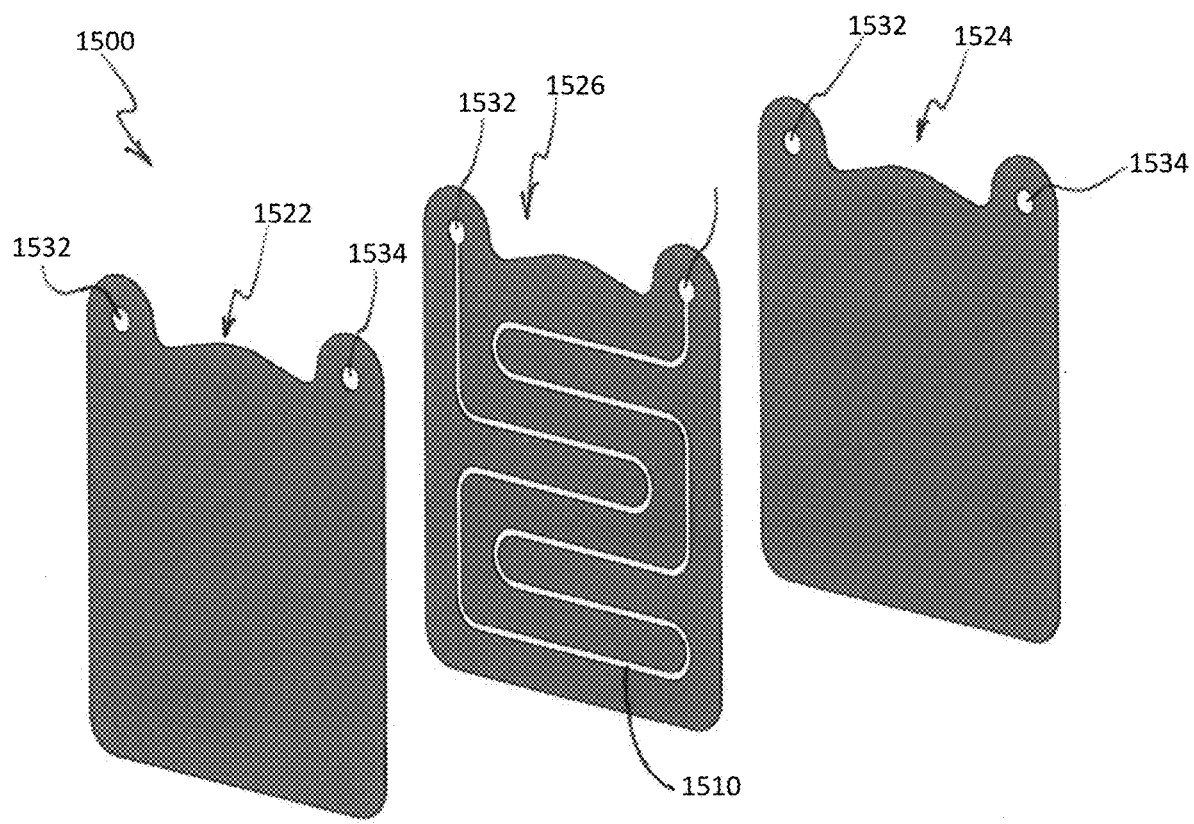
FIG. 15 is a schematic exploded view illustration of an exemplary multi-layer cooling bipolar plate with a coolant conduit through which coolant may be circulated, according to certain embodiments.

FIG. 15 provides a schematic exploded view illustration of a multi-layer cooling bipolar plate 1500 with a coolant conduit 1510 through which coolant may be circulated. In the illustrated example, the bipolar plate 1500 comprises three layers 1522, 1524, 1526 of conductive material. A channel layer 1526 may be sandwiched between two outer layers 1522, 1524. The channel layer 1526 may comprise one or more flow channels 1510 arranged to direct coolant through the space between the outer layers 1522, 1524. In some embodiments, the flow channel(s) 1510 may be arranged in a pattern chosen to minimize conductive paths to all parts of an electrode contacting one of the outer layers 1522, 1524. In other embodiments, flow channels 1510 may be arranged to optimize a flow rate or other characteristics of coolant flow through the channels 1510.

The three layers 1522, 1524, 1526 may be sealed and secured by welds (e.g., laser-welds, sonic welds, resistance welds, or other weld techniques) around at least the perimeter of the plates 1522, 1524, 1526, leaving at least an in-flow port 1532 and an out-flow port 1534. Alternatively, the layers 1522, 1524, 1526 may be sealed and/or secured by other techniques or materials such as adhesives, O-rings, or other methods as desired.

At least the outer layers 1522, 1524, 1526 may be made of a material compatible with the high-purity process water and/or the coolant fluid to be directed through the channels 1510. For example, some or all of the layers may be made of nickel or other conductive material (e.g., steel) that is coated, plated, or otherwise covered with nickel or other conductive material that is non-reactive in the electrolyzer environment.

In alternative embodiments, a cooling bipolar plate 1500 may be made from only two layers, one or both of which is machined, stamped or otherwise modified to produce one or more flow channels between the layers.

Exemplary Ion Exchange Membrane Configurations: Low-Flow Ion-Exchange Electrolyzers De-coupling the function of cooling a cell-stack from the function of supplying water to be split, one can realize substantial cost savings by eliminating high-cost plant components required by circulating and cooling process water. Various methods, systems, and components for achieving such decoupling are described herein. In some embodiments, this decoupling may be achieved by using a second, separate coolant fluid to remove heat from a cell/stack while introducing process water to the cell/stack at a rate that is not substantially greater than a rate of water consumption. Such a system will be referred to herein as a "low-flow ion-exchange" (or "LFIE") electrolyzer.

Embodiments of LFIE electrolyzer systems may also benefit from inclusion of various features or elements of electrolyzer systems described throughout this application. For example, an LFIE electrolyzer may comprise a make-up liquid supply system, fluid escape elements, gas-removal manifolds or channels, and/or expansion chambers. Each of these elements may comprise structures and methods described throughout this application. In further embodiments, any other compatible structures or methods described throughout this application may be incorporated into one or more LFIE electrolyzer as described herein. For example, in some embodiments, a fluid escape element in an LFIE electrolyzer may be configured to impart minimal or zero flow resistance to liquid or gas escaping each half-cell. In such embodiments, a fluid exit channel may be substantially open and unrestricted. In some embodiments, a fluid exit channel may comprise a "waterfall" arranged to require a particular volume of water to overcome a level before water exits a half-cell chamber. In such an arrangement, gas may exit the half-cell freely, and water will only exit at a rate at which it exceeds the waterfall level. Therefore, in such embodiments, a water exit rate will be equal to the positive difference between a water supply rate and a water consumption rate. In an LFIE electrolyzer with a waterfall fluid exit, a water flow rate through the cells may be controlled by supplying water at a rate that exceeds an expected consumption rate by a desired flow rate (or replacement rate) as described herein.

In some embodiments, an LFIE electrolyzer may comprise a make-up liquid supply system and other elements arranged to supply make-up liquid consisting essentially of deionized water into the cells at a rate only slightly greater than a rate at which water is consumed by splitting into constituent gases. Coupled with a separate thermal management system, such an LFIE electrolyzer system may be made and operated at a much lower cost when compared to conventional ion-exchange electrolyzers.

FIG. 14A and FIG. 14B schematically illustrate high-level system diagrams showing example flows of process water and coolant through a cell-stack 1410. The LFIE electrolyzer systems 1400, 1401 of FIG. 14A and FIG. 14B each comprise a cell-stack 1410 made up of a plurality of electrochemical cells 1415, each cell having a first half-cell 1422 and a second half-cell 1424 separated by respective ion-exchange membranes 1418. As described in further detail below, depending on the type of ion-exchange membrane used, process-water, and/or another electrolyte or make-up liquid, may be supplied to a positive half-cell or a negative half-cell. The half-cells 1422, 1424 will be described generically here without reference to polarity but will be further described below in the context of PEM and AEM separator membranes with reference to electrical polarity.

The systems 1400, 1401 each comprise a coolant loop 1430, 1431 with a pump 1436 configured to direct a coolant fluid through in-cell heat exchangers 1432 to remove heat from the cell-stack 1410 and through an external heat exchanger 1434 to reject heat from the coolant fluid to a lower-temperature heat sink. Notably, the coolant loop 1430, 1431 is independent of process water supply 1436 and return 1438 conduits. Further details of independent thermal management systems useful in electrochemical systems such as LFIE electrolyzers are described in further detail above and throughout this application.

FIG. 14A illustrates a process water supply manifold 1440 arranged to direct process water into a first half-cell 1422 of each cell 1415. Process water may then be split in each cell, and produced gases may be collected in first 1442 and second 1444 gas removal manifolds. A small volume of excess process water may exit each cell along with gas produced in the first half-cell 1422. The small quantity of excess water exiting the cell-stack 1410 may be separated from the collected gas at a liquid-gas separator 1450. The collected gas may be further treated (e.g., dried, cooled, etc.), and excess water may be returned by a pump 1452 to the process water supply manifold 1440 along with water from a make-up water reservoir 1454.

FIG. 14B illustrates a process water supply manifold 1440 arranged to direct process water into a first half-cell 1422 of each cell 1415 while also flowing a portion of process water through a first gas collection manifold 1442. In the system of FIG. 14B, gas produced in the first half-cell may be collected in a water stream, thereby allowing the collected gas to be cooled by the process water. The combined water/gas flow may be separated at a liquid-gas separator 1450, and excess water may be returned by a pump 1452 to the process water supply manifold 1440 along with water from a make-up water reservoir 1454.

The process water loop 1461 shown in FIG. 14B may also include a stack bypass conduit 1456 through which a quantity of process water may flow after leaving the supply manifold 1440 so as to maintain a liquid volume in the first gas removal manifold 1442, the fluid pressure of which may be regulated at a pressure regulator 1462.

The bypass conduit 1456 in the process water loop 1461 of FIG. 14B is omitted in the process water loop 1460 shown in FIG. 14A. As a result, the only path for process water from the supply manifold to the liquid-gas separator 1450 is through the first half-cells 1422 of the cell stack 1410. Therefore, in the arrangement of FIG. 14A, the flow rate of process water through the process water loop 1460 is limited by the flow rate of water exiting the first half-cells 122.

Notably, each of the systems according to FIG. 14A and FIG. 14B can be configured as a PEM system, by applying a positive polarity to the first half-cells 1422, or as an AEM system, by applying a negative polarity to the first half-cells 1422 into which process water is supplied, as also described throughout in this application.

Exemplary Ion Exchange Membrane Configurations: LF-PEM Cell Configurations

Figure 16:
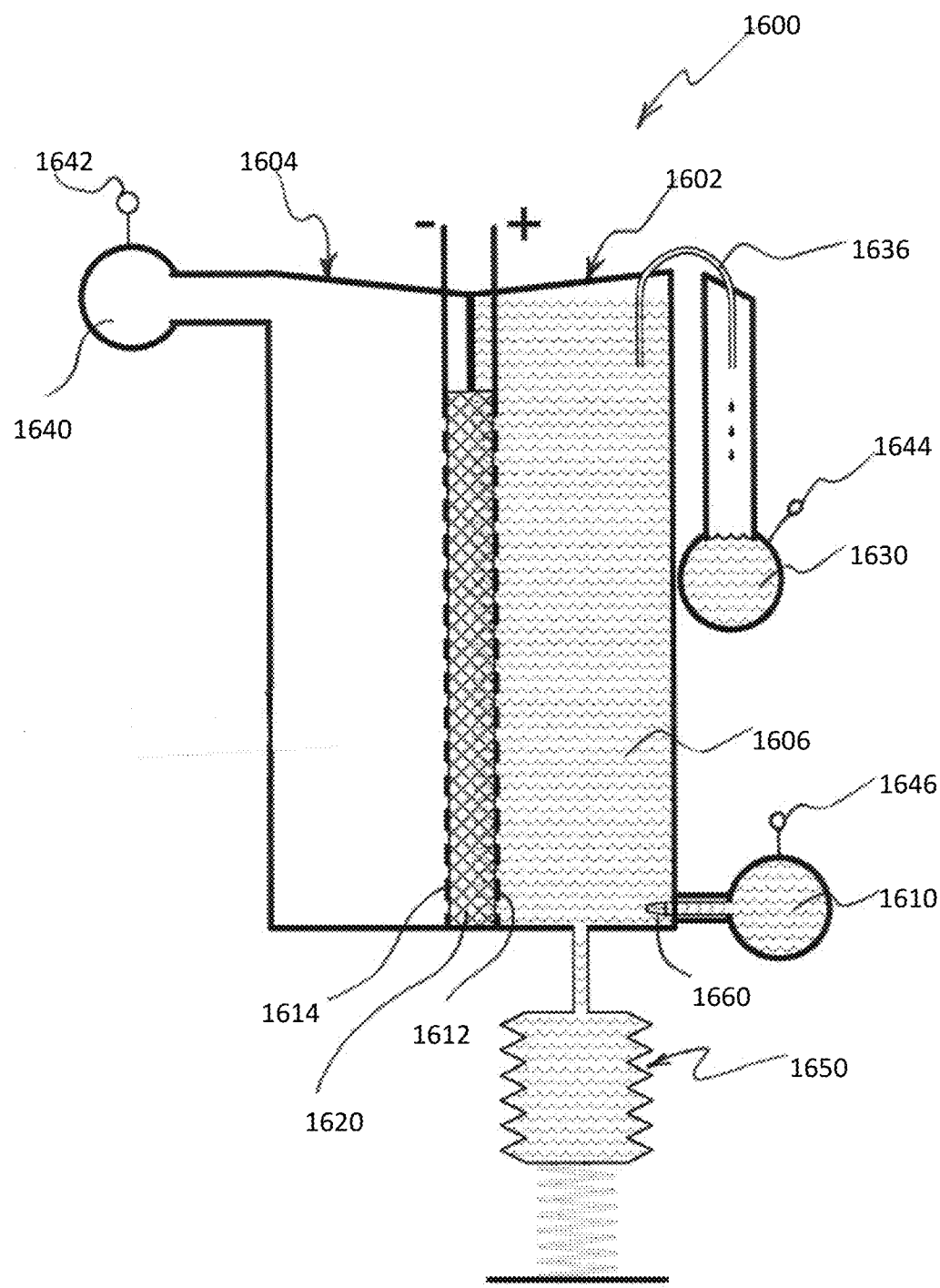
FIG. 16 is a schematic illustration of some features of an electrochemical cell in an exemplary low-flow PEM electrolyzer, according to certain embodiments.

FIG. 16 schematically illustrates components of an electrochemical cell 1600 in a low-flow PEM electrolyzer. The cell 1600 may include a positive half-cell chamber 1602 filled with process water 1606 (e.g., deionized water to be split in the electrolyzer) supplied via a supply manifold 1610. A positive electrode 1612 comprising an oxygen-evolution catalyst may be positioned within the positive half-cell chamber 1602 and submerged in the process water 1606. A proton exchange membrane (PEM) separator 1620 may separate the positive half-cell chamber 1602 from a negative half-cell chamber 1604 and may be in contact with a negative electrode 1614 and the positive electrode 1612. The negative electrode 1614 may comprise a hydrogen-evolution catalyst. Various example positive and negative catalyst materials are described throughout this application. In a typical PEM configuration, the negative half-cell chamber 1604 may be substantially gas-filled as the PEM separator 1620 may prevent water from entering the negative half-cell chamber 1604 under normal conditions.

During operation, the process water 1606 is electrochemically split in the positive half-cell chamber 1602 to produce oxygen gas in the positive half-cell chamber 1602. The oxygen gas produced at the positive electrode 1612 may be withdrawn from the positive half-cell chamber 1602 via a positive gas-removal manifold 1630. In some embodiments, a mixed-flow of oxygen gas and excess process water may exit the positive half cell chamber 1602 via a common fluid escape element 1636 arranged between the positive half-cell chamber 1602 and the positive gas-removal manifold 1630. The fluid escape element 1636 may comprise any fluid escape element structure as described throughout this application, including "egress channels" or hydrophobic membranes as described therein.

Hydrogen atoms (protons) from the water-splitting reaction may be driven across the PEM separator 1620 towards the negative electrode 1614 at which they will be electrochemically combined to form hydrogen gas. The hydrogen gas may be withdrawn from the negative half-cell chamber 1604 via a negative gas-removal manifold 1640 In some embodiments, the negative gas-removal manifold 1640 may be regulated at a desired pressure by a pressure regulator 1642. In various embodiments, the pressure regulator 1642 may be operated to maintain the negative gas-removal manifold 1640 at a pressure of up to 50 bar or more. For example, the negative gas-removal manifold pressure may be regulated at 20, 30, 40, 50, 60, 70, 80, 90, or 100 bar.

In various embodiments, pressure in the positive gas removal manifold 1630 may be regulated by a pressure regulator 1644 to be slightly lower than a fluid pressure in the supply manifold 1610 which may be regulated by a pressure regulator 1646. In various embodiments, the pressure regulator 1644 may be configured to maintain fluid (a gas-removal liquid and/or a gas only) in the negative gas-removal manifold at a pressure of at least 10 bar, up to 30 bar, 40 bar, 50 bar, 60 bar, 70 bar, 80 bar, 90 bar, 100 bar, or more.

In some embodiments, each positive half-cell of a low-flow PEM electrolyzer stack may comprise a liquid-gas separator (e.g., as shown in FIG. 1 or FIG. 11-FIG. 12B) to capture and separate gas from liquid water escaping from the positive half-cell via a fluid escape element 1636. Captured liquid water may be returned to the positive half-cell by conduits and a pump (e.g., a ventricular pump) unique to the cell (e.g., as shown in FIG. 3A-FIG. 3C, among others). Alternatively, liquid-gas separation and water return may be performed on a stack-level or on a system level as described herein with reference to FIG. 14A and FIG. 14B.

As shown in FIG. 16, some embodiments of a low-flow PEM electrolyzer may also include an expansion chamber 1650 joined in fluid communication with the positive half-cell chamber 1602. As described throughout this application, an expansion chamber 1650 may be configured to allow volumetric expansion of a liquid/gas mixture in a half-cell chamber 1602 while maintaining fluid pressure within a desired range. In various embodiments of a low-flow PEM electrolyzer, an expansion chamber 1650 may be positioned in fluid communication with one or both half-cell chambers as needed. An expansion chamber 1650 may be configured to impart a resistance to expansion, requiring increasing pressure to further expand the volume. Alternatively, an expansion volume may be configured to allow substantially unrestricted volumetric expansion up to a volumetric limit.

With reference to FIG. 14A and FIG. 14B, a low-flow PEM electrolyzer system may comprise two independent fluid circulation loops: a process water loop 1460, 1461 and a coolant loop 1430, 1431. The process water loop 1460, 1461 may be configured to deliver fresh process water to the positive half-cells (the first half-cells 1422 having a positive polarity in this case) of the cell stack 1410. A mixture of excess process water and oxygen gas may be withdrawn from outlets of the first half-cells 1422 of the cell-stack 1410. The oxygen gas may be separated from the excess process water in a liquid/gas separator 1450, and the excess process water may be returned to the cell-stack 1410 along with additional water from a make-up water source 1454 (e.g., a water de-ionizing system supplied by a municipal water source or other water reservoir).

In some embodiments, the process water loop 1460, 1461 may comprise a pump 1452 to drive both excess process water from the liquid/gas separator 1450 and from the make-up water supply 1454. The pump 1452 and/or a pressure regulator 1464 located downstream of the supply manifold 1440 may be used to control a pressure of the process water supplied to the cell-stack 1410. A separate pressure regulator 1466 located downstream of the first gas collection manifold 1442 may be configured to control a pressure in the gas-collection manifold 1442 at the outlet of the cell-stack 1410. Each of the pressure regulators 1462, 1464 may be any type of pressure regulator available and suitable to the application, such as a back-pressure regulating valve, or others.

Hydrogen gas may be collected in the conduits and gas removal manifold 1444 exiting the second half-cells 1424 of the cell-stack 1410. In some embodiments, fluid pressure in the second gas removal manifold 1444 may be regulated by a pressure regulator 1466 located downstream of the second gas removal manifold 1444. The hydrogen gas may be directed to a gas collection system 1470 configured to treat (e.g., purify, dry, compress, cool, etc.) and store or use the hydrogen produced by the stack 1410. In some embodiments, the gas collection system 1470 may also comprise additional gas treatment components, such as heat exchangers, compressors, dryers, etc.

The process water loop 1460, 1461 may generally be configured to circulate process water at a very slow flow rate (e.g., read below) when compared to PEM and AEM electrolyzer systems in which process water is used for cooling. For example, in a low-flow electrolyzer, water may be pumped (or otherwise driven) into the PEM cell-stack at flow rates hundreds or thousands of times lower than process water-cooled systems. In an LFIE electrolyzer process water need only be supplied to the electrochemical cell-stack at a rate sufficient to replace water consumed and to maintain wetting of cell components sufficient to maintain an effective three-phase interface (or triple point).

Typical PEM water electrolyzers of megawatt scale may operate with process water flow rates of hundreds of gallons per minute per cell despite consuming water at rates approaching less than a gallon per minute per cell. In other words, an ion-exchange membrane electrolyzer utilizing process water for cooling requires process water flow rates hundreds of times greater than the rate at which process water is consumed by splitting. Such high flow rates are required in order to adequately remove heat via the process water. By using a separate coolant fluid independent of the process water, such high flow rates may be avoided.

By contrast, process water flow rates into an LFIE electrolyzer may ideally be roughly equal to a rate at which process water is consumed via splitting. In some cases, it may be beneficial to drive process water flow rates slightly greater than a rate of consumption in order to maintain wetting of cell components, to account for differences in consumption rates between cells and ensure that all cells in a stack are receiving water at least as fast as it is consumed, or for other reasons. The flow rate can be controllable such that the flow rate matches or exceeds the consumption rate so that the electrode pores remain wetted with enough water to continue efficiently splitting.

The rate of gas production by water splitting is generally a function water temperature, pressure, and applied electrical current, each of which may be a controlled parameter within an electrolyzer system, and therefore a rate of water consumption by each cell of a cell-stack may be at least approximately known based on at least these controllable factors. Therefore, in various embodiments, process water may be delivered into an LFIE cell at a rate defined as a percentage relative to a water consumption rate. For example, process water may be delivered at a rate of between about 0.01% and about 400% greater than a consumption rate (i.e., at a rate of about 100.01% to about 500% of the consumption rate). In some particular embodiments, a rate of process water delivery may beneficially be between about 101% and about 150% of the expected consumption rate. In specific embodiments, water may be supplied at rates of about 100.01%, 100.05%, 100.1%, 100.5%, 101%, 105%, 110%, 125%, 150%, 175%, 200%, 300%, 400%, or 500% of the expected water consumption rate. In other embodiments, higher process water delivery flow rates may be used (e.g., as high as 100 times a consumption rate or 1000% of the consumption rate), while still remaining substantially lower than flow rates required when using process water as the sole heat-transfer fluid. Therefore, in some embodiments, a low-flow ion-exchange electrolyzer may utilize a process water supply rate of no more than 1,000% of a rate at which the water is consumed.

In some embodiments, a flow rate of process water flowing into an LFIE electrolyzer may be defined and/or controlled based on a rate at which the process water is consumed by water-splitting reactions. For example, a flow rate of process water may be controlled as a function of applied electrical current, as a function of a gas collection rate, or other measurable variables related to a water consumption rate.

In various embodiments, such flow rates may be controlled based on a rate of process water delivery to the cell-stack. For example, flow-based control may be accomplished by a closed-loop controller configured to control a water delivery flow rate based on feedback of a measurement of a mass flow rate or a volumetric flow rate into the cell-stack. Alternatively or in addition, process water flow rates may be based on a pressure of process water in a process water supply manifold delivering water to the cell-stack. For example, pressure-based control may be performed by a closed-loop controller configured to maintain a fluid pressure in a supply manifold based on feedback from one or more pressure sensors. Alternatively, flow-based or pressure-based control may comprise an open-loop control system without feedback measurements. Some examples of pressure-based flow control systems and methods are described below.

At such low replacement rates, the volume of liquid water flowing through the oxygen-containing second gas removal manifold 1444 and associated conduits exiting the cell-stack will be very small. As a result, a liquid-gas separator 1450 may be very small and simple. For example, the liquid-gas separator 1450 may simply comprise a vertical T-connected conduit with a vertical leg flowing upwards to carry away gas and a vertical leg flowing downwards to collect liquid water. In some embodiments, a liquid-gas separator may also comprise a dryer such as a desiccant bed or a water vapor condenser to remove water vapor from the flowing gas.

Exemplary Ion Exchange Membrane Configurations: LF-AEM Cell Configurations

Figure 17:
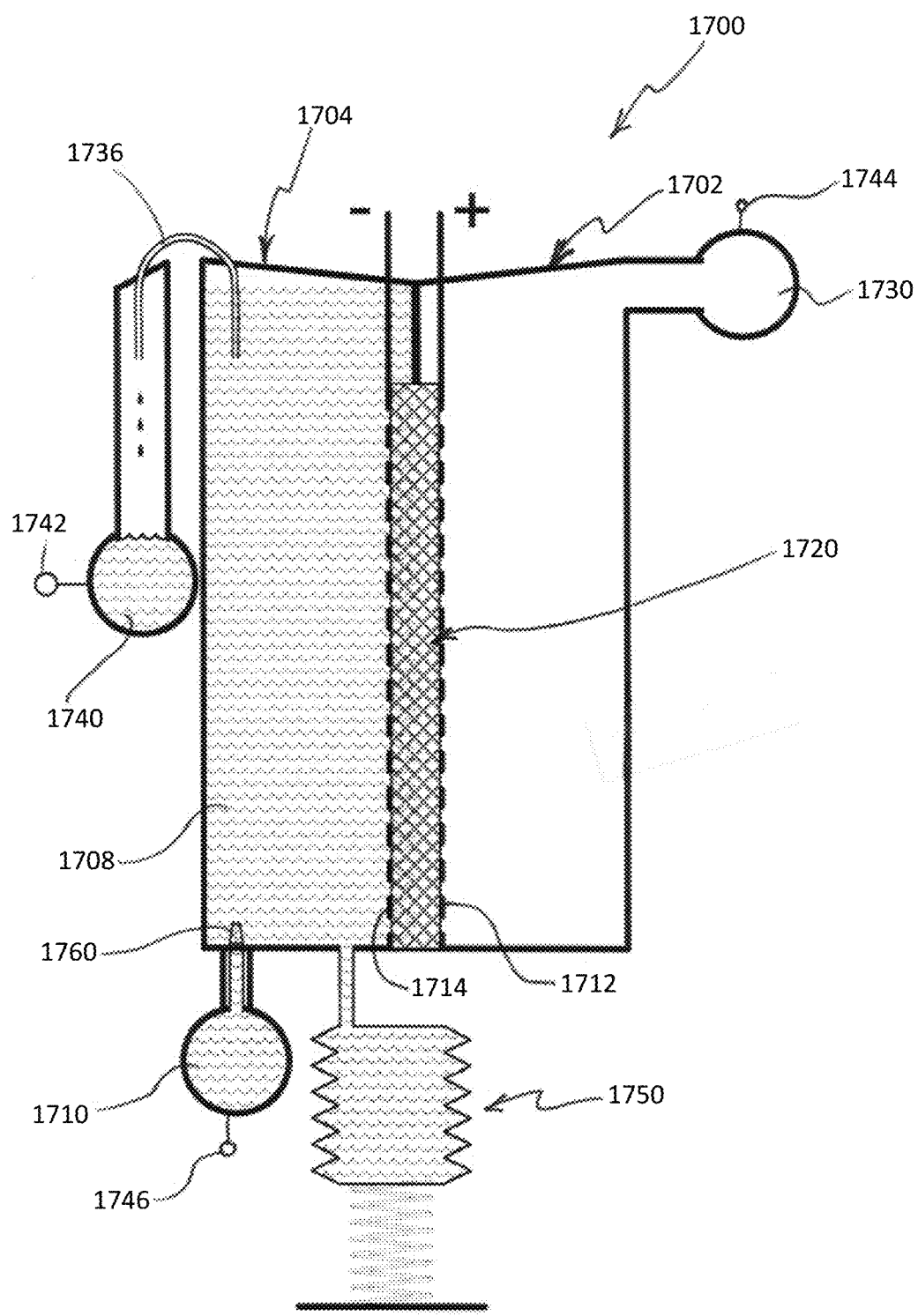
FIG. 17 is a schematic illustration of some features of an electrochemical cell in an exemplary low-flow AEM electrolyzer, according to certain embodiments.

FIG. 17 schematically illustrates components of an electrochemical cell 1700 in a low-flow AEM electrolyzer. As shown, a low-flow AEM electrolyzer system may be substantially similar to a cell 1600 in a low-flow PEM electrolyzer system with the main difference being the introduction of process water 1708 into the negative half-cell chamber 1704 in the AEM case rather than into the positive half-cell chamber 1602 in the PEM case.

As shown in FIG. 17, the cell 1700 may include a negative half-cell chamber 1704 filled with process water 1708 (e.g., deionized water to be split in the electrolyzer) supplied via a supply manifold 1710. A negative electrode 1714 comprising a hydrogen-evolution catalyst may be positioned within the negative half-cell chamber 1704 and submerged in the process water 1708. An anion exchange membrane (AEM) separator 1720 may separate the negative half-cell chamber 1704 from a positive half-cell chamber 1702 and may be in contact with the negative electrode 1714 and a positive electrode 1712. The positive electrode 1712 may comprise an oxygen-evolution catalyst. The positive half-cell chamber 1702 may be substantially filled with a produced gas (e.g., oxygen) as the AEM separator 1720 may prevent water from entering the positive half-cell chamber 1702 under normal conditions.

During operation, the process water 1708 is electrochemically split in the negative half-cell chamber 1704 to produce hydrogen gas in the negative half-cell chamber 1704. The hydrogen gas produced at the negative electrode 1714 may be withdrawn from the negative half-cell 1704 via a negative gas-removal manifold 1740. In some embodiments, a mixed-flow of hydrogen gas and excess process water may exit the negative half-cell chamber 1704 via a fluid escape element 1736 arranged between the negative half-cell chamber 1704 and the negative gas-removal manifold 1740. Example structures and configurations useful as fluid escape elements are described herein throughout, any of which may be used in a cell as illustrated in FIG. 17.

Oxygen atoms from the water-splitting reaction will tend to cross the AEM separator 1720 toward the positive electrode 1712 at which oxygen gas is formed. The oxygen gas may be withdrawn from the positive half-cell chamber via a positive gas-removal manifold 1730.

In order to produce generated hydrogen gas at high pressure, the process water may be injected at an absolute pressure slightly higher than the desired hydrogen gas pressure. In some embodiments, a pressure regulator 1746 may be used to regulate pressure of the process water supplied to the negative half-cell chamber 1704 via a supply manifold 1710. In some embodiments, water in the process water supply manifold 1710 may be maintained at a high pressure so as to maintain a high fluid pressure in the negative half-cell chamber 1704, thereby producing hydrogen gas and oxygen gas at high pressure. For example, in some embodiments, it may be desirable to collect produced hydrogen (and/or oxygen) at pressures of 30 bar or more, or as high as 100 bar or more in some cases. In such embodiments, process water may be supplied at pressures from atmospheric pressure up to 100 bar or more, such as about 1 bar, 10 bar, 20 bar, 30 bar, 40 bar, 50 bar, 60 bar, 70 bar, 80 bar, 90 bar, 100 bar, or more. Gas produced by splitting water at such pressures may be collected at pressures only slightly lower than the process water pressure, such as 0.5 bar.

In some embodiments, the negative gas-removal manifold 1740 may be regulated at a desired pressure by a pressure regulator 1742. In various embodiments, the pressure regulator 1742 may be operated to maintain the negative gas-removal manifold 1740 at a pressure slightly lower than a pressure in the supply manifold 1710 regulated by the pressure regulator 1746 at which the process water is supplied to the negative half-cell chamber 1704.

In some embodiments, oxygen removed from the positive half-cell 1702 may be maintained at a desired pressure by a pressure regulator 1744 in the positive gas-removal manifold 1730. In various embodiments, the pressure regulator 1744 may be configured to maintain fluid (a gas-removal liquid and/or a gas only) in the positive gas-removal manifold at a pressure of at least 10 bar, up to 30 bar, 40 bar, 50 bar, 60 bar, 70 bar, 80 bar, 90 bar, 100 bar, or more.

In some embodiments, each negative half-cell of a low-flow AEM electrolyzer stack may comprise a liquid-gas separator (e.g., as shown in FIG. 1 or FIG. 11-FIG. 12B) to capture and separate produced gas from liquid water escaping from the negative half-cell via a fluid escape element 1736. Captured liquid water may be returned to the negative half-cell by conduits and a pump (e.g., a ventricular pump) unique to the cell (e.g., as shown in FIG. 3A-FIG. 3C, among others). Alternatively, liquid-gas separation and water return may be performed on a stack-level or on a system level as described herein with reference to FIG. 14A and FIG. 14B.

As shown in FIG. 17, some embodiments of a low-flow AEM electrolyzer may also include an expansion chamber 1750 joined in fluid communication with the negative half-cell chamber 1704. As described herein throughout, an expansion chamber 1750 may be configured to allow volumetric expansion of a liquid/gas mixture in a half-cell chamber 1704 while maintaining fluid pressure within a desired range. Various examples and embodiments of volume expansion systems are described herein below.

With reference to FIG. 14A and FIG. 14B, a low-flow AEM electrolyzer system may comprise two independent fluid circulation loops: a process water loop 1460, 1461 and a coolant loop 1430, 1431. The process water loop 1460, 1461 may be configured to deliver fresh process water to the negative half-cells (the first half-cells 1422 having a negative polarity in this case) of the cell stack 1410. A mixture of excess process water and hydrogen gas may be withdrawn from outlets of the first half-cells 1422 of the cell-stack 1410. The hydrogen gas may be separated from the excess process water in a liquid/gas separator 1450, and the excess process water may be returned to the cell-stack 1410 along with additional water from a make-up water source 1454 (e.g., a water de-ionizing system supplied by a municipal water source or other water reservoir).

In some embodiments, the process water loop 1460, 1461 may comprise a pump 1452 to drive both excess process water from the liquid/gas separator 1450 and from the make-up water supply 1454. The pump 1452 and/or a first pressure regulator 1464 may be used to control a pressure of the process water supplied to the cell-stack 1410. A second pressure regulator 162 may be configured to control a pressure in the first gas-collection manifold 1442 at the outlet of the cell-stack 1410. In some embodiments, a pressure regulator 1466 may be used to regulate pressure in the second gas removal manifold 1444. Each of the pressure regulators 1462, 1464, 1466 may be any type of pressure regulator available and suitable to the application, such as a back-pressure regulating valve, or others.

Oxygen gas may be collected in the second gas removal manifold 1444 and associated conduits exiting the second half-cells 1424 of the cell-stack 1410. The oxygen gas may be directed to a gas collection system 1470 configured to treat (e.g., purify, dry, compress, cool, etc.) and store, use, or vent the oxygen produced by the stack 1410. In some embodiments, the gas collection system 1470 may also comprise additional gas treatment components, such as heat exchangers, compressors, dryers, etc.

In some embodiments, the excess oxygen gas withdrawn from the cell-stack may be at a high pressure slightly lower than a pressure of the process water in the negative half-cell chamber 1422. In such embodiments, the high-pressure oxygen gas may be utilized to pre-pressurize process water drawn from the make-up water source 1454. For example, a fluid pressure-exchange device (not shown) may be used to transfer the high pressure of the oxygen gas to the make-up water 1454 to be delivered to the cell-stack 1410. Examples of suitable fluid pressure-exchangers may include those taught by U.S. Pat. No. 7,306,437 and references therein. In other embodiments, the oxygen gas collected from the cell-stack may be at or near atmospheric pressure, and may simply be vented to the atmosphere if not needed for other purposes.

The process water loop may generally be configured to circulate process water at a relatively slow flow rate. For example, water may be pumped (or otherwise driven) into the AEM cell-stack 1410 at the same flow rates or replacement rates described above with respect to PEM systems. While process water in an AEM system may be delivered at a higher absolute pressure, the relative pressures and flow rates may be within the same ranges and values as described above.

In various embodiments, process water may be delivered to the cell-stack 1410 and distributed to each cell 1415 at a relatively "low" flow rate as described above. In some embodiments, supply of process water may be achieved by controlling fluid pressure in a water supply conduit or manifold as described herein throughout with reference to make-up liquid supply structures and methods. In various embodiments of a low-flow ion-exchange electrolyzer, a process water supply inlet may comprise one or more one-way valves arranged to deliver a bolus of water to a cell (or a cell-stack) when a pressure difference across the valve exceeds a pre-determined cracking pressure, thereby causing intermittent delivery of water to the cell or stack. In other embodiments, a one-way valve 1660 FIG. 16 or 1760 in FIG. 17 at a water inlet may be omitted, and water may be free to flow bidirectionally through the inlet between the supply manifold and the half-cell chamber.

Figure 18:
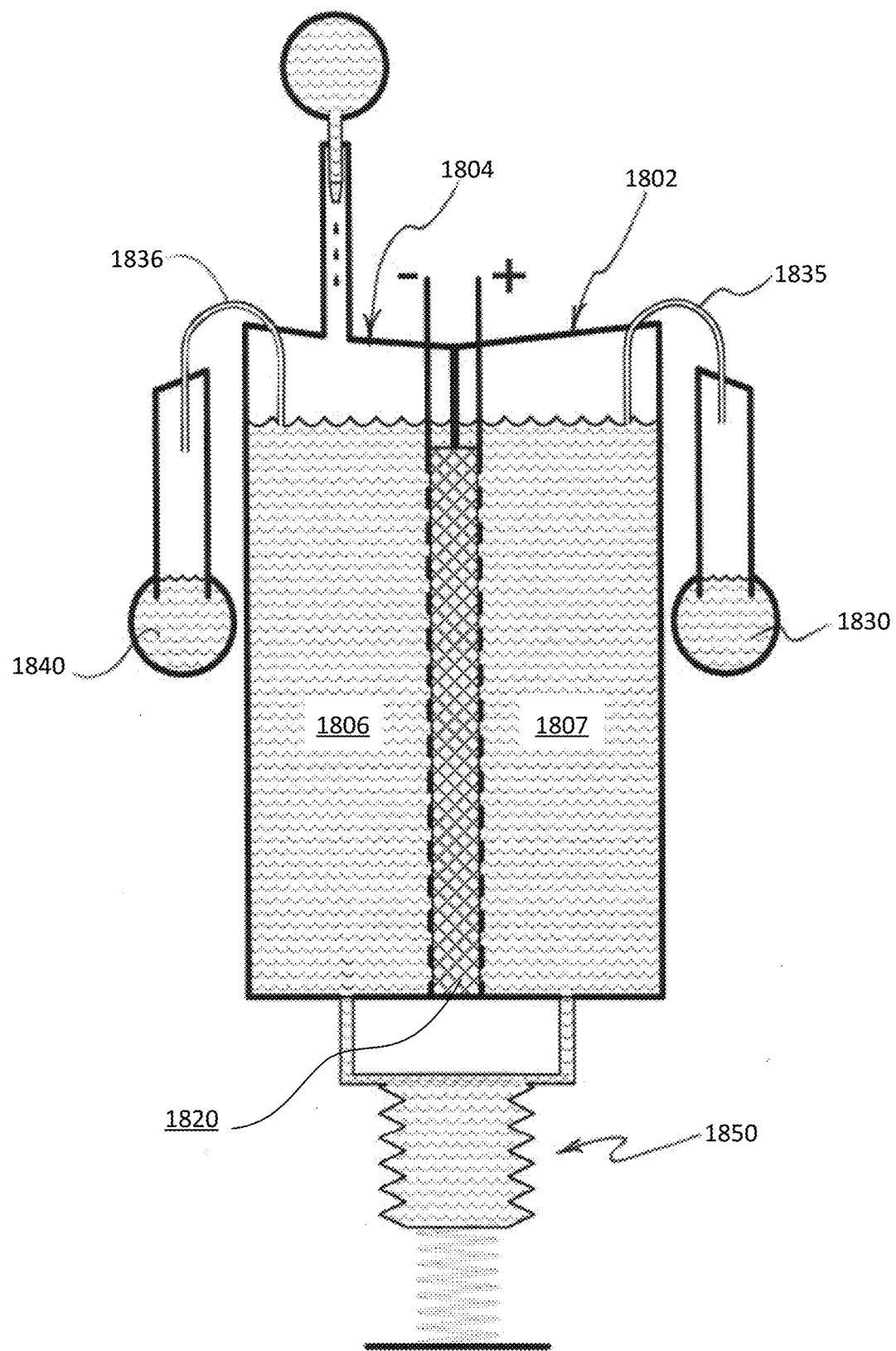
FIG. 18 is a schematic illustration of some features of an LFIE electrolyzer, according to certain embodiments.

Some embodiments of LFIE electrolyzers may be configured to deliver process water to both half-cell chambers 1802, 1804, as schematically illustrated in FIG. 18. Such a system may comprise either PEM or AEM separators, and may be operated at atmospheric or higher pressures. The system of FIG. 18 includes: half-cell chambers 1802, 1804; a PEM or AEM separator membrane 1820; gas removal manifolds 1840, 1843; fluid escape elements 1835, 1836; expansion chamber 1850; and liquid electrolyte 1806, 1807. As described above, electrochemical splitting of water will tend to happen preferentially in one half-cell depending on the nature of the ion-exchange membrane in use. As a result, a water consumption rate in one half-cell may be substantially lower (or even zero) relative to the consumption rate in the other half-cell. In various implementations, water in a half-cell with a low consumption rate may be held static (e.g., by a phase-discriminating fluid escape membrane allowing only gas to pass through), or may be removed at a slow rate along with produced gas.

Electronic Controllers

Figure 19:
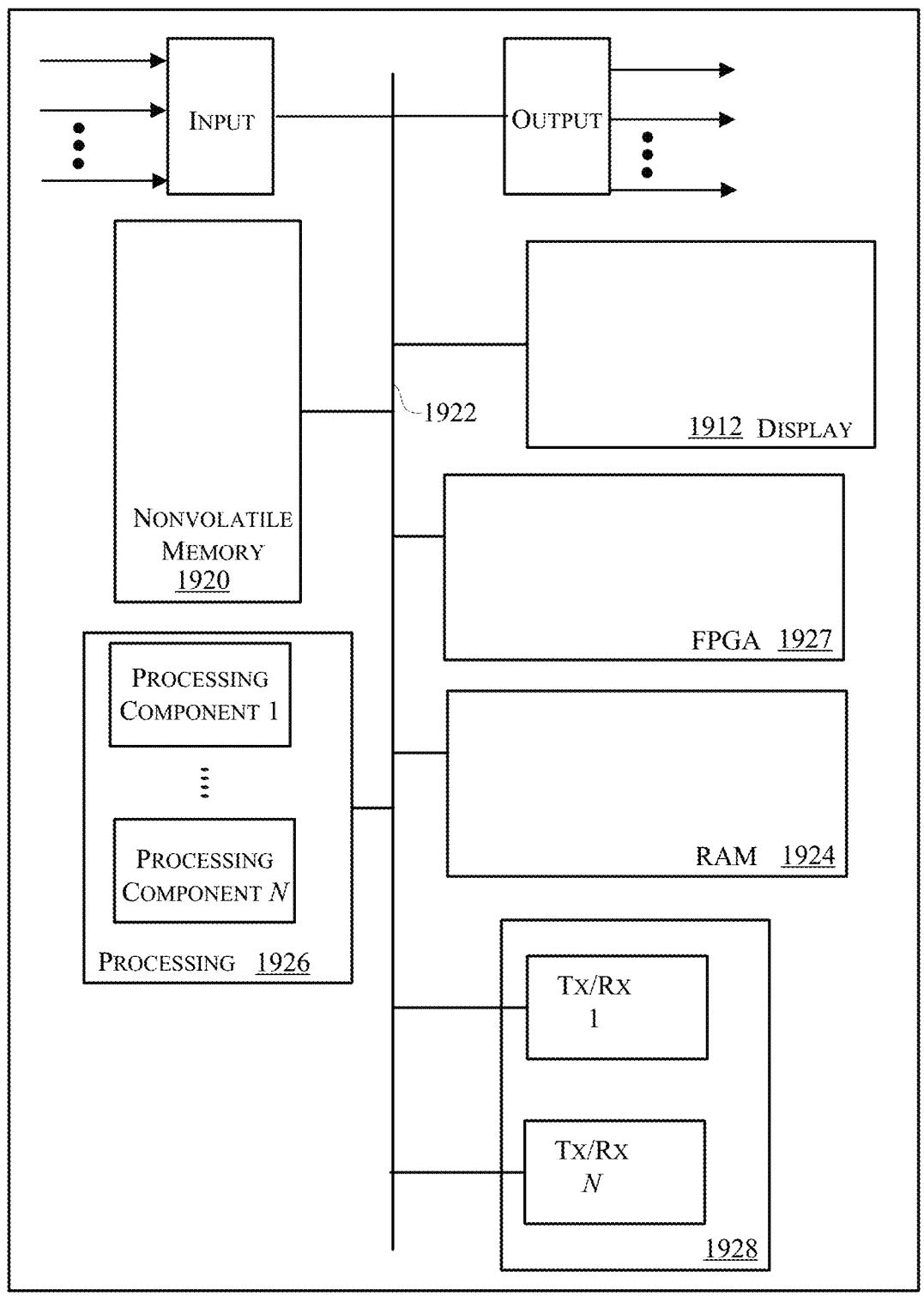
FIG. 19 is a block diagram schematically illustrating components of a computer or electronic controller which may be used to automatically execute methods and processes described herein to control operation of an electrochemical system.

Referring next to FIG. 19, shown is a block diagram depicting physical components of an electronic controller that may be utilized to realize one or more aspects or embodiments of electronic controllers disclosed or used in combination with systems and methods herein. For example, aspects of controllers used for directing methods and operations described herein may be realized by the components of FIG. 19.

In the schematic illustration of FIG. 19, a display portion 1912 and nonvolatile memory 1920 are coupled to a bus 1922 that is also coupled to random access memory ("RAM") 1924, a processing portion (which includes N processing components) 1926, a field programmable gate array (FPGA) 1927, and a transceiver component 1928 that includes N transceivers.

Although the components depicted in FIG. 19 represent physical components, FIG. 19 is not intended to be a detailed hardware diagram; thus, many of the components depicted in FIG. 19 may be realized by common constructs or distributed among additional physical components. Some components of FIG. 19 may be omitted in some implementations. Moreover, it is contemplated that other existing and yet-to-be developed physical components and architectures may be utilized to implement the functional components described with reference to FIG. 19.

The display portion 1912 may operate to provide a user interface for an operator of the systems described herein. The display may be realized, for example, by a liquid crystal display, AMOLED display, or others, and in some implementations, the display may be realized by a touchscreen display to enable an operator to modify control aspects and to view operating parameter-values (e.g., cell or stack current, cell or stack voltage, reactive power, operating trends, flow rates, pressures, etc.) of the disclosed electrochemical systems. In general, the nonvolatile memory 1920 may be a non-transitory memory that functions to store (e.g., persistently store) data and processor executable code, including executable code that is associated with effectuating the methods described herein. In some embodiments, the nonvolatile memory 1920 may include bootloader code, operating system code, file system code, and non-transitory processor-executable code to facilitate the execution of the functionality of the logic and control components described herein.

In some implementations, the nonvolatile memory 1920 may be realized by flash memory (e.g., NAND or ONENAND memory), but it is contemplated that other memory types may also be utilized. Although it may be possible to execute the code from the nonvolatile memory 1920, the executable code in the nonvolatile memory may typically be loaded into RAM 1924 and executed by one or more of the N processing components in the processing portion 1926.

The N processing components in connection with RAM 1924 may generally operate to execute the instructions stored in nonvolatile memory 1920 to facilitate execution of the methods disclosed herein. For example, non-transitory processor-executable instructions to effectuate aspects of the methods described herein may be persistently stored in nonvolatile memory 1920 and executed by the N processing components in connection with RAM 1924. As one of ordinarily skill in the art will appreciate, the processing portion 1926 may include a video processor, digital signal processor (DSP), graphics processing unit (GPU), and other processing components.

In addition, or in the alternative, the FPGA 1927 may be configured to effectuate one or more aspects of the methodologies described herein. For example, non-transitory FPGA-configuration-instructions may be persistently stored in nonvolatile memory 1920 and accessed by the FPGA 1927 (e.g., during boot up) to configure the FPGA 1927 to effectuate one or more functions of the control and logic components described herein.

As one of ordinary skill in the art in view of this disclosure will appreciate, the depicted input and output modules may be used for several different purposes. Sensors, for example, may be coupled to the input module, and the output module may generate control signals for operating any of the various electrical, electronic, or electro-mechanical components described herein.

The depicted transceiver component 1928 may include N transceiver chains, which may be used for communicating with external devices via wireless or wireline networks. Each of the N transceiver chains may represent a transceiver associated with a particular communication scheme (e.g., SCADA, DNP3, WiFi, Ethernet, Modbus, CDMA, Bluetooth, NFC, etc.).

Terminology Used

Although many of the examples and embodiments herein are described with reference to water electrolyzers, the same general structures, systems, and methods may be applied to other systems involving electrochemical cell stacks such as fuel cells (in which gases are reacted to produce energy) and flow batteries (in which energy is stored in the form of one or more ionic species in an aqueous or non-aqueous solution).

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Various modifications to the above embodiments will be readily apparent to those skilled in the art, and the generic principles defined herein may be applied to other embodiments without departing from the spirit or scope of the invention. Thus, it is intended that the scope of the present invention herein disclosed should not be limited by the particular disclosed embodiments described above, but should be determined only by a fair reading of the claims that follow.

In particular, materials and manufacturing techniques may be employed as within the level of those with skill in the relevant art. Furthermore, reference to a singular item, includes the possibility that there are plural of the same items present. More specifically, as used herein and in the appended claims, the singular forms "a," "and," "said," and "the" include plural referents unless the context clearly dictates otherwise. As used herein, unless explicitly stated otherwise, the term "or" is inclusive of all presented alternatives, and means essentially the same as the phrase "and/or." It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

Additional Embodiments

Additional embodiments may include:

Embodiment 1. An electrochemical system comprising: a stack of confined electrolyte electrochemical cells, each individual electrochemical cell independently comprising: a first half-cell chamber containing a first volume of electrolyte in contact with a first electrode; a second half-cell chamber in contact with a counter-electrode; a separator separating the first half-cell chamber from the second half-cell chamber; and a first electrolyte capture-and-return system in communication with the first half-cell, the electrolyte capture-and-return system configured to capture electrolyte from the first volume of electrolyte that is escaping the first half-cell chamber and to drive the captured electrolyte back into at least one of the first half-cell chamber and the second half-cell chamber via an electrolyte return conduit.

Embodiment 2. The electrochemical system of Embodiment 1, wherein electrolyte in each individual electrochemical cell of the stack is fluidically isolated from electrolyte in each other individual electrochemical cell of the stack.

Embodiment 3. The electrochemical system of Embodiment 1 or 2, wherein the first electrolyte capture-and-return system fluidically isolates captured electrolyte from fluid communication with electrolyte in any other cell of the cell-stack.

Embodiment 4. The electrochemical system of any of Embodiments 1-3 further comprising a second electrolyte capture-and-return system in communication with the second half-cell chamber; wherein the second half-cell chamber comprises a second volume of electrolyte; and wherein the second electrolyte capture-and-return system is configured to capture electrolyte from the second volume of electrolyte that is escaping the second half-cell chamber and to drive the captured electrolyte back into the first half-cell chamber, the second half-cell chamber or both.

Embodiment 5. The electrochemical system of any of Embodiments 1-4, wherein each of the first electrolyte capture-and-return system and/or second electrolyte capture-and-return system independently comprises a liquid-gas separation chamber, the liquid-gas separation chamber being unique to the respective individual electrochemical cell in which they reside. Embodiment 5b: The electrochemical system of any of Embodiments 1-4, wherein each of the first electrolyte capture-and-return system comprises a liquid-gas separation chamber, the liquid-gas separation chamber being unique to the respective individual electrochemical cell in which they reside.

Embodiment 6. The electrochemical system of any of Embodiments 1-5, wherein the first electrolyte capture-and-return system is in fluid communication with a first gas removal manifold and/or the second electrolyte capture-and-return system is in fluid communication with a second gas removal manifold; and wherein the each of the first gas removal manifold and the second gas removal manifold, if present, is in fluid communication with each of the electrochemical cells in the stack. Embodiment 6b: the electrochemical system of any of Embodiments 1-5, wherein the first electrolyte capture-and-return system is in fluid communication with a first gas removal manifold; and wherein the first gas removal manifold is in fluid communication with each of the electrochemical cells in the stack.

Embodiment 7. The electrochemical system of Embodiment 6, wherein the first gas removal manifold and/or the second gas removal manifold contains a gas-removal liquid. Embodiment 7b: The electrochemical system of Embodiment 6, wherein the first gas removal manifold contains a gas-removal liquid.

Embodiment 8. The electrochemical system of Embodiment 7, wherein the gas-removal liquid is maintained within a pre-determined range of fluid pressure.

Embodiment 9. The electrochemical system of Embodiment 7 or 8, wherein the gas-removal liquid is a non-conductive liquid.

Embodiment 10. The electrochemical system of any of Embodiments 1-9, further comprising a first fluid escape element through which gas and liquid electrolyte escapes the first half-cell chamber into the first electrolyte capture-and-return system and/or a second fluid escape element through which gas and liquid electrolyte escapes the second half-cell chamber into the second electrolyte capture-and-return system, if present. Embodiment 10b: The electrochemical system of any of Embodiments 1-9, further comprising a first fluid escape element through which gas and liquid electrolyte escapes the first half-cell chamber into the first electrolyte capture-and-return system.

Embodiment 11. The electrochemical cell of Embodiment 10, wherein the fluid escape element is a series fluid escape element characterized by a pressure-drop of at least 0.1 bar.

Embodiment 12. The electrochemical system of any of Embodiments 1-11, wherein the first electrolyte capture-and-return system comprises a first liquid-gas separator unique to the first half-cell and/or wherein the second electrolyte capture-and-return system comprises a second liquid-gas separator unique to the second half-cell. Embodiment 12b: The electrochemical system of any of Embodiments 1-11, wherein the first electrolyte capture-and-return system comprises a first liquid-gas separator unique to the first half-cell.

Embodiment 13. The electrochemical system of Embodiment 12, wherein the first liquid-gas separator and/or second liquid-gas separator is contained within a cell-frame and comprises at least two chambers joined in fluid communication with one another. Embodiment 13b: The electrochemical system of Embodiment 12, wherein the first liquid-gas separator is contained within a cell-frame and comprises at least two chambers joined in fluid communication with one another.

Embodiment 14. The electrochemical system of any of Embodiments 12-13, wherein each cell comprises a first one-way valve between the first liquid-gas separator and the first gas removal manifold and/or each cell comprises a second one-way valve between the second liquid-gas separator and the second gas removal manifold; wherein the first one-way valve is oriented to allow flow of gas from the first liquid-gas separator into the first gas removal manifold when gas pressure in the first liquid-gas separator exceeds a fluid pressure in the first gas removal manifold; and wherein the second one-way valve is oriented to allow flow of gas from the second liquid-gas separator into the second gas removal manifold when gas pressure in the second liquid-gas separator exceeds a fluid pressure in the second gas removal manifold. Embodiment 14b: The electrochemical system of any of Embodiments 12-13, wherein each cell comprises a first one-way valve between the first liquid-gas separator and the first gas removal manifold; wherein the first one-way valve is oriented to allow flow of gas from the first liquid-gas separator into the first gas removal manifold when gas pressure in the first liquid-gas separator exceeds a fluid pressure in the first gas removal manifold.

Embodiment 15. The electrochemical system of any of Embodiments 1-14, wherein the first electrolyte capture-and-return system and/or the second electrolyte capture-and-return system comprises a membrane to promote the flow of product gas while maintaining electrolyte in the respective electrolyte capture-and-return system. Embodiment 15b: The electrochemical system of any of Embodiments 1-14, wherein the first electrolyte capture-and-return system comprises a membrane to promote the flow of product gas while maintaining electrolyte in the first electrolyte capture-and-return system.

Embodiment 16. The electrochemical system of any of Embodiments 1-15, wherein the first electrolyte capture-and-return system and/or the second electrolyte capture-and-return system comprises one or more pumps configured to return respectively captured electrolyte to the first half-cell chamber or the second half-cell chamber, respectively. Embodiment 16b: The electrochemical system of any of Embodiments 1-15, wherein the first electrolyte capture-and-return system comprises one or more pumps configured to return captured electrolyte to the first half-cell chamber.

Embodiment 17. The electrochemical system of any of Embodiments 1-16, wherein the first electrolyte capture-and-return system and/or the second electrolyte capture-and-return system is configured to allow for mixing of the electrolyte. Embodiment 17b: The electrochemical system of any of Embodiments 1-16, wherein the first electrolyte capture-and-return system is configured to allow for mixing of the electrolyte.

Embodiment 18. The electrochemical system of any of Embodiments 1-17, wherein the first electrolyte capture-and-return system and/or the second electrolyte capture-and-return system is configured to capture at least 80% by mass of the electrolyte displaced from the respective half-cell as a liquid, as a mist, or as a combination thereof. Embodiment 18b: The electrochemical system of any of Embodiments 1-17, wherein the first electrolyte capture-and-return system is configured to capture at least 80% by mass of the electrolyte displaced from the respective half-cell as a liquid, as a mist, or as a combination thereof.

Embodiment 19. The electrochemical system of any of Embodiments 1-18, wherein the electrochemical system is a battery, a flow battery or a fuel cell.

Embodiment 20. The electrochemical system of any of Embodiments 1-19, wherein the electrochemical system is an alkaline electrolysis cell.

Embodiment 21. The electrochemical system of any of Embodiments 1-20, wherein the electrochemical cell generates hydrogen gas and oxygen gas as product gasses.

Embodiment 22. The electrochemical system of Embodiment 21, wherein the separator is a proton exchange membrane (PEM) or an anion exchange membrane (AEM), and wherein the electrolyte is deionized water.

Embodiment 23. The electrochemical system of Embodiment 20 or 21, wherein the electrolyte is an aqueous alkaline solution.

Embodiment 24. The electrochemical system of Embodiment 23, wherein the electrolyte comprises potassium hydroxide, sodium hydroxide, lithium hydroxide or any combination thereof.

Embodiment 25. The electrochemical system of any of Embodiments 1-24, wherein each electrochemical cell of the stack further comprises an expansion chamber unique to the respective electrochemical cell and in fluid communication with the first half-cell chamber and the second half-cell chamber of the respective electrochemical cell, the expansion chamber having an expandable and contractible volume and being configured to allow volumetric expansion of liquid and gas in one or both of the half-cell chambers.

Embodiment 26. The electrochemical system of Embodiment 25, wherein the expansion chamber is configured to reduce a pressure differential between the first half-cell chamber and the second half-cell chamber via an expansion and/or contraction of the expansion chamber's volume.

Embodiment 27. The electrochemical cell of Embodiment 25 or 26, wherein the expansion chamber's volume changes based on a pressure in the first half-cell chamber and a pressure in the second half-cell chamber.

Embodiment 28. The electrochemical system of any of Embodiments 25-27, wherein the expansion chamber is in fluid communication with first electrolyte capture-and-return system and the second electrolyte capture-and-return system, if present.

Embodiment 29. The electrochemical system of any of Embodiments 25-28, wherein each electrochemical cell of the stack further comprises an expansion resistor in operable communication with the expansion chamber.

Embodiment 30. The electrochemical system of Embodiment 29, wherein the expansion resistor is a spring, a bellow, a diaphragm, a balloon, a volume of working fluid maintained at a predetermined pressure, a physical property of the expansion chamber or any combination thereof.

Embodiment 31. The electrochemical system of any of Embodiments 25-30, wherein the expansion chamber comprises a divider to maintain separation of first volume of electrolyte from the first half-cell chamber and second volume of electrolyte from the second half-cell chamber.

Embodiment 32. The electrochemical system of any of Embodiments 1-31, wherein the electrochemical cell further comprises a make-up liquid supply in fluid communication with the electrochemical cell to provide make-up liquid to the first half-cell, the second half-cell, or both.

Embodiment 33. The electrochemical system of Embodiment 32 further comprising a one-way valve positioned between the make-up liquid supply and the electrochemical cell, the one-way valve arranged to allow fluid flow into but not out of the electrochemical cell.

Embodiment 34. The electrochemical system of Embodiment 32 or 33, wherein the make-up liquid is provided to the electrochemical cell by a supply manifold and wherein the supply manifold is in fluid communication with each electrochemical cell in the stack.

Embodiment 35. The electrochemical system of Embodiment 34, wherein the one-way valve regulates the flow of make-up liquid into the electrochemical cell based on a pressure difference between the supply manifold and the electrochemical cell.

Embodiment 36. The electrochemical system of Embodiment 35, wherein the one-way valve regulates the flow of make-up liquid into the electrochemical cell based only on the pressure difference between the supply manifold and the electrochemical cell.

Embodiment 37. The electrochemical system of any of Embodiments 32-36, wherein the make-up liquid is deionized water.

Embodiment 38. The electrochemical system of any of Embodiments -37 further comprising a pump operably connected to each of the electrochemical cells and arranged to drive captured electrolyte into one or both of the half-cell chambers.

Embodiment 39. The electrochemical system of any of Embodiments 12-38 further comprising a pump operably connected to each of the electrochemical cells and arranged to drive captured electrolyte from the liquid-gas separator into one or both of the half-cell chambers.

Embodiment 40. The electrochemical system of Embodiment 38 or 37, wherein the pump is a ventricular pump or a positive displacement pump.

Embodiment 41. The electrochemical system of any of Embodiments 38-40, wherein the pump is capable of driving both liquid and gas through the electrolyte return channel.

Embodiment 42. The electrochemical system of any of Embodiments 1-41, wherein the stack is arranged in a prismatic layered configuration, a cylindrical stack of circular cell-frames, a spiral jellyroll configuration, a prismatic jellyroll configuration or any other rolled jellyroll or stacked prismatic configuration.

Embodiment 43. The electrochemical system of any of Embodiments 1-42, wherein the second half-cell chamber comprises a product gas generated in the second half-cell chamber and wherein the second half-cell chamber is free of electrolyte during operation of the electrochemical system.

Embodiment 44. The electrochemical system of Embodiment 43, wherein each electrochemical cell comprises a gas-injector manifold configured to maintain a gas pressure in the second half-cell chamber sufficient to prevent a liquid electrolyte from entering the second half-cell chamber.

Embodiment 45. The electrochemical system of Embodiment 44, wherein gas-injector manifold injects a second gas into the second half-cell chamber.

Embodiment 46. The electrochemical system of Embodiment 45, wherein the second gas is different from the product gas.

Embodiment 47. The electrochemical system of Embodiments 43-46, wherein the electrochemical system is configured such that product gas from the second half-cell chamber of each electrochemical cell is used to cool the electrochemical cells in the stack.

Embodiment 48. The electrochemical cell of Embodiment 47, wherein the stack comprises one or more heat-exchangers that receive and cool the product gas; and wherein the product gas is injected into each electrochemical cell via a gas-injector manifold after the product gas is cooled via the one or more heat exchangers.

Embodiment 49. The electrochemical cell of any of Embodiments 1-48, wherein the stack is a bipolar stack.

Embodiment 50. The electrochemical system of any of Embodiments 1-48, wherein the stack is a bipolar stack comprising bipolar plates between adjacent cells, and wherein each bipolar plate comprises a flow channel layer sandwiched between first and second outer layers, the flow channel layer defining one or more coolant flow channels and the flow channel layer being sealed to the first and second outer layers.

Embodiment 51. An electrochemical system, comprising: a stack of electrochemical cells, each individual electrochemical cell independently comprising: a first half-cell chamber containing a first electrode and containing a volume of fluid fluctuating between a first fluid pressure and a second fluid pressure; a second half-cell chamber containing a second electrode; a separator separating the first half-cell chamber from the second half-cell chamber; and a make-up liquid inlet comprising a one-way valve arranged to provide flow of make-up liquid into the first half-cell chamber and to prevent flow of liquid out of the half-cell through the make-up liquid inlet; a make-up liquid supply manifold in fluid communication with the make-up liquid inlet of all cells of the stack, the make-up liquid supply manifold containing a make-up liquid at a third fluid pressure, the third fluid pressure is a controlled pressure that is greater than the first pressure and less than the second pressure. In some embodiments, the volume of fluid can be a mixture of gas and liquid. In some embodiments, the controlled pressure is controlled by an electromechanical regulator which can be operated or controlled by an electronic controller.

Embodiment 52. The electrochemical system of Embodiment 51, wherein the third pressure is within 0.5±0.2 bar of an average steady-state operating pressure of the volume of fluid in the first half-cell chamber.

Embodiment 53. The electrochemical system of Embodiment 51, wherein an electrolyte in each individual electrochemical cell of the stack is fluidically isolated from an electrolyte in each other individual electrochemical cell of the stack.

Embodiment 54. A method of operating an electrochemical system; wherein the electrochemical system comprises: a stack of electrochemical cells, each individual electrochemical cell independently comprising: a first half-cell chamber containing a first electrode and containing a volume of fluid fluctuating between a first fluid pressure and a second fluid pressure; a second half-cell chamber containing a second electrode; a separator separating the first half-cell chamber from the second half-cell chamber; and a make-up liquid inlet comprising a one-way valve; and a make-up liquid supply manifold in fluid communication with the make-up liquid inlet of all cells of the stack, the make-up liquid supply manifold containing a make-up liquid at a third fluid pressure; and the method comprising steps of: providing, via the one-way valve, a flow of make-up liquid into the first half-cell chamber; preventing, via the one-way vale, a flow of liquid out of the half-cell through the make-up liquid inlet; and controlling the third fluid pressure such that it is greater than the first pressure and less than the second pressure. In some embodiments, the volume of fluid can be a mixture of gas and liquid, for example.

Embodiment 55. The method of Embodiment 54, wherein an electrolyte in each individual electrochemical cell of the stack is fluidically isolated from an electrolyte in each other individual electrochemical cell of the stack.

Embodiment 56. An electrochemical system comprising: a stack of electrochemical cells, each individual electrochemical cell independently comprising: a first half-cell chamber containing a first volume of liquid in contact with a first electrode; a second half-cell chamber comprising a counter-electrode; a separator membrane separating the first half-cell chamber from the second half-cell chamber; a first liquid-gas separator outside of the first half-cell chamber and in fluid communication with the first half-cell chamber via a first fluid escape element; and a first pump arranged to drive liquid from the first liquid-gas separator into the first half-cell chamber via a liquid return channel that is separate from the fluid escape element. In some embodiments, the liquid is deionized water.

Embodiment 57. The electrochemical system of Embodiment 56, wherein an electrolyte in each individual electrochemical cell of the stack is fluidically isolated from an electrolyte in each other individual electrochemical cell of the stack.

Embodiment 58. The electrochemical cell of Embodiment 56 or 57, wherein the second half-cell chamber further comprises a second volume of liquid.

Embodiment 59. The electrochemical system of any of Embodiments 56-58, wherein the pump is a planar ventricular pump.

Embodiment 60. The electrochemical system of any of Embodiments 56-59, wherein each individual cell independently further comprises an expansion volume in fluid communication with the first half-cell chamber.

Embodiment 61. An electrochemical system comprising: a bipolar stack of electrochemical cells in which adjacent cells share a bipolar plate between them, each individual electrochemical cell independently comprising: a first half-cell chamber containing a first electrode; a first electrically conductive egress channel joining the first half-cell to a first drip chamber, an electrically non-conductive gap between an outlet end of the first egress channel and the first drip chamber; a second half-cell chamber containing a second electrode; a second electrically conductive egress channel joining the second half-cell to a second drip chamber, an electrically non-conductive gap between an outlet end of the second egress channel and the second drip chamber; a separator membrane separating the first half-cell chamber from the second half-cell chamber; a first electrical lead joined to a bipolar plate; a second electrical lead joined to the first drip-chamber; and a third electrical lead joined to the second drip chamber; and an electronic controller configured to monitor electric potential, current, or voltage between pairs of the first electrical lead, the second electrical lead, and the second electrical lead.

Embodiment 62. The electrochemical system of Embodiment 61, wherein an electrolyte in each individual electrochemical cell of the stack is fluidically isolated from an electrolyte in each other individual electrochemical cell of the stack.

Embodiment 63. An electrochemical system comprising: at least one confined electrolyte electrochemical cell comprising: the electrolyte; a first half-cell comprising a first electrode in contact with a first volume of the electrolyte and a first electrolyte capture-and-return system; a second half-cell comprising a second electrode in contact with a second volume of the electrolyte and a second electrolyte capture-and-return system; and a separator separating the first half-cell from the second half-cell; wherein the first electrolyte capture-and-return system is configured to capture electrolyte escaping from the first half-cell and return at least a portion of the captured electrolyte to the first half-cell without mixing it with electrolyte from any other cell; and wherein the second electrolyte capture-and-return system is configured to capture electrolyte escaping from the second half-cell and return at least a portion of the captured electrolyte to the second half-cell without mixing it with electrolyte from any other cell.

Embodiment 64. The electrochemical system of Embodiment 63, wherein the first electrolyte capture-and-return system is fluidically isolated from the second half-cell and wherein the second electrolyte capture-and-return system is fluidically isolated from the first half-cell.

Embodiment 65. The electrochemical system of Embodiment 63 or 64, wherein electrolyte in each individual electrochemical cell of the stack is fluidically isolated from electrolyte in each other individual electrochemical cell of the stack.

Embodiment 66. The electrochemical system of Embodiment 65, wherein each of the first and second electrolyte capture-and-return systems independently fluidically isolate respective captured electrolyte from fluid communication with electrolyte in any other cell of the cell-stack.

Embodiment 67. A method of generating at least one product gas comprising: providing an electrochemical system comprising: at least one electrochemical cell comprising: an electrolyte; a first half-cell having a first electrode in communication with a first volume of the electrolyte and a first electrolyte capture-and-return system; a second half-cell including a second electrode in communication with a second volume of the electrolyte; and a separator separating the first half-cell from the second half-cell; capturing electrolyte escaping from the first half-cell via a first electrolyte capture-and-return system and returning the captured electrolyte to the first half-cell; and reacting the electrolyte in the at least one electrochemical cell thereby generating at least one product gas.

Embodiment 68. The method of Embodiment 67, wherein the second half-cell further comprises a second electrolyte capture-and-return system; and wherein the method further comprises capturing electrolyte escaping from the second half-cell via a second electrolyte capture-and-return system and returning the captured electrolyte to the second half-cell.

Embodiment 69. The electrochemical system of Embodiment 68, wherein the first electrolyte capture-and-return system is fluidically isolated from the second half-cell and wherein the second electrolyte capture-and-return system is fluidically isolated from the first half-cell.

Embodiment 70. The electrochemical system of any of Embodiments 67-69, wherein electrolyte in each individual electrochemical cell of the stack is fluidically isolated from electrolyte in each other individual electrochemical cell of the stack.

Embodiment 70. A method for generating hydrogen and oxygen gas comprising: providing an electrolyzer comprising: a plurality of electrochemical cells each independently comprising: an aqueous electrolyte; a first half-cell having a first electrode in communication with first portion of the aqueous electrolyte, a first electrolyte capture-and-return system and a first gas capture system; a second half-cell including a second electrode in communication with a second portion of the aqueous electrolyte and a second gas capture system; and a separator separating the first half-cell from the second half-cell; capturing electrolyte displaced from the first half-cell via a first electrolyte capture-and-return system and returning the electrolyte to the first half-cell; and electrolyzing the aqueous electrolyte in each of the electrochemical cells, thereby generating the first gas and the second gas, wherein each first gas capture system is in fluid communication with one another and each second gas capture system is in fluid communication with one another.

Embodiment 72. The method of Embodiment 71, wherein the second half-cell further comprises a second electrolyte capture-and-return system; and wherein the method further comprises capturing electrolyte displaced from the second half-cell via a second electrolyte capture-and-return system and returning the electrolyte to the second half-cell.

Embodiment 73. The method of Embodiment 70 or 72, wherein the first gas is oxygen and the first gas capture system is an oxygen gas capture system or wherein the first gas is hydrogen and the first gas capture system is a hydrogen gas capture system.

Embodiment 74. The method of any of Embodiments 71-73, wherein the first gas is oxygen and the first gas capture system is an oxygen gas capture system and wherein the second gas is hydrogen and the second gas capture system is a hydrogen gas capture system.

Embodiment 75. The method of any of Embodiments 71-74, wherein the separator is a proton exchange membrane (PEM) or an anion exchange membrane (AEM).

Embodiment 76. The method of any of Embodiments 71-75, wherein each individual electrochemical cell of the plurality of electrochemical cells independently further comprises an expansion volume in fluid communication with the first half-cell and the second half-cell.

Embodiment 77. The method of any of Embodiments 71-76, wherein the first electrolyte capture-and-return system is in fluid communication with the second electrolyte capture-and-return system in each of the electrochemical cells.

Embodiment 78. The method of any of Embodiments 71-76, wherein any electrolyte capture-and-return system of an individual electrochemical cell is fluidically isolated from any electrolyte capture-and-return system of each other electrochemical cell in the electrolyzer.

Embodiment 79. The method of any of Embodiments 71-78, wherein electrolyte in each individual electrochemical cell of the stack is fluidically isolated from electrolyte in each other individual electrochemical cell of the stack.

Embodiment 80. A ventricular pump comprising: a pump chamber containing an actuation fluid on a first side of a fluid driver, and a driven fluid on a second side of the fluid driver opposite the first side; an up-stream one-way valve arranged to allow flow through a driven fluid in-flow aperture into the pump chamber on the first side of the fluid driver; a down-stream one-way valve arranged to allow flow through a driven fluid out-flow aperture from the pump chamber on the first side of the fluid driver; an actuation fluid inlet in fluid communication with the pump chamber on the first side of the fluid driver; an actuation fluid in the actuation fluid inlet and in the pump chamber on the first side of the fluid driver; and an actuator configured to apply a compressive and/or expansive force to the actuation fluid sufficient to at least partially deflect the fluid driver.

Embodiment 81. The ventricular pump of Embodiment 80, wherein the actuation fluid is an incompressible liquid.

Embodiment 82. The ventricular pump of Embodiment 81, wherein the actuation fluid is a compressible gas.

Embodiment 83. The ventricular pump of Embodiment 80, wherein the pump chamber is formed in a cell-frame of one of a plurality of cell-frames in a cell-stack.

Embodiment 84. The ventricular pump of Embodiment 83, wherein the actuation fluid inlet is in fluid communication with an actuation fluid manifold extending through the cell-stack.

Embodiment 85. A method of operating an electrolyzer system comprising a plurality of electrochemical cells in a cell-stack, each cell comprising a positive half-cell chamber separated from a negative half-cell chamber by a proton exchange membrane (PEM), the method comprising: flowing a process water into the positive half-cell chamber of each electrochemical cell in the cell-stack at a first rate not greater than 1,000% of a second rate at which the process water is consumed in the positive half-cell chamber by being split into hydrogen and oxygen gases; flowing a coolant through one or more heat-exchangers in the cell-stack; withdrawing gas from the negative half-cell chamber of each electrochemical cell via a negative gas removal manifold; maintaining the negative gas removal manifold at a pressure of at least 10 bar absolute pressure; and withdrawing a mixture of oxygen gas and liquid process water from the positive half-cell chamber of each electrochemical cell through a common outlet in the positive half-cell chamber of each electrochemical cell.

Embodiment 86. The method of Embodiment 85, further comprising regulating a first fluid pressure in a supply manifold directing processes water into the cell-stack.

Embodiment 87. The method of Embodiment 86, further comprising regulating a second fluid pressure in a fluid removal manifold through which the mixture of oxygen gas and process water is removed from positive half-cells of the cell-stack.

Embodiment 88. The method of any one of Embodiments 85-87, wherein each of the one or more heat exchangers in the cell-stack comprises one or more flow channels within bipolar plate structures between adjacent electrochemical cells.

Embodiment 89. The method of Embodiment 88, wherein each bipolar plate structure comprises a flow channel layer sandwiched between first and second outer layers, the flow channel layer defining one or more coolant flow channels and being sealed to the first and second outer layers.

Embodiment 90. The method of Embodiment 85, further comprising withdrawing process water from the cell stack and comprising returning process water to the cell stack; wherein process water withdrawn from the cell-stack is not directed through a heat exchanger after the cell-stack and before being returned to the cell-stack.

Embodiment 91. The method of any one of Embodiments 85-90, wherein each electrochemical cell in the cell-stack comprises an expansion chamber in fluid communication with the positive half-cell chamber.

Embodiment 92. A method of operating an electrolyzer system comprising a plurality of electrochemical cells in a cell-stack, each cell comprising a positive half-cell chamber separated from a negative half-cell chamber by an anion exchange membrane (AEM), the method comprising: flowing a process water into the negative half-cell chamber of each electrochemical cell in the cell-stack at a first rate not greater than 1,000% of a second rate at which the process water is consumed in the negative half-cell chamber of each electrochemical cell by being split into hydrogen and oxygen gases; flowing coolant through one or more heat-exchangers in the cell-stack; withdrawing gas from the positive half-cell chamber of each electrochemical cell via a positive gas removal manifold; maintaining the negative half-cell chamber of each electrochemical cell at a fluid pressure of at least 10 bar absolute pressure; and withdrawing a mixture of hydrogen gas and liquid process water from the negative half-cell chamber of each electrochemical cell through a common outlet in the negative half-cell chamber of each electrochemical cell.

Embodiment 93. The method of Embodiment 92, further comprising regulating a first fluid pressure in a supply manifold directing processes water into the cell-stack.

Embodiment 94. The method of Embodiment 93, further comprising regulating a second fluid pressure in a fluid removal manifold through which the mixture of oxygen gas and process water is removed from positive half-cells of the cell-stack.

Embodiment 95. The method of any one of Embodiments 92-94, wherein each of the one or more heat exchangers in the cell-stack comprises one or more flow channels within bipolar plate structures between adjacent cells.

Embodiment 96. The method of Embodiment 95, wherein each bipolar plate structure comprises a flow channel layer sandwiched between first and second outer layers, the flow channel layer defining one or more coolant flow channels and being sealed to the first and second outer layers.

Embodiment 97. The method of any one of Embodiments 92-95, further comprising withdrawing process water from the cell stack and comprising returning process water to the cell stack; wherein process water withdrawn from the cell-stack is not directed through a heat exchanger after the cell-stack and before being returned to the cell-stack.

Embodiment 98. The method of any one of Embodiments 92-97, wherein each electrochemical cell in the cell-stack comprises an expansion chamber in fluid communication with the positive half-cell chamber.

Embodiment 99. A water electrolyzer system, comprising: a cell-stack comprising a plurality of electrochemical cells, each cell comprising a positive half-cell chamber separated from a negative half-cell chamber by an anion exchange membrane (AEM); each negative half-cell chamber comprising a fluid exit having a fluid escape element configured to allow egress of a mixed-flow of hydrogen gas and water; a negative fluid removal manifold in communication with the negative half-cell chamber of each electrochemical cell in the cell-stack, the negative fluid removal manifold containing a mixture of hydrogen and water at a first regulated fluid pressure; a supply manifold configured to deliver process water to the negative half-cell chamber of each electrochemical cell in the cell-stack, wherein the process water in the supply manifold is at a second regulated fluid pressure that is greater than the first regulated fluid pressure; and a positive fluid removal manifold in communication with each positive half-cell chamber of the cell-stack, the positive fluid removal manifold containing oxygen gas at a third fluid pressure.

Embodiment 100. The system of Embodiment 99, further comprising at least one bipolar plate heat exchanger between adjacent cells in the cell-stack, each bipolar plate heat exchanger comprising a coolant channel between electrically conductive outer layers.

Embodiment 101. The system of any one of Embodiments 99-100, further comprising a gas-liquid separator downstream of the negative fluid removal manifold, and the system comprising a conduit directing water from the gas-liquid separator to the supply manifold, and wherein no heat exchanger is present between the negative fluid removal manifold and the supply manifold.

Embodiment 102. The system of Embodiment 101, wherein the gas-liquid separator comprises a gas pocket region above a liquid-level in a gas-liquid separation chamber.

Embodiment 103. The system of any one of Embodiments 99-102, further comprising an expansion chamber in fluid communication with the negative half-cell chamber of each cell.

Embodiment 104. The system of any one of Embodiments 99-103, further comprising a stack-bypass conduit directing a quantity of process water from the supply manifold to the negative fluid removal manifold.

Embodiment 105. The system of any one of Embodiments 99-104, wherein at least one of the fluid escape elements comprise one or more egress channels configured to impart a non-linear flow resistance to the mixed fluid exiting the negative half-cell chambers.

Embodiment 106. The system of any one of Embodiments 99-10005, wherein at least one of the fluid escape elements comprise one or more phase-discriminating membranes.

Embodiment 107. A water electrolyzer system, comprising: a cell-stack comprising a plurality of electrochemical cells, each cell comprising a positive half-cell chamber separated from a negative half-cell chamber by a proton exchange membrane (PEM); each positive half-cell chamber comprising a fluid exit having a fluid escape element configured to allow egress of a mixed-flow of oxygen gas and water; a positive fluid removal manifold in communication with the positive half-cell chamber of each electrochemical cell in the cell-stack, the positive fluid removal manifold containing a mixture of oxygen and water at a first regulated fluid pressure; a supply manifold configured to deliver process water to the positive half-cell chamber of each electrochemical cell in the cell-stack, wherein the process water in the supply manifold is at a second regulated fluid pressure that is greater than the first regulated fluid pressure; and a negative fluid removal manifold in communication with the negative half-cell chamber of each electrochemical cell in the cell-stack, the negative fluid removal manifold containing hydrogen gas at a third regulated fluid pressure that is greater than the second fluid pressure.

Embodiment 108. The system of Embodiment 107, further comprising at least one bipolar plate heat exchanger between adjacent cells in the cell-stack, each bipolar plate heat exchanger comprising a coolant channel between electrically conductive outer layers.

Embodiment 109. The system of any one of Embodiments 107-108, further comprising a gas-liquid separator downstream of the positive fluid removal manifold, and the system comprising a conduit directing water from the gas-liquid separator to the supply manifold, and wherein no heat exchanger is present between the positive fluid removal manifold and the supply manifold.

Embodiment 110. The system of any one of Embodiments 107-109, further comprising an expansion chamber in fluid communication with the positive half-cell chamber of each electrochemical cell.

Embodiment 111. The system of any one of Embodiments 107-110, further comprising a stack-bypass conduit directing a quantity of process water from the supply manifold to the positive fluid removal manifold.

Embodiment 112. The system of any one of Embodiments 107-111, wherein each fluid escape element comprises an egress channel configured to impart a non-linear flow resistance to the mixed fluid exiting the negative half-cell chambers.

Embodiment 113. The system of any one of Embodiments 107-112, wherein each fluid escape element comprises one or more phase-discriminating membranes.

Embodiment 114. The method of any one of Embodiments 85-91, wherein the oxygen gas in the positive half-cell chamber of each electrochemical cell is formed in the positive half-cell chamber via consumption of process water in the respective cell.

Embodiment 115. The method of any one of Embodiments 92-98, wherein the hydrogen gas in the negative half-cell chamber of each electrochemical cell is formed in the negative half-cell chamber via consumption of process water in the respective cell.

Embodiment 116. The system of any one of Embodiments 99-106, wherein the hydrogen gas in the negative fluid removal manifold is formed in the negative half-cell chambers of the cell-stack and wherein the oxygen gas in the positive fluid removal manifold is formed in the positive half-cell chambers of the cell-stack via consumption of process water in the plurality of electrochemical cells.

Embodiment 117. The method of any one of Embodiments 85-91, wherein said negative gas removal manifold withdraws only gas from the negative half-cell chamber of each electrochemical cell via.

Embodiment 118. The method of any one of Embodiments 92-98, wherein said positive gas removal manifold withdraws only gas from the positive half-cell chamber of each electrochemical cell.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and sub-combinations possible of the group are intended to be individually included in the disclosure. Specific names of compounds are intended to be exemplary, as it is known that one of ordinary skill in the art can name the same compounds differently.

Every formulation or combination of components described or exemplified herein can be used to practice the invention, unless otherwise stated.

Whenever a range is given in the specification, for example, a temperature range, a pressure range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein, any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

The term "and/or" is used herein, in the description and in the claims, to refer to a single element alone or any combination of elements from the list in which the term and/or appears. In other words, a listing of two or more elements having the term "and/or" is intended to cover embodiments having any of the individual elements alone or having any combination of the listed elements. For example, the phrase "element A and/or element B" is intended to cover embodiments having element A alone, having element B alone, or having both elements A and B taken together. For example, the phrase "element A, element B, and/or element C" is intended to cover embodiments having element A alone, having element B alone, having element C alone, having elements A and B taken together, having elements A and C taken together, having elements B and C taken together, or having elements A, B, and C taken together One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An electrochemical system comprising:
   a plurality of electrochemical cells, each individual electrochemical cell independently comprising:
   an electrolyte;
   a first half-cell chamber comprising a first electrode in contact with a first volume of the electrolyte, the first half cell chamber being in communication with a first electrolyte capture-and-return system;
   a second half-cell chamber comprising a second electrode in contact with a second volume of the electrolyte, the second half cell chamber being in communication with a second electrolyte capture-and-return system; and
   a separator separating the first half-cell chamber from the second half-cell chamber;
   wherein the first electrolyte capture-and-return system is configured to capture a first escaping electrolyte exiting from the first half-cell chamber and return at least a portion of the captured first escaping electrolyte to the first half-cell chamber and/or the second half-cell chamber without mixing it with electrolyte from any other electrochemical cell; and
   wherein the second electrolyte capture-and-return system is configured to capture a second escaping electrolyte exiting from the second half-cell chamber and return at least a portion of the captured second escaping electrolyte to the second half-cell chamber and/or the first half-cell chamber without mixing it with electrolyte from any other electrochemical cell.

2. The electrochemical system of claim 1 comprising a stack of the plurality of the electrochemical cells.

3. The electrochemical system of claim 2, wherein electrolyte in each individual electrochemical cell of the stack is fluidically isolated from electrolyte in each other individual electrochemical cell of the stack.

4. The electrochemical system of claim 1, wherein the first electrolyte capture-and-return system is configured to return the captured first escaping electrolyte to the first half-cell chamber without mixing it with electrolyte from any other cell and/or wherein the second electrolyte capture-and-return system is configured to return the captured second escaping electrolyte to the second half-cell chamber without mixing it with electrolyte from any other cell.

5. The electrochemical system of claim 1, wherein the first escaping electrolyte exits the first half-cell chamber along with a first generated gas and/or wherein the second escaping electrolyte exits the second half-cell chamber along with a second generated gas.

6. The electrochemical system of claim 1, wherein the first electrolyte capture-and-return system is further configured to return at least 95% of the first escaping electrolyte back into the first half-cell chamber and/or wherein the second electrolyte capture-and-return system is further configured to return at least 95% of the second escaping electrolyte back into the second half-cell chamber.

7. The electrochemical system of claim 1, wherein the first electrolyte capture-and-return system fluidically isolates the captured first escaping electrolyte from fluid communication with electrolyte in any other cell of the plurality of electrochemical cells and/or wherein the second electrolyte capture-and-return system fluidically isolates the captured second escaping electrolyte from fluid communication with electrolyte in any other electrochemical cell of the plurality of electrochemical cells.

8. The electrochemical system of claim 7, wherein the first electrolyte capture-and-return system is in fluid communication with a first gas removal manifold and/or the second electrolyte capture-and-return system is in fluid communication with a second gas removal manifold; wherein the first gas removal manifold is in fluid communication with the first gas removal manifold of each other electrochemical cell in the plurality of electrochemical cells; and wherein the second gas removal manifold is in fluid communication with the second gas removal manifold of each other electrochemical cell in the plurality of electrochemical cells.

9. The electrochemical system of claim 8, wherein the first gas removal manifold contains a gas removal liquid having a conductivity of less than about 20 microsiemen/cm at 25° C.

10. The electrochemical system of claim 1, wherein each individual electrochemical cell further comprises a first fluid escape element and a second fluid escape element; wherein both a gas and the first escaping electrolyte exit the first half-cell chamber into the first electrolyte capture-and-return system via the first fluid escape element; and both a gas and the second escaping electrolyte exit the second half-cell chamber into the second electrolyte capture-and-return system via the second fluid escape element.

11. The electrochemical system of claim 10, wherein each of the first and second the fluid escape elements is a series fluid escape element that exhibits a pressure-drop of at least 0.1 bar under operating conditions of the electrochemical system.

12. The electrochemical system of claim 8, wherein the first electrolyte capture-and-return system comprises a first liquid-gas separation volume unique to the first half-cell chamber; and wherein the second electrolyte capture-and-return system comprises a second liquid-gas separation volume unique to the second half-cell chamber.

13. The electrochemical system of claim 12, wherein each of the first and second liquid-gas separation volumes is contained within a cell-frame and comprises one or more chambers.

14. The electrochemical system of claim 12, wherein each cell independently comprises a first one-way valve between the first liquid-gas separation volume and the first gas removal manifold and a second one-way valve between the second liquid-gas separation volume and the second gas removal manifold; wherein the first one-way valve is oriented to allow flow of gas from the first liquid-gas separation volume into the first gas removal manifold when gas pressure in the first liquid-gas separation volume exceeds a fluid pressure in the first gas removal manifold; and wherein the second one-way valve is oriented to allow flow of gas from the second liquid-gas separation volume into the second gas removal manifold when gas pressure in the second liquid-gas separation volume exceeds a fluid pressure in the second gas removal manifold.

15. The electrochemical system of claim 12, wherein the first electrolyte capture-and-return system and/or the second electrolyte capture-and-return system comprises one or more pumps configured to drive captured electrolyte from the first and/or second liquid-gas separation volume, respectively, to the first and/or second half-cell chamber, respectively.

16. The electrochemical system of claim 15, wherein the one or more pumps comprises a ventricular pump or a positive displacement pump.

17. The electrochemical system of claim 1, wherein the electrochemical system is an alkaline electrolysis cell; and wherein the electrolyte is an aqueous alkaline solution.

18. The electrochemical system of claim 1, wherein the separator is a proton exchange membrane (PEM) or an anion exchange membrane (AEM).

19. The electrochemical system of claim 1, wherein each individual electrochemical cell of the plurality of electrochemical cells further independently comprises an expansion chamber unique to the respective electrochemical cell and in fluid communication with the first half-cell chamber and the second half-cell chamber of the respective electrochemical cell, the expansion chamber having an expandable and contractible volume and being configured to allow volumetric expansion of liquid and gas from one or both of the half-cell chambers.

20. The electrochemical system of claim 19, wherein the expansion chamber of each cell is in fluid communication with both the first half-cell chamber and the second half-cell chamber of its respective cell.

21. The electrochemical system of claim 19, wherein the expansion chamber comprises a divider to maintain separation of the first volume of electrolyte from the first half-cell chamber and a second volume of electrolyte from the second half-cell chamber.

22. The electrochemical system of claim 1, wherein each electrochemical cell further independently comprises a make-up liquid supply in fluid communication with the electrochemical cell to provide make-up liquid to the first half-cell chamber, the second half-cell chamber, or both.

23. The electrochemical system of claim 22, further comprising a one-way valve positioned between the make-up liquid supply and the electrochemical cell, the one-way valve arranged to allow fluid flow into but not out of the electrochemical cell.

24. The electrochemical system of claim 23, wherein the one-way valve regulates the flow of make-up liquid into the electrochemical cell based on a pressure difference between the supply manifold and the electrochemical cell.

25. The electrochemical system of claim 2, wherein the stack is a bipolar stack comprising bipolar plates between adjacent cells, and wherein each bipolar plate comprises one or more interior coolant flow channels.

26. The electrochemical system of claim 1, wherein the first electrolyte capture-and-return system is configured to direct the captured first escaping electrolyte back into the first half-cell chamber via a first electrolyte return conduit; and wherein the second electrolyte capture-and-return system is configured to direct the captured second escaping electrolyte back into the second half-cell chamber via a second electrolyte return conduit.

27. A method of operating an electrochemical system to generate at least one product gas, the electrochemical system comprising:
a stack of electrochemical cells, each individual electrochemical cell independently comprising:
an electrolyte;
a first half-cell chamber comprising a first electrode in contact with a first volume of the electrolyte, the first half cell chamber being in communication with a first electrolyte capture-and-return system;
a second half-cell chamber comprising a second electrode in contact with a second volume of the electrolyte, the second half cell chamber being in communication with a second electrolyte capture-and-return system; and
a separator separating the first half-cell chamber from the second half-cell chamber;
the method comprising, in each individual electrochemical cell in the stack:
reacting the electrolyte in the electrochemical cell thereby generating the at least one product gas; and
capturing a first escaping electrolyte exiting the first half-cell chamber via the first electrolyte capture-and-return system and returning the captured first escaping electrolyte to the first half-cell chamber while fluidically isolating the first escaping electrolyte from electrolyte in each other individual electrochemical cell of the stack; and/or
capturing a second escaping electrolyte exiting the second half-cell chamber via the second electrolyte capture-and-return system and returning the captured second escaping electrolyte to the second half-cell chamber while fluidically isolating the second escaping electrolyte from electrolyte in each other individual electrochemical cell of the stack.

28. The method of claim 26 comprising both the step of capturing the first escaping electrolyte and the step of capturing the second escaping electrolyte.

29. The method of claim 27, wherein capturing the first escaping electrolyte from the first half-cell chamber comprises directing the escaping electrolyte to a first liquid-gas separation volume via a first egress channel; and wherein capturing the second escaping electrolyte from the second half-cell chamber comprises directing the escaping electrolyte to the first liquid-gas separation volume and/or to a second liquid-gas separation volume via the first egress channel and/or via a second egress channel.

30. The method of claim 29, wherein the first egress channel is a first series fluid escape element that exhibits a pressure-drop of at least 0.1 bar between the first half-cell chamber and the first liquid-gas separation volume during operation of the electrochemical system; and wherein the second egress channel is a second series fluid escape element that exhibits a pressure-drop of at least 0.1 bar between the second half-cell chamber and the second liquid-gas separation volume during operation of the electrochemical system.

31. The method of claim 29, further comprising pumping electrolyte from the first liquid-gas separation volume into the first half-cell chamber and/or pumping electrolyte from the second liquid-gas separation volume into the second half-cell chamber.

32. The method of claim 31, further comprising removing gas from the first liquid-gas separation volume via a first gas removal manifold and/or removing gas from the second liquid-gas separation volume via a second gas removal manifold.

33. The method of claim 32, wherein removing gas via the respective first and/or second gas removal manifold comprises driving a gas removal liquid through the respective first and/or second gas removal manifold and controlling a fluid pressure of the gas removal liquid within the respective first and/or second gas removal manifold.

* * * * *